US008146096B2

(12) United States Patent
Angelov et al.

(10) Patent No.: US 8,146,096 B2
(45) Date of Patent: Mar. 27, 2012

(54) METHOD AND SYSTEM FOR IMPLEMENTING BUILT-IN WEB SERVICES ENDPOINTS

(75) Inventors: Dimitar V. Angelov, Montana (BG); Vladimir S. Savchenko, Sofia (BG); Vladimir Videlov, Sofia (BG)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/005,053

(22) Filed: Jan. 12, 2011

(65) Prior Publication Data

US 2011/0113435 A1 May 12, 2011

Related U.S. Application Data

(63) Continuation of application No. 11/724,504, filed on Mar. 14, 2007, now Pat. No. 7,890,956.

(51) Int. Cl.
*G06F 13/00* (2006.01)

(52) U.S. Cl. ........ 719/313; 719/314; 719/315; 709/217; 709/230

(58) Field of Classification Search .................. 719/313, 719/314, 315; 709/217, 230
See application file for complete search history.

(56) References Cited

U.S. PATENT DOCUMENTS

| 7,594,217 | B2 | 9/2009 | Beisiegel et al. |
| 7,653,008 | B2 | 1/2010 | Patrick et al. |
| 7,814,060 | B2 * | 10/2010 | Stoyanova ................... 707/661 |
| 2008/0228851 | A1 | 9/2008 | Angelov |

OTHER PUBLICATIONS

"U.S. Appl. No. 11/724,504, Non-Final Office Action mailed Mar. 19, 2010", 8 pgs.
"U.S. Appl. No. 11/724,504, Response filed Jun. 10, 2010 to Non Final Office Action mailed Mar. 19, 2010", 12 pgs.
"U.S. Appl. No. 11/724,504 Notice of Allowance mailed Oct. 5, 2010", 4 pgs.

* cited by examiner

*Primary Examiner* — Andy Ho
(74) *Attorney, Agent, or Firm* — Schwegman, Lundberg & Woessner, P.A.

(57) ABSTRACT

A method and system for processing Web service messages within an object oriented runtime environment is described. In one embodiment, the method includes steps for invoking a single instance of a state-less protocol for processing inbound and outbound flows of Web services messages. After determining Web services messages have been received out of order, processing of the outbound flow of any remaining messages is suspended until a complete set of messages is received. The messages are rearranged into proper order before completing processing of the outbound flows of the remaining messages.

19 Claims, 45 Drawing Sheets

METHOD AND SYSTEM FOR IMPLEMENTING BUILT-IN WEB SERVICES ENDPOINTS

CLAIM OF PRIORITY

This is a continuation application of and claiming priority benefit from U.S. application Ser. No. 11/724,504 now U.S. Pat. No. 7,890,956, entitled "METHOD AND SYSTEM FOR IMPLEMENTING BUILT-IN WEB SERVICES ENDPOINTS" and filed Mar. 14, 2007, which application is incorporated herein by reference in its entirety.

FIELD OF INVENTION

The field of invention relates generally to the software arts, and, more specifically, to a Web services deployment.

BACKGROUND

Web Services

The term "Web services" is understood to mean a standards-based, service oriented architecture (SOA) than can be used to engage in business relationships (e.g., buying and selling) in a partially or wholly automated fashion over a public network such as the Internet ("the Web"). Standards bodies and interoperability organizations that have contributed to the Web services effort include the World Wide Web Consortium (W3C), the Organization for the Advancement of Structured Information Standards (OASIS), the Internet Engineering Task Force (IETF) and the Web Services Interoperability Organization (WS-I).

FIG. 1 shows a Web services model 100 that includes a registry 101, a service provider 102 and a service consumer 103. A service consumer 103, or "service requestor", is generally understood to be an entity that seeks and (in cases where a suitable Web service is found) uses a particular Web service through a network 104. The registry 101 includes listings of various "available" services, and, may assist the service consumer 103 in searching for a suitable service provider based on the web servicing needs of the service consumer 103. A service provider 102 is the provider of one or more Web services that can be accessed over the network 104. Because of the vast expanse of the Internet and interest in automated business engagements, many registries, service consumers and service providers may be in operation at any instant of time.

Presently, the responsibilities of the most prevalent registry function 101 that is associated with the Web services effort are defined in various Universal Discovery, Description and Integration (UDDI) specifications provided by uddi.org. Besides providing listings of available services, a UDDI registry 101 may also make available to a service consumer 103 additional details that pertain to any particular Web service such as: 1) the location of the Web service (e.g., its URI specified by a specific network destination address or name); 2) the capabilities of the Web service (e.g., specific methods that are supported by the Web service and that may be called upon by the service consumer), and, 3) communication semantics needed for invoking the Web service through the network 104 (e.g., the structure of a messaging format and/or protocol needed to properly communicate with the Web service).

According to one widely adopted approach, such "additional details" are described in Web Services Directory Language (WSDL) text documents written in eXtensible Markup Language (XML). Here, for example, for each Web service that the registry 101 maintains a listing of, the registry 101 also maintains a WSDL document that describes the location, capabilities and communication semantics of the Web service. Presently, a WSDL document for a particular Web service is expected to include an "abstract interface" description of the Web service (which includes the Web service's methods and the data passed between the Web service provider and Web service consumer) and a "concrete implementation" description of the Web service (which includes specific protocol and data format specifications for communicating with the Web service (referred to as a "binding") and the location of the Web service (referred to as a "port")).

According to another widely adopted approach, with respect to the actual communication that occurs between the service consumer 103 and the service provider 102, such communication is implemented through an exchange of Simple Object Access Protocol (SOAP) text messages written in XML. A SOAP message, is viewed as being contained within an envelope 105 that further contains a header 106 (which may be optional) and a body 107.

For a particular Web service, the header 106 is typically used to pass "control" information associated with the consumer's Web service engagement with the Web service provider (e.g., information used for performing encryption/decryption and/or signature checking, information used to ensure proper ordering of SOAP messages, information that identifies the ultimate destination of the SOAP message, etc.). The body 107 is used to pass more "substantive"information associated with the service consumer's Web service experience (e.g., a specific method call from the service consumer to the service provider, or, a specific response generated by the service provider in response to a specific method call).

Note that SOAP messages are typically deemed to be insensitive to the particular type of transport protocol used to transport them through the network 104. Thus, even though most SOAP messages may be appended with an HTTP header, a header specific to a different type of transport protocol (e.g., HTTPS, SMTP, etc.) could be appended to the SOAP envelope 105 instead (e.g., if the service provider, service consumer and/or intermediary nodes were adapted to use the different type of protocol).

In basic cases where a service provider 102 receives a SOAP message sent by a service consumer 103, or, where a service consumer 103 receives a SOAP message sent by a service provider 102, the body of the SOAP message 107 essentially represents the purpose of the communication between the service provider 102 and service consumer 103. For instance, in the case of a SOAP message being sent by a service consumer 103 and received by a service provider 103, the purpose of the SOAP message may be that the service requester 103 desires that the service requester 102 perform a specific method. In this case, the body of the SOAP message 107 is apt to contain both a request to perform the specific method and any input parameters that are both needed by the method and determined by the service requester 103.

Presently, largely because of its versatility, the SOAP message is regarded as a primary unit of information transfer between a service provider 102 and a service consumer 103 in a Web services environment. Here, unlike many other kinds of messaging protocols, existing SOAP message specifications define a format that is relatively "abstract" in terms of its content and/or organizational requirements. Essentially, it is believed that a relatively abstract messaging format definition lends itself to having the versatility needed to support business relationship models of all different kinds (e.g., in terms of business relationship type and procedure), which, in turn, represents an overarching design goal of those designing the Web services infrastructure.

Nevertheless, for many types of business relationships, too much abstractness may correspond to the absence of specific structure deemed necessary to implement a truly workable automated business practice. For instance, a significant number of business models are expected to require confidentiality and/or assurances as to whom its SOAP message oriented communication is being entertained between. A significant number of business models are also expected to require guarantees that received SOAP messages will be processed in a specific order. Further still, a significant number of business models may desire to have the end-to-end communication path between service provider and service consumer be supported by different types of transport protocols (e.g., a first leg that is transported by HTTP and a second leg that is transported by SMTP).

Returning briefly to the concept of versatility, however, note that it also expected that significant numbers of business models will not require one or more of the above described features. The Web services architecture has therefore evolved into a scheme that supports "extensions" to the SOAP messaging format that are available if desired, but, are not required to be SOAP compatible.

For instance, consistent with the description provided in the paragraph just above the immediately preceding paragraph: 1) a "WS-Security"extension has been defined that specifies information to be contained within a SOAP message header 106 if encryption/decryption and/or authentication procedures are to be performed upon a SOAP message; 2) a "WS-Reliable Messaging" extension has been defined that specifies information to be contained within a SOAP message header 106 if proper ordering of SOAP messages is desired; and, 3) a "WS-Addressing" extension has been defined that specifies information to be contained within a SOAP header 106 that describes the destination of the SOAP message in a transport independent fashion. Those of ordinary skill will recognize any additional features of the above described extensions as well as any other extensions that are presently in existence or may be in existence in the future.

Thus, in order to effect a particular Web services business relationship, those SOAP extensions deemed appropriate for the relationship are effectively implemented into the procedures of the relationship by enhancing the SOAP message header 106 with the corresponding information of each appropriate extension, and, any other SOAP extensions that are not deemed appropriate may simply be ignored (in which case no extension specific enhancement is made to the SOAP header 106). Likewise, in order to support the versatility of the Web services concept, yet provide for sufficient structure and definition of it's basic messaging format where appropriate, SOAP extensions are implemented in various combinations to effect a broad spectrum of different business relationship models that the Web services infrastructure is capable of supporting.

Prior Art Web Service Message Processing Runtime Framework

FIGS. 2 through 5 depict pertinent aspects of a prior art runtime framework for processing Web services messages. FIG. 2 shows basic structural aspects of the framework. FIG. 3 shows a basic method performed by the framework. The runtime framework is implemented in object-oriented software written in the Java programming language.

The runtime framework includes a runtime object 211 that essentially behaves as a manager for the overall process. The runtime object 211 calls upon, at appropriate instances, various other object-oriented structures in order to fully process a message. These various object-oriented structures include: 1) data that describes the applicable Web service 413 (referred to as "Web service data"); 2) information specific to the particular process run being executed (referred to as "context") 514; 3) a protocol stack 215 that contains the object-oriented program code for processing message header information; 4) an implementation container 219 that contains the object-oriented program code (in the form of a Java servlet or Enterprise Java Bean (EJB)) for processing message body (or "payload") information; 5) an implementation container manager 217 for providing an instance of the implementation container 219 to the runtime object 211; and, 6) a transport binding object 218 for orchestrating the conversion of the content of a message between its transported format (e.g., XML in the case of a SOAP message) and Java object form. A comment worth noting is that, as described in more detail below, the implementation container and implementation container manager are only instantiated on the service provider side. On the service consumer side, the implementation container is essentially replaced by the software running on the web service that is using the web service.

Three different transport binding objects were designed: 1) a SOAP transport binding for processing SOAP messages; 2) an HTTP transport binding for processing HTTP messages; and 3) a MIME transport binding for processing MIME messages. Those or ordinary skill will recognize that HTTP and MIME are typically regarded as "lower level" transportation technologies that can be used to "carry" a SOAP message. For example, a SOAP message may be instantiated in the payload of an HTTP packet. In this case, in order to process the complete message, the HTTP transport binding is used to perform HTTP related transport format conversion functions on the message and the SOAP transport binding is used to perform SOAP transport format conversion functions on the message.

Here, the transport format conversion functions performed by the transport bindings can generally be viewed as orchestrating the conversion of the content of a message between its format during transportation (e.g., XML in the case of a SOAP message) and the Java objects that are used by the runtime framework that contain such content. The conversion may also involve comprehending the packet structure of the transported message as well (e.g., understanding the structure of a SOAP message header and/or body in the case of a SOAP message). For simplicity, amongst the various transport bindings, the present discussion elaborates mostly on the use of the SOAP transport binding 218. Here, it is worthwhile to note that, amongst the structures observed in FIG. 2, only the SOAP transport binding 218 is specific to any particular messaging format. As such, the runtime framework as a whole is largely independent of message format type and is therefore capable of processing Web service messages for practically any message type (e.g., simply by introducing a transport binding specific to any particular, desired message type).

The prior art runtime framework is not only easily applied to any type of message format but is also largely independent of whether it is being implemented by a service provider or a service consumer. Here, the process performed by the runtime framework can largely be viewed as being responsible for: 1) processing a received message 222; and, 2) generating a response message 223 that is sent as a response to the received message. From this perspective, the process is easily extended to either provider-side or consumer-side Web service functions, because, in the case of a service provider, the "received message" is simply a message sent by a service consumer and the "response message" is simply a message generated by the service provider, while, by contrast, in the case of a service consumer, the received message is sent by a service provider and the response message is generated by the service consumer.

To be even more specific, referring briefly to FIG. 2, the protocol stack 215 corresponds to the program code used to: 1) process an object-oriented representation of the received message's header information; and, 2) generate an object-oriented representation of the header information for the response message. Moreover, the implementation container 219 contains the program code used to: 1) process an object-oriented representation of the received message's body; and, 2) generate an object-oriented representation of the body for the response message. Although different protocol stack program code and implementation container program code is appropriate as between a service provider and service consumer (e.g., because a service provider will generate "different" messages than a service consumer), the architecture of the prior art runtime framework is nevertheless largely indifferent as to whether its application is for service provider-side functions or service consumer-side functions.

Referring to FIGS. 2 and 3, the processing of a message begins after a lower level transport layer that is responsible for handling lower level communication with the sender of the message forwards the received message 222 to the runtime framework. Here, the transport layer passes a TransportID value 210 to the runtime object 211. The TransportID uniquely identifies the URI of the specific Web service provider or consumer that the received message 222 is directed to, and, may have been included in a lower level transport layer header that was appended to the message as it traveled through the network (e.g., in the case of HTTP transport, the TransportID value 210 may be the URL of the Web service, found in the HTTP header that the SOAP message 222 is directed to).

A Web service data repository 212 that is available to the runtime object 211 is configured to maintain a unique collection of data for each Web service that the runtime framework of FIG. 2 is supposed to support (hereinafter referred to as a Web service's "Web service data"). FIG. 4 shows a depiction of the Web service data 413 that is maintained for a particular Web service. According to the depiction of FIG. 4, the Web service data 413 includes: 1) a listing of the various "protocols" (referred to as a "protocol stack") that are to be invoked when processing a message header for the particular Web service 420 (the protocols themselves are described in more detail further below with respect to the protocol stack 215 of FIG. 2 and process 303 of FIG. 3); and, 2) for service provider side implementations, the identity 422 of a "container" that contains the endpoint identified in 2) above (which is referred to as the implementation container 219). For service consumer side implementations, identity 422 identifies the software thread, component or other entity running on the consumer side that is using the web service.

The repository 212 may also be implemented as part of a Web services registry that contains WDSL documents describing each of the Web services that the prior art runtime framework is expected to support. Notably, the Web service data 413 that is maintained for each of the various Web services are different data structures than the WDSL documents that are maintained for each of the various Web services.

In response to the runtime object's reception of the TransportID value 210, the runtime object 211 forwards the TransportID value 210 to the repository 212. The repository 212 is configured to correlate a specific TransportID value to a specific Web service's Web service data 413, and, moreover, in response to its receiving of a TransportID value from the runtime object 211, return to the runtime object 211 the Web service data 413 for the Web service that the TransportID corresponds to. This process is generally depicted as process 301 in FIG. 3. Here, as part of the initial configuration of the prior art runtime framework, a particular Web service is identified with a particular URI (e.g., destination address (e.g., URL) or name).

After the runtime object 211 has access to the Web service data 413 for the Web service that the received message 222 to be processed is directed to, the runtime object 211 constructs 302 another collection of data, referred to as "context" 514, that acts as a kind of "scratch pad" for the runtime object 211 (and other structures such as the transport binding and endpoints) to store values to and retrieve values from as the prior art runtime framework runs though its processing routine.

Here, unlike the Web service data 413 maintained by the repository 212, which can be viewed as a quasi-permanent description of the Web service that exists both before and after the processing applied to a particular message, the context information 514, by contrast, can be viewed as data that pertains to the specific process run applied to a specific received and response message pair 222, 223. Better said, the Web service data 413 for a particular Web service is "re-used" each time a message is received for that Web service. By contrast, for each process run, a context 514 is newly created approximately at the beginning of the run and is later extinguished approximately at the end of the run.

FIG. 5 shows a depiction of the "context" 514 that is constructed by the prior art runtime framework. The context includes: 1) an object 520 that is essentially an object oriented representation of the received message, hereinafter referred to as the received message object 520; 2) a runtime counter 521 whose value essentially defines "where" the runtime process currently "is" amongst its various processes; 3) a reference 522 to the applicable Web service data 413 (as discussed above with respect to FIG. 4) that is being used for the process run; 4) a response message object 524 that is essentially an object oriented representation of the response message (which does not begin to be defined until the endpoint method is performed); and, 5) "method calls" 527 that are used by any of the protocols 215 that need to invoke use of the runtime object 211.

With respect to the received message object 520, during the initial building of the context 302, the runtime object 211 calls upon the transport binding object 218 to generate the received message object 520. Here, as discussed above, the SOAP transport binding object 218 is an object that deals with the structure of a SOAP message, and, therefore, has access to the classfile needed to produce an object (the message object 520) whose organization and structure is patterned after the organization and structure of a SOAP message. During the initial building of the context 302, the received message object 520 that is loaded into the context 514 is akin to an "empty template" whose structure is consistent with a SOAP message (i.e., a header portion and a body portion) but whose substantive content is empty or "blank" (i.e., no specific items of data from the received message are in the message object 520). The message object also contains certain "readers" (or "parsers") and "writers" that, in the case of a SOAP message, are used by the transport binding object 218 to covert message content between XML and Java object form.

The runtime object next calls upon the message object 520 to initiate its being loaded with the specific header information 523 that exists within the received SOAP message 222. In order to perform this "deserialization" process, the transport binding object 218 invokes the use of a Document Object Model (DOM) parser found within the message object 520. A DOM parser creates a collection of "element" objects organized into a "tree", where, the element objects in the tree represent the elements in the parsed text document (in this case, the header portion of the received XML SOAP message), and, the structure of the tree (i.e., its branches and sub-branches) reflects the structure of the text document (e.g., a children element branches from its parent element). Essentially, the transport binding object 218 through its use of the DOM parser writes the various elements in the header portion of the received message 222 as a tree of object oriented DOM Elements within the header portion 523 of the message object 520.

Referring to FIG. 3, after the context 514 for the process run is created 302 including the building of the header portion 523 of the message object 520, the header information taken 523 from the SOAP message is processed 303 by the "stack" of protocols 215 that are defined in the Web service data 420. A single protocol is essentially a body of object oriented program code whose purpose is to perform some kind of isolated, "control" operation on a received/response message pair, such as, processing a specific category of the received/ response message's header information. With respect to the prior art runtime framework, there were three such protocols: 1) the WS-Security protocol; 2) the Headers protocol (used on the consumer side only); and, 3) the Message ID protocol.

The functionality of the WS-Security protocol was designed to be practically coextensive with the functionality introduced by the WS Security extension to the SOAP message format described in the preceding section (i.e., encryption/decryption and signature checking functions). The Headers protocol was designed to permit a consumer side endpoint and/or another protocol executed on the consumer side to: a) comprehend at least a portion of a received SOAP message's header information; and/or, b) write at least a portion of a response SOAP message's header information. The Message ID protocol was designed to provide (on the consumer side) and extract (on the provider side) a SOAP header element containing a UID value (similar to <wsa: MessageID> as described in the WS-Addressing specification).

In this regard, different combinations of protocols are used to implement customized SOAP message control treatment on a per Web service basis. For instance, if a first Web service requires some kind of security operation but does not require any comprehension/manipulation of a SOAP message header by the Web service's endpoint, the protocol stack for the first Web service would include the WS-Security protocol but not the Headers protocol.

As another example, if a second Web service does not require any kind of security operation but does require some kind of comprehension/manipulation of a SOAP message header by the Web service's endpoint on the consumer side, the protocol stack 215 for the second Web service on the consumer side would not include the WS-Security protocol but would include the Headers protocol. In this manner, by essentially granularizing various control operations into separate isolated protocols, customized control treatment can easily be effected on a per Web service basis simply by, for each Web service, combining those protocols corresponding to the Web service's desired control operations into the Web service's protocol stack 215.

Referring to FIGS. 2 and 3, the execution 303 of the protocol stack 215 is sequential in the sense that, for example: 1) the first protocol 216_1 listed in the protocol stack is executed; 2) then, the second protocol 216_2 listed in the protocol stack is executed, . . . , 3) then, the last protocol 216_N listed in the protocol stack is executed. Thus, the sequence of flow observed in flow 224 corresponds to the protocol execution sequence when the header of a received message is being processed. Flow 224 may therefore be referred to as the "inbound" protocol execution flow 224. Note that, with the prior art runtime framework having only four protocols, N could be any number less than or equal to four.

As part of the generation of the response message that is sent in response to the received message (described in more detail further below), the protocol stack 215 is executed in the reverse order relative to the inbound flow 224 (as depicted by reverse or "outbound" process flow 225). In this case, execution of the protocol stack in the outbound flow 225 builds the header content of the response message.

The runtime object 211 is responsible for controlling the correct protocol execution sequence. Referring to inbound flow 224, the runtime object 211 refers to the protocol stack definition 420 in the Web service data 413 in order to identify the first protocol 216_1 in the protocol stack 215, and, sends a "HANDLE_REQUEST" command to the first protocol 216_1. If the first protocol 216_1 is able to properly execute its operation without any problems, the protocol 216_1 forwards a "NEXT" response to the runtime object 211. The NEXT response signifies to the runtime object 211 that the processing of the received message should proceed to the "next" protocol.

In this case, the runtime object 211 identifies the second protocol from the Web service data 413 and issues a HANDLE_REQUEST command to the second protocol 216_2. In cases where no problems arise, the process continues until the Nth protocol responds to its HANDLE_REQUEST command with a NEXT response. The runtime object 211 then continues with process 304.

In cases where a protocol discovers some kind of problem, a "BACK" response is sent to the runtime object 211 through the context. In a situation where a problem is discovered by a protocol, the first protocol to discover a problem builds (with a "token writer") a "fault" message body that addresses the problem for an outbound, response message, and, sends a "BACK" response to the runtime object 211 through the context.

The BACK response essentially triggers an outbound flow through the protocol stack in reverse order relative to the inbound flow. For instance, if the third protocol in the inbound flow discovered a problem and responded with a BACK command, the runtime object 211 would send, through the context 514, a "HANDLE_RESPONSE" command to the second protocol in the protocol stack. The second protocol would then build its contribution to the header content for the response message. The process would then be repeated a final time for the first protocol. A response message 223 having the fault message body built by the first protocol and header content built by the second and first protocols would thereafter be sent to the service consumer.

Returning to the remainder of the process after successful execution through the protocol stack 302 in the inbound direction, the runtime object 211 next invokes the transport binding object 218 to assist in the determination of which "endpoint method" is appropriate for generating a response in object oriented form that is to be converted into the body of the response message that is sent to the service consumer.

The "endpoint" of a Web service provider is essentially the portion of the service provider's software that is responsible for, in acting as a Web service, taking appropriate action in response to the specific content contained within the body of a message that was sent by a service consumer (e.g., performing some act that the targeted Web service is supposed to perform (e.g., placing an order) and then generating an object oriented representation of the body of a "response" message that is to be sent to the service consumer). Thus, a Web service's substantive processes (i.e., those relating to the body of it's messages) are essentially defined by its endpoint's methods. As mentioned above, in the prior art runtime framework, on the service provider side, a Web service's endpoint corresponds to a particular Java servlet or EJB (that may be designed to call upon "deeper/background" servlets/EJBs in order to fully implement its web servicing tasks). By contrast, on a service consumer side implementation of the runtime framework, the web service endpoint is implemented by the software running at the service consumer side that is using the Web service.

The transport binding object 218, as discussed above, is essentially an operative layer between: 1) the object-oriented environment used to apply the Web services processing to received/response message pairs; and, 2) the specific transported format of received/response message pairs. In this case, the ability of the transport binding 218 to determine the message body's content from its transported format is used to characterize the body of the received message as corresponding to a specific "message key" from amongst a collection of possible message keys 304.

Here, a single Web service should be able to comprehend each of a number of "different" message bodies. For instance, in the case of a service provider, the service consumer is apt to send the Web service provider message bodies of differing content over the course of their engagement. According to the prior art runtime framework, each different type of message was given a "key" value that essentially corresponded to a unique name and namespace combination given to the particular type of message. Different keys were assigned for each message body type for each Web service that the runtime framework of FIG. 2 was implemented to support. Thus, in principle, a unique key was given to each different type of message body that the runtime system might be asked to process over the course of its supporting the collection of Web service it was configured to support. The message key of a message body is determined from the types of elements that it contains.

In the prior art runtime framework, it is the duty of the transport binding object 218, for each received message, to detect the specific message key that the body of the received message 222 corresponds to, and, a mapping registry 214 was used to identify the appropriate endpoint method for the specific key. That is, the prior art runtime framework essentially contained a mapping 221 in registry 214 between the various keys that the prior art runtime framework as a whole might identify, and, for each one of these keys, information concerning the specific method to be performed by the endpoint that the received message is targeted to. This information includes: 1) the name of the method; 2) the order and type of the objects that the method accepts as input parameters; 3) the type of object that the method returns; and, 4) the exceptions that the method may throw in the case of a fault condition. The transport binding 218 provides the mapping registry 214 with the key value that was detected from the body of the received message 222, and, in response, the mapping registry 214 returned the corresponding method specific information 305.

The proper handling of a received message involves some kind of processing that is performed by an endpoint in response to the received message body including the generation of a "response" message body that is sent to the service consumer as a response to the received message. In a service provider side implementation, along with the endpoint method information being provided 305 to the transport binding object by the mapping registry 214, the runtime object 211 also retrieves the identity 422 of the endpoint and its container (i.e., the "implementation container") from the Web service data 413. As described in more detail below, the runtime object uses this information 422 to fetch both an instance of the implementation container 306 and the endpoint's classloader 307. Recalling that a service provider side_endpoint in the prior art runtime framework is a Java servlet or EJB, the implementation container in the prior art runtime framework corresponds to either a J2EE Web container (if the endpoint is a servlet) or a J2EE EJB container (if the endpoint is an EJB).

As in known in the art of Java programming, a container is a type of platform that essentially defines the operating environment of the servlets or beans that it "contains". The platform or operating environment defined by a container is usually at least partially defined by a set of "services" (e.g., inter-bean/servlet messaging, database connectivity, etc.) that the various servlets or beans within the container may use (so that the expense of having the functionality built into the servlets/beans themselves is avoided).

The specific combinations as to which servlets are configured to operate into which Web container(s), and, which EJBs are configured to operate into which EJB container(s) are typically not determined until these various software components are actually "deployed" by a specific Web service provider. That is, different Web service providers may implement different numbers of containers, different container names and/or different container compositions even though the same core Web service runtime framework is being deployed.

Referring back to FIG. 4, as mentioned above, the identities of the Web service's endpoint and implementation container are listed 422 in the Web service data 413. Note that this listing 422 is not specified until the core Web service software has been deployed. The runtime object 211 refers to this listing 422 and provides an implementation container manager 217 with the identity 422 of the implementation container. The implementation container manager 217 is a registry that, in response to its reception of the implementation container's identity, provides the runtime object 211 with a pointer to an interface to the implementation container 219. With the interface, the runtime object 211 can be said to posses an instance of the implementation container 219. The above description concerning the role of the implementation container and implementation container manager pertained to a service provider side implementation. By contrast, on a service consumer side implementation of the runtime framework, the web service endpoint is implemented by the software running on the service consumer side that is using the web service.

This software invokes the use of the Web service through an object oriented "proxy" for the Web service. Proxies are well understood in the art. A proxy is essentially part of an integrated application (in this case, the complete Web service as provided by the service provider including those portions of the provided Web service that are executed on the service consumer side) that is downloaded to a remote location (in this case, from the service provider to the service consumer) so that the remote location can call upon methods local to itself that pertain to the application. Here, the consumer side proxy is designed to accept a "request" message body from the consumer side endpoint along with a "send request" method call. In response, the proxy passes the "request" message body into the body 526 of the outbound message object 529 within the consumer side framework and a "request" message is sent from the service consumer to the service provider. Here, the "request" message can be viewed as a response relative to the service consumer because (except for the first, initial message at the very beginning of the web service experience) the message body is essentially a response to an earlier received message from the service provider. Processing of received messages on the service consumer side merely involve passing a received message body up to the service consumer endpoint software through the proxy. For simplicity the remainder of this discussion will focus on the execution performed on the service provider side.

Returning then to a discussion of the process from the service provider side perspective, with an instance of the implementation container and with knowledge of the appropriate endpoint, the runtime object 211 next retrieves the endpoint's classloader 307 from the implementation container 219 and provides it to the transport binding object 218. After the transport binding object 218 has been provided with the information specific to the endpoint method from the mapping registry 214 and the endpoint classloader from the runtime object 211, the transport binding object 218 creates instances of objects to be used as input parameters for the endpoint method. Essentially, the classloader is used to identify a class object for each input parameter object instance to be created. Each such class object is then used to create an "empty" input parameter object instance. Each empty input parameter instance is "filled" with appropriate input parameter information that the transport binding object 218 identifies from a token stream provided by a token reader that de-serializes the received message body 308 from its XML format to an object oriented token format. The transport binding object 218 then provides the filled input parameter object instances to the context 214.

The de-serialization discussed just above is performed with an event based parser (also referred to as a "token reader") rather than a DOM based parser (as is used for the message header information as discussed above). Reasons for parsing the message body with an event based token reader rather than a DOM parser include: 1) the amount of message body information is usually much greater than the amount of message header information and event based parsers tend to be more faster and/or memory consumption efficient than DOM based parsers; 2) the information content within the message header is typically unordered (e.g., as opposed to the message body whose structure is typically strictly defined by an XML schema) and DOM based parsers are better suited for dealing with message content whose ordering is randomized. An event based parser scans a text document for structures that it is designed to recognize and raises an event each time it observes any such structure. Commensurate with the event is the presentation of an object oriented structure (referred to as a "token") that represents the structure discovered in the document. In the prior art runtime framework there existed two different "default" token readers for two different types of XML formatting: 1) BinaryXML; and, 2) XML 1.0.

The transport binding object 218, knowing the appropriate input parameters for the endpoint method as well as being designed to utilize the appropriate default token reader, processes the token reader's output token stream and fills the endpoint method input parameter objects with appropriate information. The input parameter objects for the endpoint method are then passed from the transport binding object 218 to the context 214. The runtime object 211 subsequently reads the input parameters and invokes the endpoint method (which includes the input parameter object(s) provided by the transport binding object 218) through the implementation container interface 309.

The endpoint performs whatever Web service processing flows from the method invocation, and returns to the context 514 an object 526 that contains the content for the response message body (the "response message body object"). The response message body object 526 is contained by a "response message" object 524 that was earlier provided to the context 514 by the transport binding object 218. The response message object 524 essentially represents the response message in object-oriented form (similar to the received message object 522).

The runtime object 211 then invokes the transport binding object 218 to "serialize" 310 the contents of the response message body object 526 body into an XML SOAP message body for the actual response message 223. Here, the transport binding object 218 uses a token writer that coverts elements of the response message body object 526 into XML content that corresponds to the body of the actual response message 223. The runtime object 211 also invokes the protocol stack 215 in the "outbound" flow direction 225 to build the response message's header as a DOM tree 528 within the response message object 524. The transport binding object 218 then uses a DOM writer to serialize the object-oriented DOM tree into an XML SOAP message header for the response message 223. The response message 223 is then complete and is thereafter sent through a lower level transport service.

BRIEF DESCRIPTION OF THE DRAWINGS

The present invention is illustrated by way of example, and not limitation, in the figures of the accompanying drawings in which like references indicate similar elements and in which.

SUMMARY

A method and system for implementing Web service built-in endpoints is described. In one embodiment, the system includes a built-in endpoint manager interface and a built-in endpoint implementation container.

DETAILED DESCRIPTION

Improvements Over the Prior Art Message Processing Runtime Framework

Figure 6:
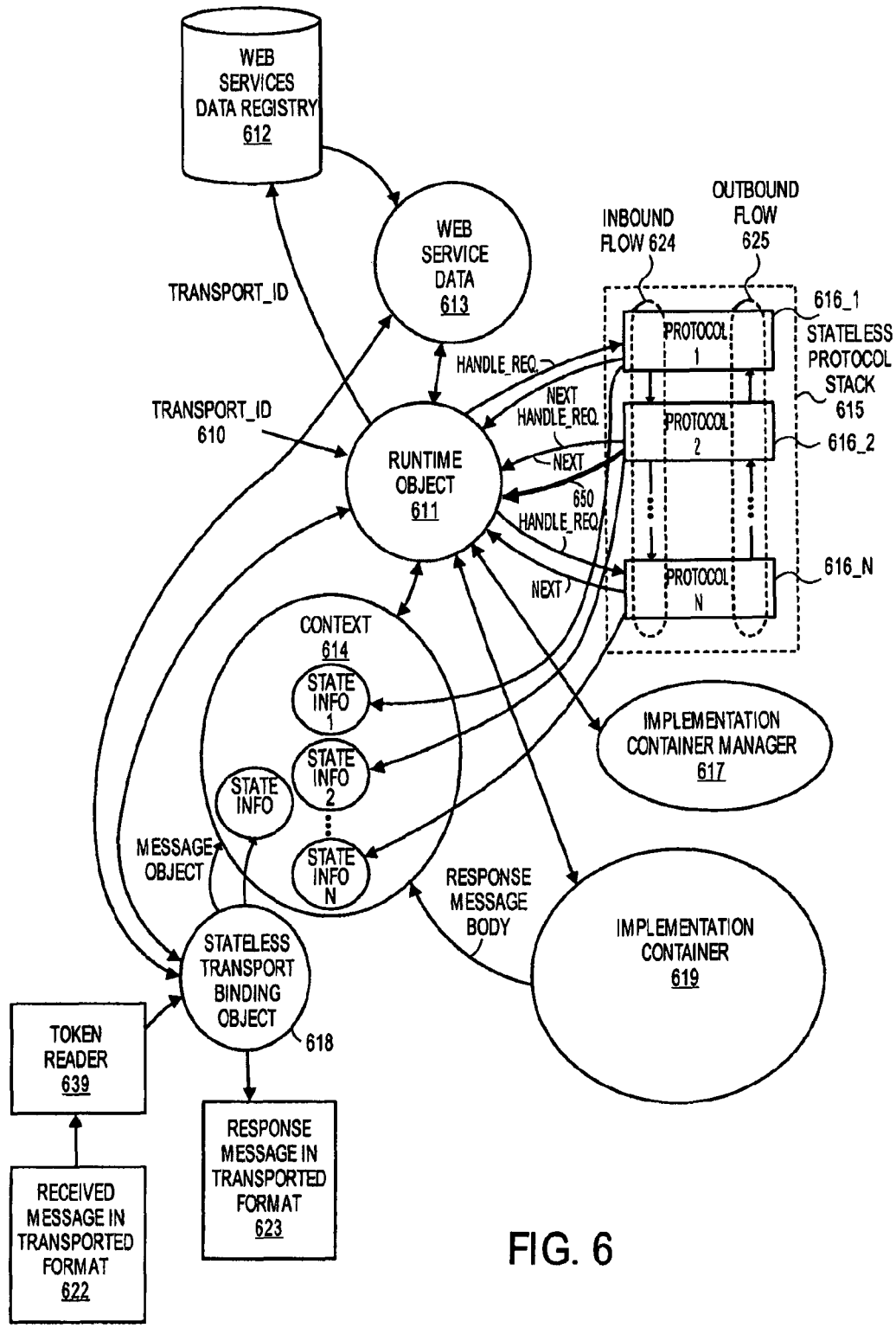
FIG. 6 shows an improved Web services message processing runtime framework.
Figure 7:
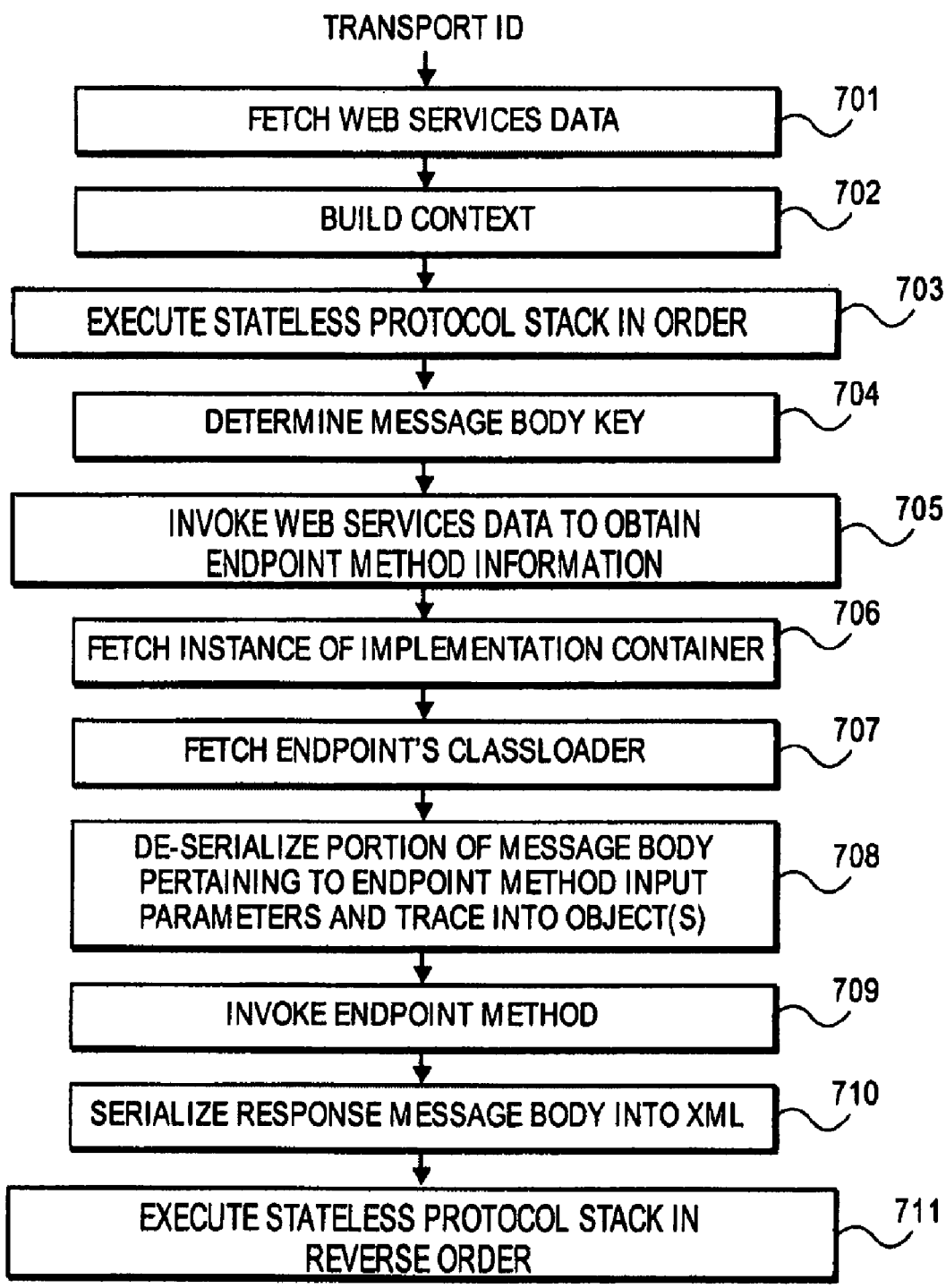
FIG. 7 shows a method that the improved runtime framework of FIG. 6 is designed to execute;\

FIGS. 6 and 7 show a message processing runtime framework and method respectively that contain improvements over the prior art runtime framework. At a high level, three significant improvements can be readily identified: 1) elimination of the mapping registry 214; 2) elimination of the context as a communicative intermediary between the protocols and the runtime object 211; and, 3) re-design of the protocols from being "state-full" (as in the prior art runtime framework) to being "state-less". Each of these improvements are discussed in secession in more detail just below.

Before discussing these improvements in more detail, however, it is important to recognize that aspects of the prior art runtime framework and/or the prior art runtime framework as whole can easily be extended to operating environments other than a Java object-oriented environment in which endpoint functionality is implemented as Java servlets and EJBs within J2EE containers. To first order, other types of program code may be used instead of Java servlets or EJBs. A servlet is essentially Java bytecode associated with a Java "page" (e.g., a Java Server Page (JSP>> that enables the execution of functions from the page (such as the handling of HTTP requests). Other types of pages and/or associated code are possible such as CGI scripts, Active Server Pages (ASPs), ASP.NET and proprietary C/C++ plug-ins for specific Web servers (e.g., ISAPI, NSAPI) and derivatives therefrom.

Also, EJBs are recognized as being the "components" within a component based architecture environment that is specific to Java. Component based software environments use granules of software (referred to as "components"or "component instances") to perform basic functions. The functional granularity offered by a plurality of different components provides a platform for developing a multitude of more comprehensive tasks. Some examples of component based architectures besides J2EE include Common Object Request Broker Architecture (CORBA), Component Object Model (COM), Distributed Component Object Model (DCOM) and .NET.

The runtime environment can also be easily extended to environments other than Java (e.g., J2EE) such as .NET, LAMP, etc. Like the prior art runtime framework, the improved runtime framework is not only easily applied to any type of message format but is also largely independent of whether it is being implemented by a service provider or a service consumer.

Figure 4:
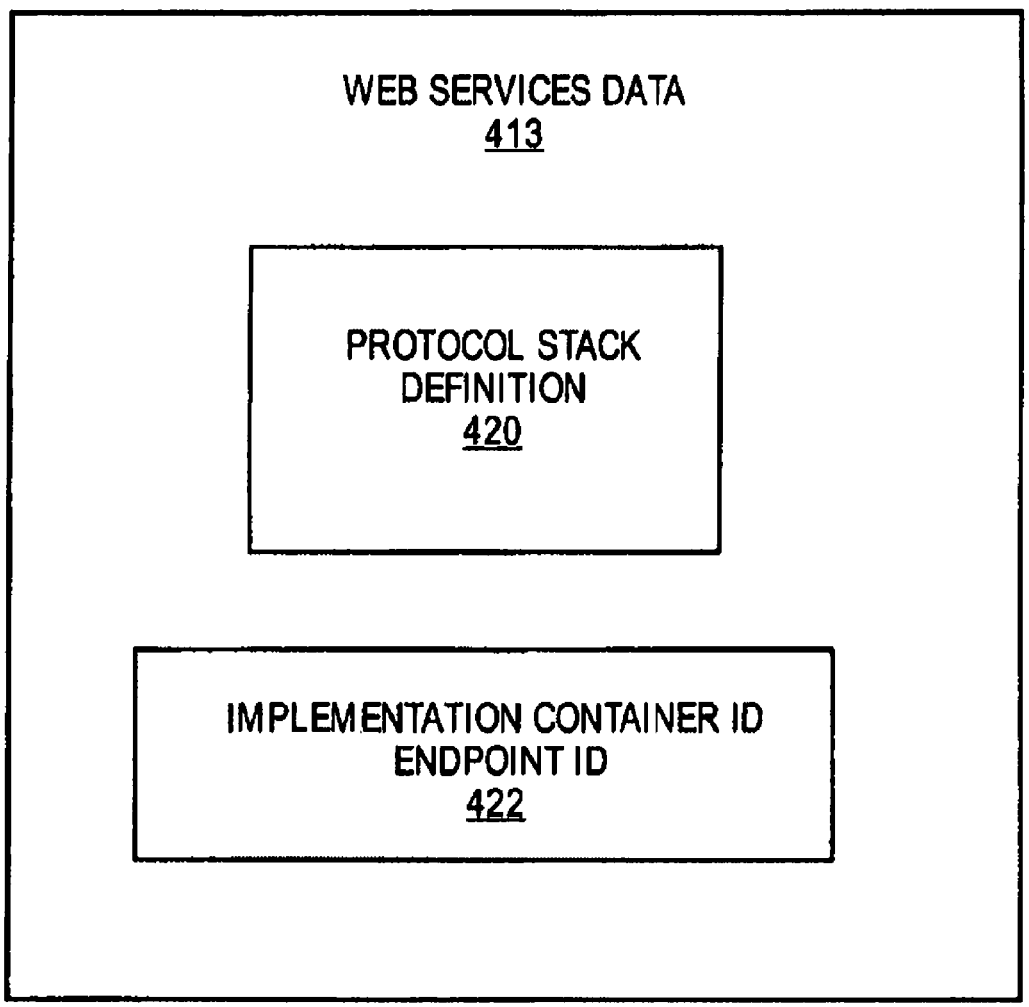
FIG. 4 shows Web services data used by the runtime framework of FIG. 2 to describe a particular Web service (prior art)

Turning then to the improvements made over the prior art runtime framework, the elimination of the mapping registry 214 is effected by incorporating the mapping data that is specific to a particular Web service into the Web service's own Web service data. Comparison of FIG. 8 with FIG. 4 clearly demonstrates the difference. Here, message key to endpoint method mapping information 821 is observed in the improved Web service data profile 813 of FIG. 8, but, is not observed in the prior art Web services data profile 413 of FIG. 4.

Figure 8:
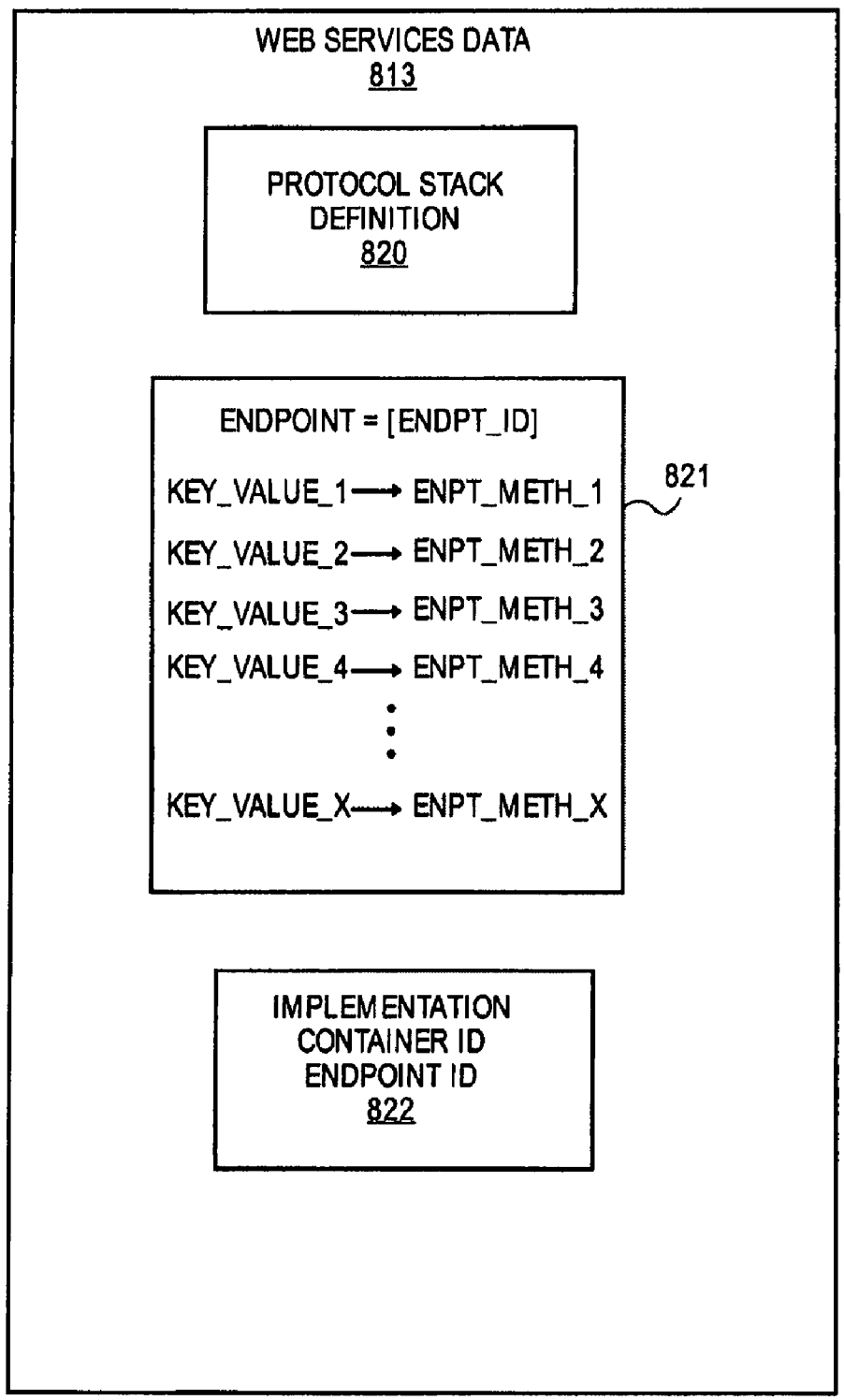
FIG. 8 shows Web services data used by the runtime framework of FIG. 6 to describe a particular Web service.

In operation, referring to FIGS. 6, 7 and 8, after the transport binding object 618 has identified the appropriate key value for the body of the received message 704, instead of invoking the use of a mapping registry 305 (as in the prior art), the runtime object 211 consults 705 the Web service data 613 with the key value. Here, in an embodiment, the mapping information 821 for a Web service contains a mapping between each possible message key (which, in turn, corresponds to each possible type of message) that the specific Web service may be asked to respond to and information describing the specific endpoint method that is to be executed in order to respond to the message (e.g., 1) the name of the method; 2) the order and type of the objects that the method accepts as input parameters; 3) the type of object that the method returns; and, 4) the exceptions that the method may throw in the case of a fault condition).

Elimination of the mapping registry 214 improves performance because, like the Web services registry 212, the mapping registry 214 was implemented with some form of persistence layer that induced some degree of delay (e.g., waiting for other processes to finish their access to the registry, propagation delay over a network where the registry is implemented as a remote database, etc.). By incorporating the message key-to-endpoint method information mapping into the Web services data 613, the mapping information for the Web service may be accessed more quickly by being cached along with the Web service data. From the perspective of an enterprise software developer, to say something is "cached-"typically means that it is stored within a computer's "memory" (such as its system memory or a processor's local (typically on-chip) cache) rather than a slower persistence layer such as a hard disk file or remote database.

Figure 1:
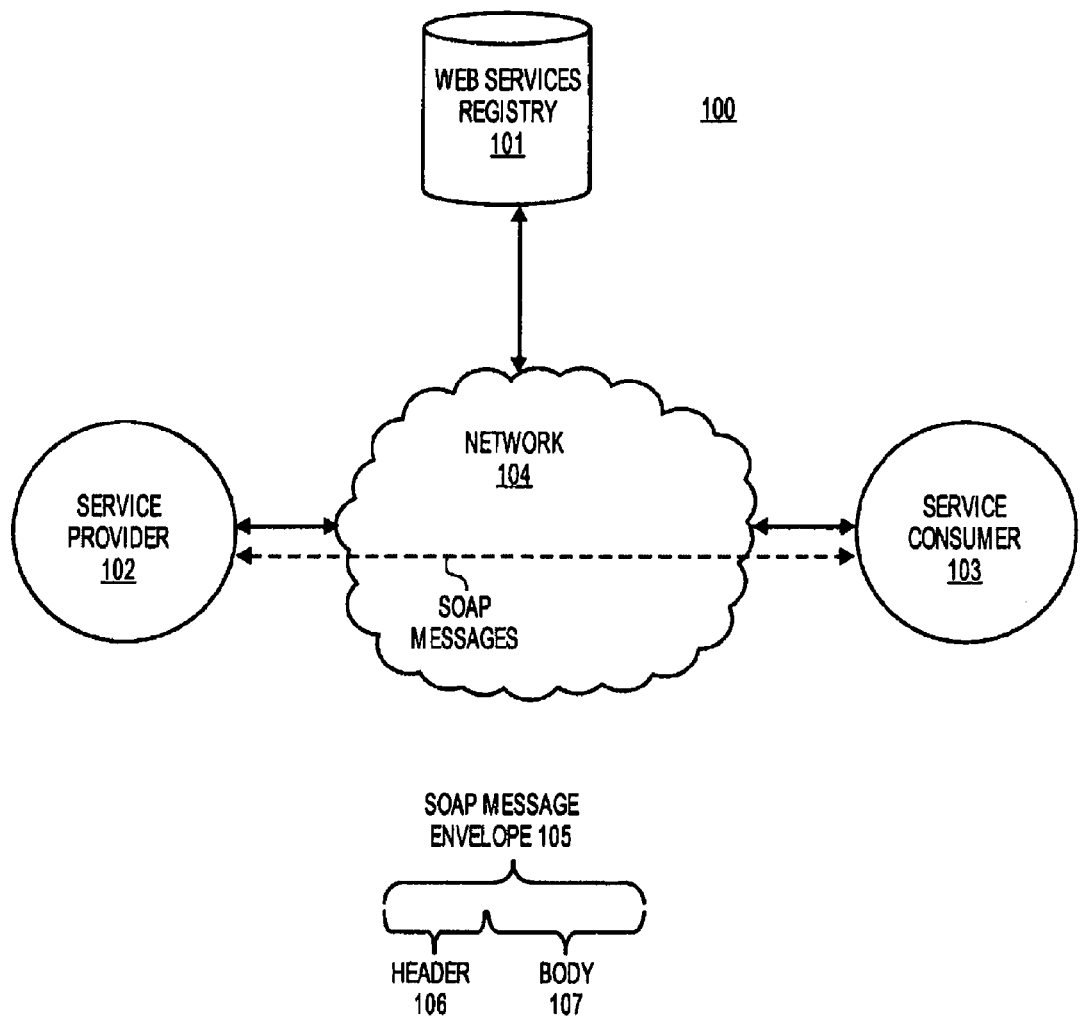
FIG. 1 shows a Web services model (prior art)
Figure 2:
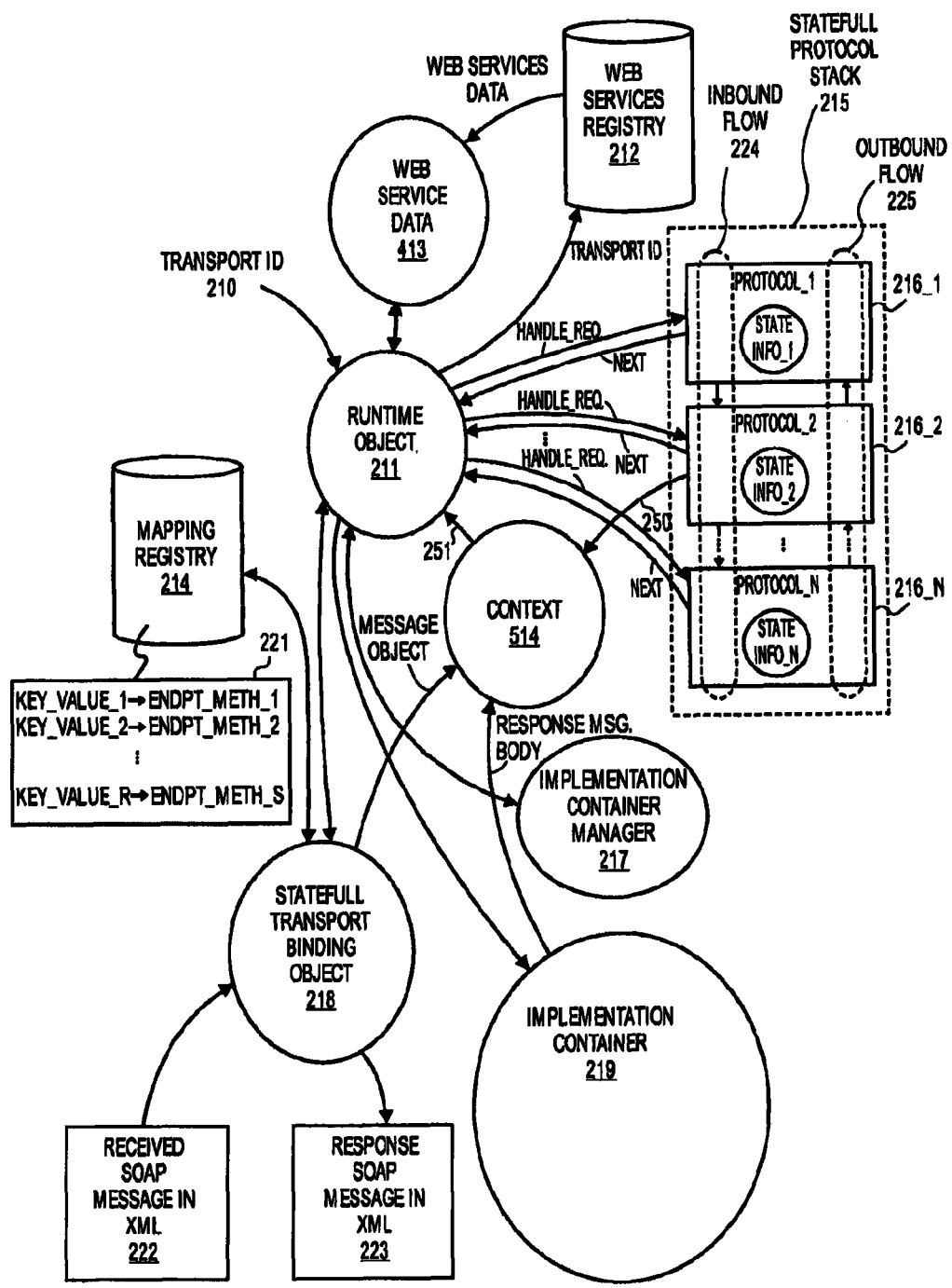
FIG. 2 shows a prior art Web services message processing runtime framework (prior art)
Figure 3:
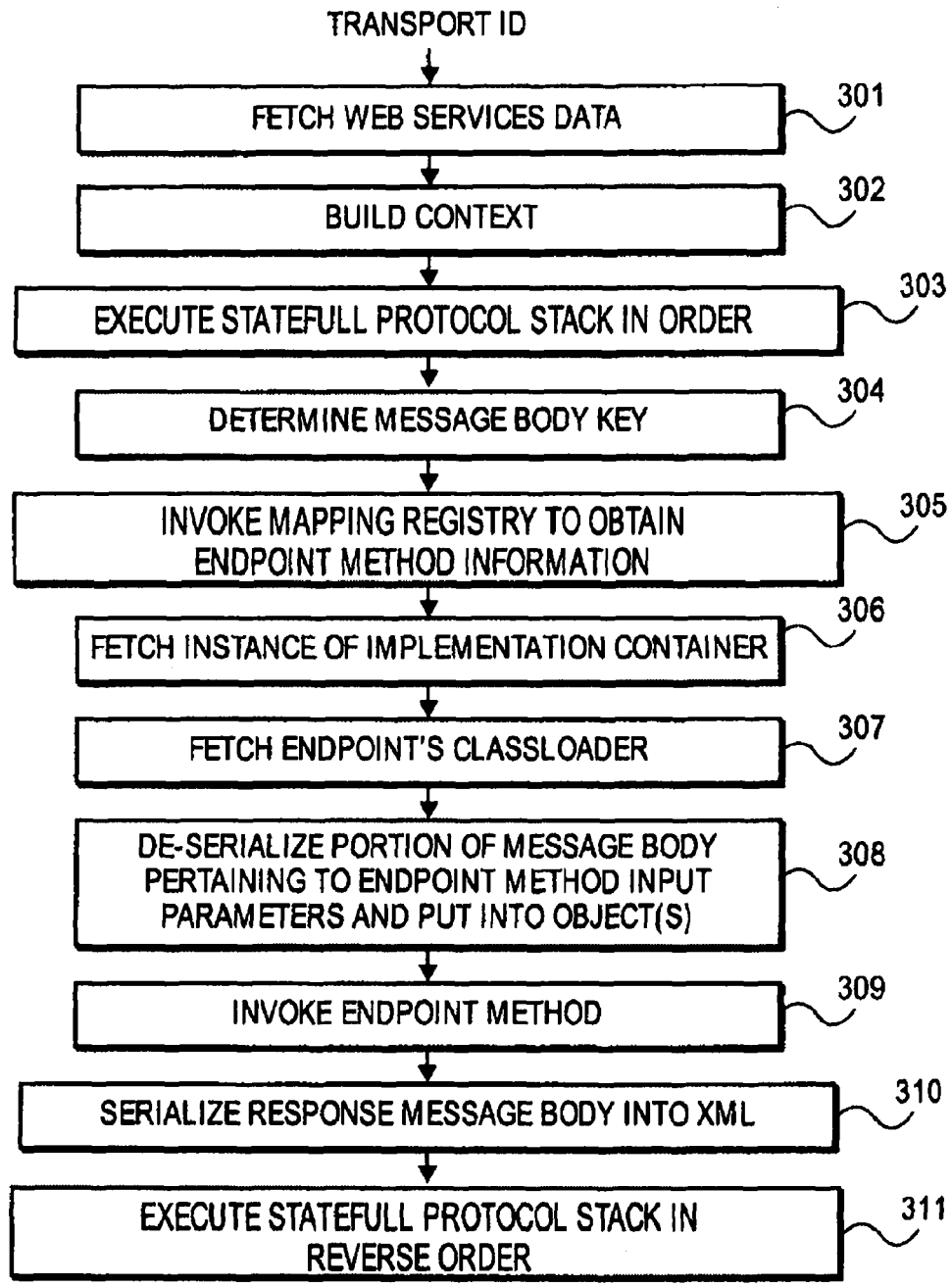
FIG. 3 shows a prior art method that the prior art runtime framework of FIG. 2 is designed to execute (prior art)
Figure 5:
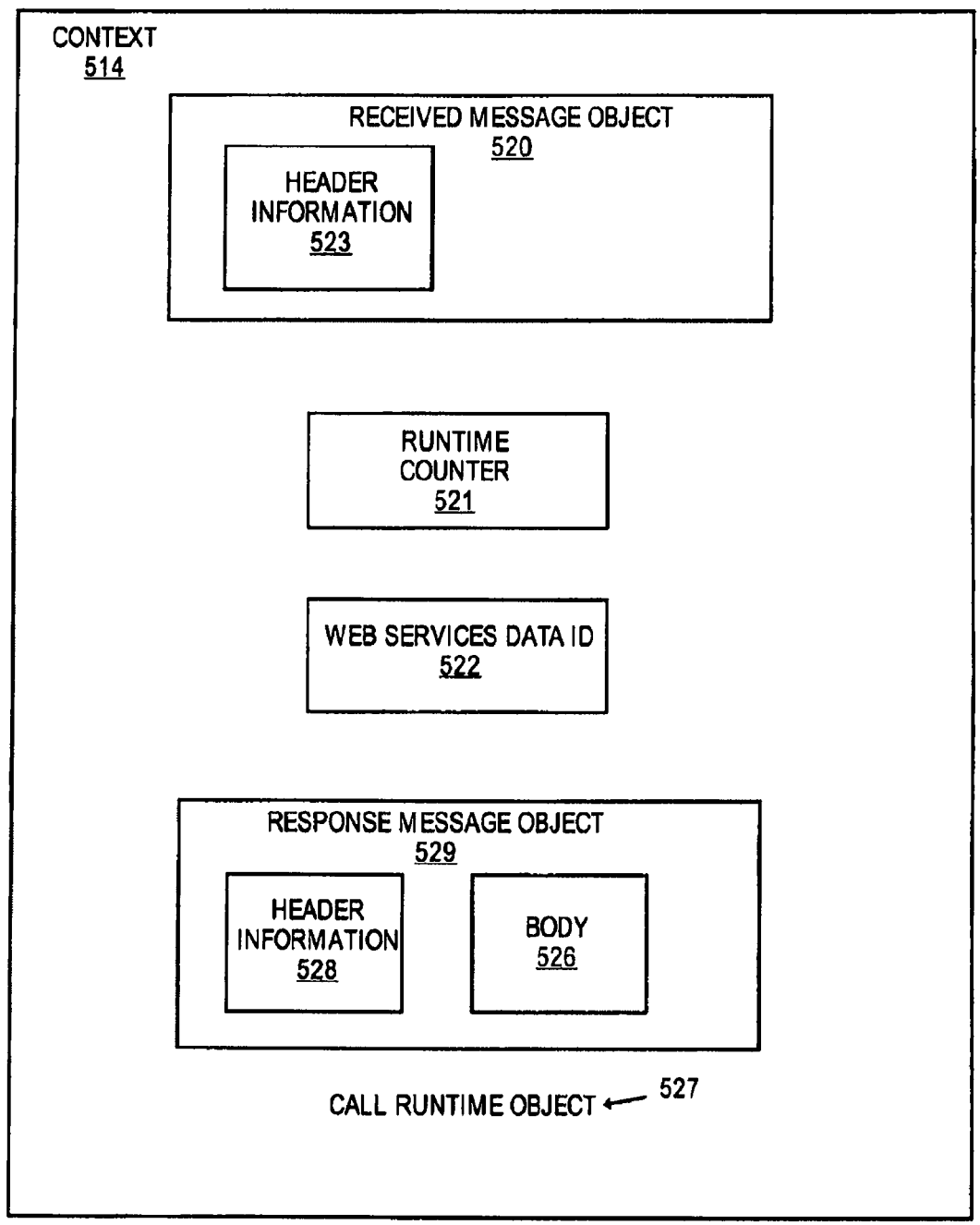
FIG. 5 shows context information used by the runtime framework of FIG. 2 to describe a particular message reception/response cycle (prior art)

With respect to the second improvement over the prior art runtime framework, the elimination of the context as a communicative intermediary between the protocols, note that FIG. 2 shows an "in-direct" method invocation 250, 251 being made upon the runtime object 211 by protocol 216_2 through the context 514. That is, the invocation 250, 251 is in-direct because it is made through the context (for which the method 527 offered by the context 514 of FIG. 5 was used). A protocol may need to invoke the runtime object 211, for instance, to identify the location of the Web services data 413 or another protocol.

By contrast, referring to FIG. 6, the improved runtime framework has been designed to permit a protocol to invoke the runtime object directly 650. Essentially, the prior art runtime framework was designed with the viewpoint that the context 514 would be the primary interface between the protocols and the remainder of the runtime framework so that the protocols and runtime framework could be re-designed as needed in future releases while still maintaining downward compatibility (e.g., an old protocol could still properly work with a new runtime object). However, because of the inefficiencies associated with in-direct communication from a protocol to the runtime object, direct communication is embraced in the new design. Downward compatibility is expected to be maintained by preserving legacy methods in the runtime object in its future releases.

With respect to the third improvement over the prior art runtime framework, the re-design of the protocols from being "state-full" to "state-less", generally, the execution of software code typically involves the assignment of specific values to certain variables. Software state information is basically viewed as any of these specific values as they exist at a specific moment during the software code's execution. State-full program code is software code that is designed to keep its software state information. State-less program code is software code that does not keep software state information (e.g., its coded methods are "fixed" so as to be incapable of comprehending any kind of "variable" information, or, the program code is configured to store its state information externally from itself (e.g., from a memory region reserved for the program code) or at least be able to have its state information externally stored from itself).

In the prior art framework, because the protocols were state-full, the protocols could not easily change their internal state from one received/response message pair process run to another. As such, once a protocol instance was directed to the servicing of a particular received/response message pair, that protocol instance could not be reapplied to another message pair (at least until its servicing of the first received/response message pair was complete). Thus, if ten separate processing runs were concurrently executed to simultaneously process ten different received/response message pairs, and, if each of these processing runs needed to use the "same" protocol (e.g., the WS-Security protocol), then, ten separate instances of this protocol had to be created (e.g., ten separate instances of the WS-Security protocol were created). Unfortunately, each instance of a protocol consumes its own associated portion of memory. For example, in the case of Java, each instance of a program is given its own region of memory for instance specific data that is used by the program's bytecode instructions. Thus, in the prior art approach, each time a new process run was started, a significant block of memory was reserved in order to "make room" for each of the protocol instances within the process's protocol stack. This hampered scalability/performance of the prior art runtime framework because "too many" concurrently attempted process runs resulted in too much memory being consumed.

State-less protocols, by contrast, can easily change their internal state from one process to another process. As such, a single protocol instance can more readily handle the processing for multiple, concurrently processed message pairs. As a comparison, recall that, in the prior art framework, ten concurrently processed received/response message pairs that used the same state-full protocol required the creation of ten separate instances of that state-full protocol. By contrast, in the improved framework, ten concurrently processed received/response message pairs that need to use the same protocol can be serviced with only one instance of a state-less version of that protocol. Essentially, in order to do this, at least in a Java environment, the single state-less protocol instance has data pertaining to a first particular message pair process run loaded into its reserved memory region. The state-less protocol executes its instructions, and then (e.g., after the execution of its instructions are finished), externally saves (as "state" information) data from its memory region into the first process's context. Then, the same state-less protocol instance can have data pertaining to a second process loaded into its memory region and the process repeats. Conceivably, a single state-less protocol instance could handle a "second" received/response message pair process run between its inbound flow handling and its outbound flow handling of a "first" received/response message pair process run. Because of the ease at which their internal state can be changed so as to apply to different processes, stateless protocols are also capable of supporting "hibernation", which, as elaborated on in more detail below, permits the improved framework to entertain the WS-Reliable Messaging protocol (which the prior art runtime framework did not support).

Here, recall from the discussion provided in the Background sub-section entitled "Web Services" that, at least in the context of SOAP messages, extensions have been built into the message format definition to account for certain business relationship behaviors that may desire them. Recall in particular that one such extension, referred to as the "WS-Reliable Messaging" extension has been defined that provides for proper ordering of SOAP messages at the SOAP message layer (i.e., "on top of" any underlying transport layer or protocol such as HTTP, TCP, etc.).

A basic upgrade to the prior art runtime framework would entail the development of another protocol that is designed to effect the WS-Reliable Messaging extension at least by keeping track of the proper order of received SOAP messages, and, properly rearranging the order of a group of received SOAP messages that arrived "out of order" before they were processed by the appropriate endpoint. FIG. 6 shows a scheme for implementing such a protocol.

Figure 10:
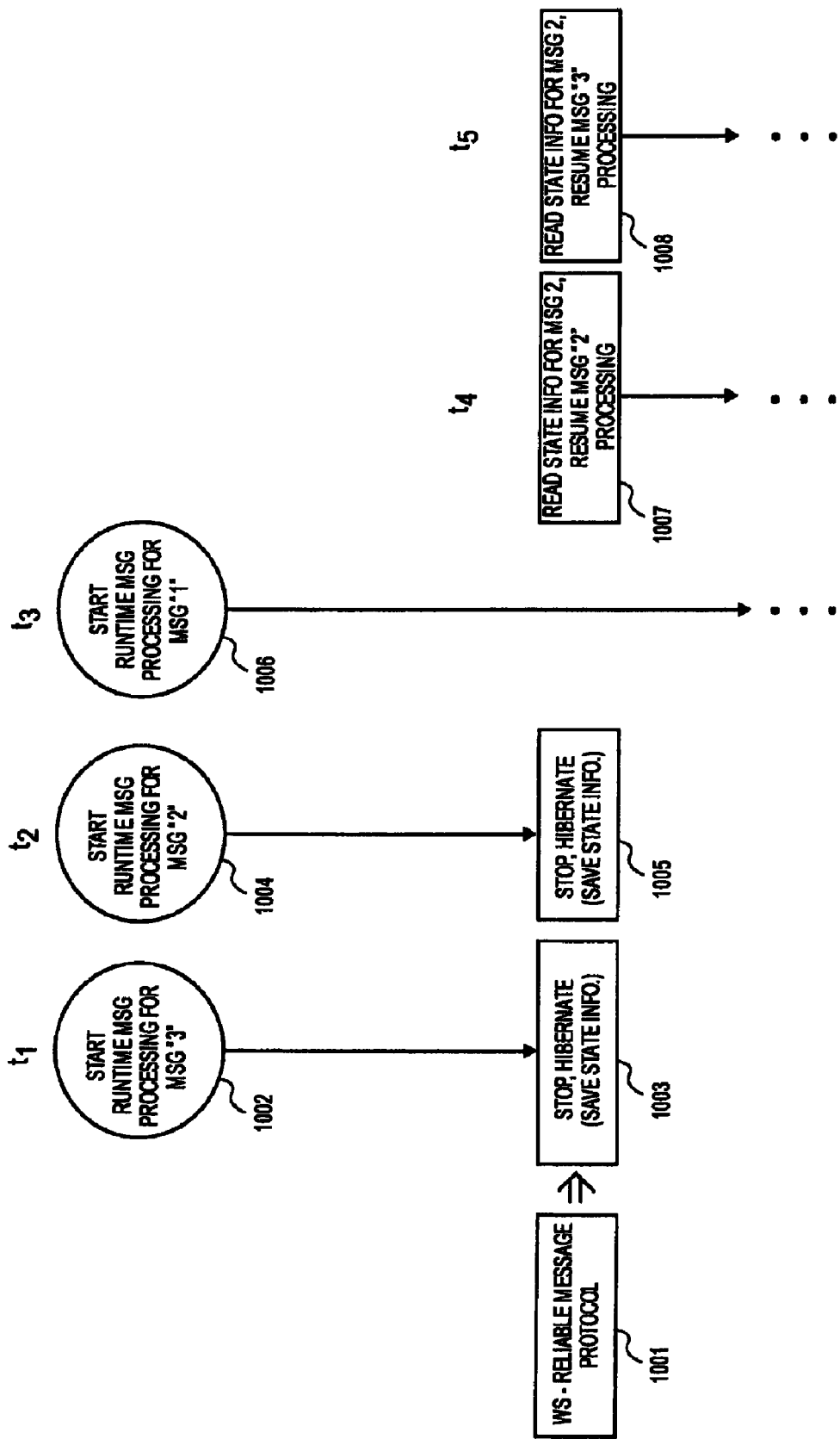
FIG. 10 shows a hibernation process that is supported by the runtime framework of FIG. 6.

FIG. 10 shows exemplary processing performed by a WS-Reliable Messaging protocol 1001 for a Web service having three messages that arrive "out of order". According to the example of FIG. 10, first, "message 3" arrives, then, "message 2" arrives, then, "message 1" arrives. That is, the ordering of the messages in their arrival is 3, 2, 1—and—the "proper" order should have been 1, 2, 3. According to the example of FIG. 10, the runtime object commences processing for the first message to arrive (message 3) at time t1.

Because the protocol stack for the Web service is responsible for executing the received message's header information, it is not recognized that message 3 corresponds to an "out of order" message until the WS-Reliable Messaging protocol 1001 in the Web service's protocol stack executes. During the execution of the WS-Reliable Messaging protocol 1001 for message 3, the protocol 1001 discovers that message 3 is out of order, and, places the message processing run for message 3 into "_hibernation" 1003. A stateless protocol program code instance that can externally store its state information is able to easily hibernate a message processing run by externally storing its state information so as to suspend its execution for the processing run. Then, sometime after the hibernation, the protocol program code instance can seamlessly continue the messaging processing run as of the moment it was hibernated by reading back into itself the stored state information and restarting execution. Importantly, the protocol program code instance itself need not be suspended too. Once the state information for a particular received/response message pair is saved, the instance of program code can be re-applied to work on another message processing run. Continuing with the example, sometime after time t1, the runtime object commences processing 1004 for the second message to arrive (message 2) at time t2.

During the processing of message 2, the WS-Reliable Messaging protocol for the Web service discovers that message 2 is also out of order, and, also places the processing for message 2 into hibernation 1005 (by externally saving its state information). Sometime after time t2, the runtime object commences processing 1006 for the third message to arrive (message 1) at time t3. Because message 1 is the appropriate "next message to be processed", the protocol 1001 does not recognize any problem and permits the message processing for message 1 to continue. The protocol 1001 also causes the hibernated processes for messages 2 and 3 to be restarted such that the processing for message 2 resumes 1007 (at time t4) before the processing for message 3 resumes 1008 (at time t5). Here, the restarting of the processes for each of messages 2 and 3 involves the reloading of their respective state information into the protocol 1001 (e.g., just before time t4 for message 2 and just before time t5 for message 3).

Figure 11:
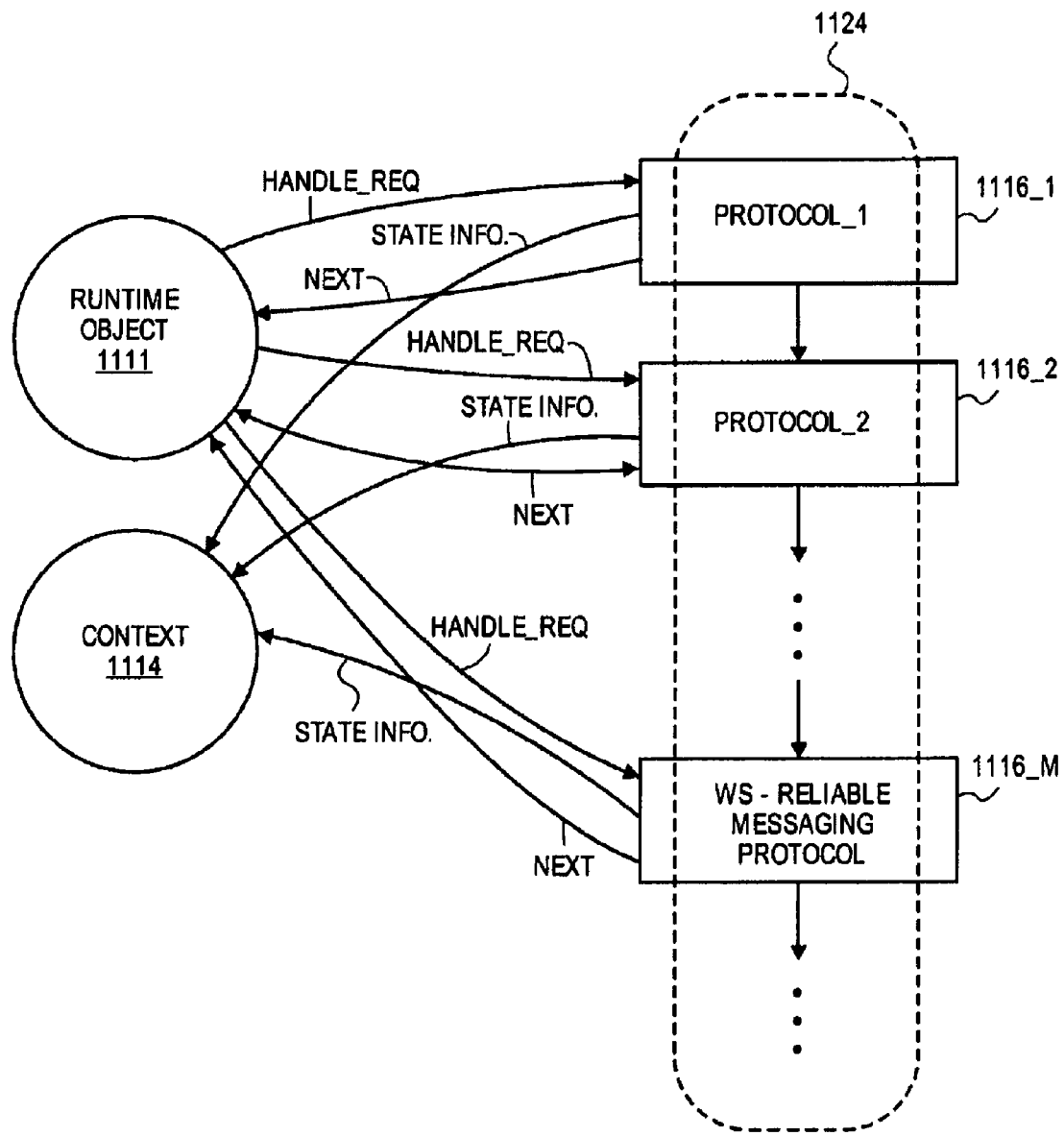
FIG. 11 shows protocols within a protocol stack externally storing their state information into a message reception/response cycle's context.

With these concepts in mind, FIG. 11 shows a new protocol stack inbound process flow 1124. According to the depiction of FIG. 11, the first protocol 1116_1 receives a HANDLE_REQUEST command from the runtime object 1111, and, commensurate with (e.g., just prior to) the first protocol 1116_1 providing the runtime object 1111 with a NEXT response to confirm its successful execution, the first protocol 1116_1 stores its state information into the process run's context information 1114. This procedure continues at least for each subsequent protocol that precedes the WS-Reliable Messaging protocol (depicted in FIG. 11 as protocols 1116_2 through 1116_M), and, may continue for any protocol that follows the WS-Reliable Messaging protocol in the protocol stack's inbound flow 1124.

Figure 9:
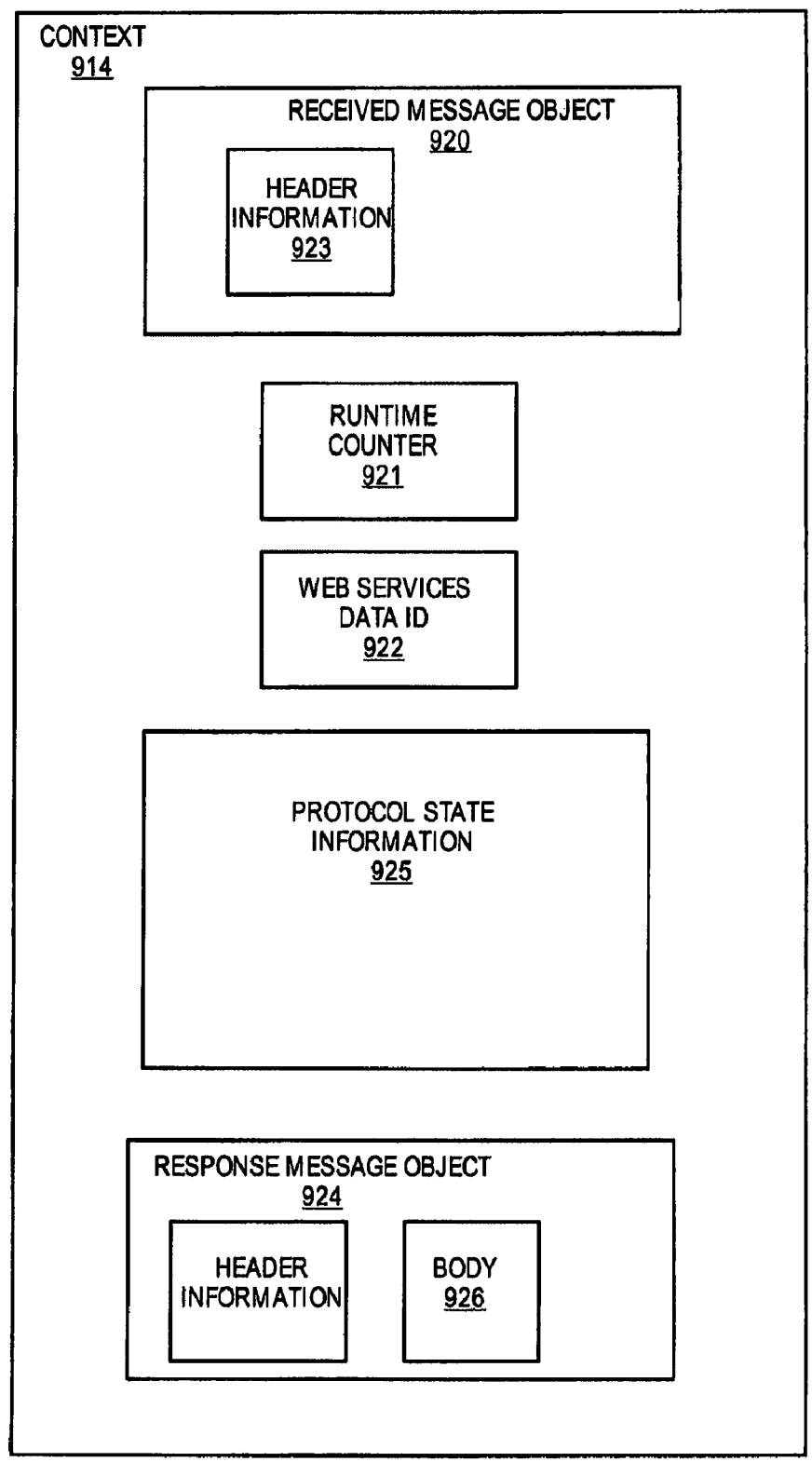
FIG. 9 shows context information used by the runtime framework of FIG. 6 to describe a particular message reception/response cycle.

FIG. 9 shows new context information 914 that supports the processing described above. Note that unlike the prior art context information 514 depicted in FIG. 5, the context information depicted in FIG. 9 includes protocol state information 925. In an implementation, the protocol state information can be saved in the context as serialized information (e.g., a byte array, a string, etc.) in order to promote its ability to be persisted (e.g., written to a deeper form of storage than cache or local memory such as hard disk file, a database, etc.) during hibernation.

Note that even though the "WS-Reliable Messaging" title is recognized as being pertinent to a SOAP message format extension, is believed that the concepts outlined above could conceivably be applied to messages that are not regarded as SOAP messages. The term "reliable messaging protocol" is therefore intended not to be restricted solely to protocols that only contemplate SOAP messages. A description of the WS-Reliable Messaging protocol is described in more detail immediately below.

It is believed that the runtime framework herein described may be used with subsequent revisions of the existing common WS specifications, including, but not limited to, WS-Reliable Messaging, WS-Security, and WS-Addressing.

WS Reliable Messaging Protocol

Transactions across a network (including local area networks (LANs) and the Internet) from a source endpoint to a destination endpoint may be disrupted including messages being lost, corrupted, duplicated, and/or received out-of-order. While the factors causing these disruptions are beyond the scope of this document these disruptions still need to be handled effectively and efficiently in Web services systems. A standard Web Services Reliable Message Protocol specification (WS-ReliableMessaging) has been authored to fulfill these needs and serves as a building block for varying Web services implementations. In addition to providing for reliable message transactions, the WS-ReliableMessaging specification allows for different Web services implementations to interact with each other (for example, this allows for communication between J2EE implementations and .NET implementations). As of the time of this writing, the complete common WS-ReliableMessaging specification can be found at http://specs.xmlsoap.org/ws/2005/02/rm/.

During execution of any WS-ReliableMessaging protocol an identifier for the group of messages to be transmitted between the source and destination is applied to each message. This identifier is referred to as the sequence identifier (sequence ID). The sequence ID uniquely identifies the group of messages transactions. The sequence ID is used because at any given point in time an endpoint may have more than one group of messages being received or sent. Almost all of the messages transmitted using WS-ReliableMessaging use a sequence identifier (the exception being the first message sent from the source which requests a sequence ID from the destination). Each reliable message sent from the source also includes a message (or sequence) number. This number is used to determine what order of the messages received should be in and/or to determine if all of the messages have been received. Messages are sent one at a time from the source to the destination endpoint.

A few conditions are to be adhered to according to the current common specification. These conditions include: 1) the source must have an endpoint reference that uniquely identifies the destination endpoint; 2) the source must have knowledge of the destination's policies and be capable of adhering to these policies; 3) if secure exchange is required, both the source and destination must have the appropriate security capabilities; 4) the source must assign each reliable message a sequence number; and 5) every acknowledgement issued by the destination must include a sequence number range of every message successfully received and exclude sequence numbers not yet received.

As described above, the state-less reliable messaging protocol has a standard interface that essentially "hides" from other applications the changes to the content of the WS-ReliableMessaging specification information that may evolve over time. That is, the state-less reliable messaging protocol may be re-designed if necessary to adapt to changes made to the applicable specifications that define the content of the WSReliableMessaging common specification, while, maintaining at the interface methods that may be invoked by legacy software applications.

Figure 12:
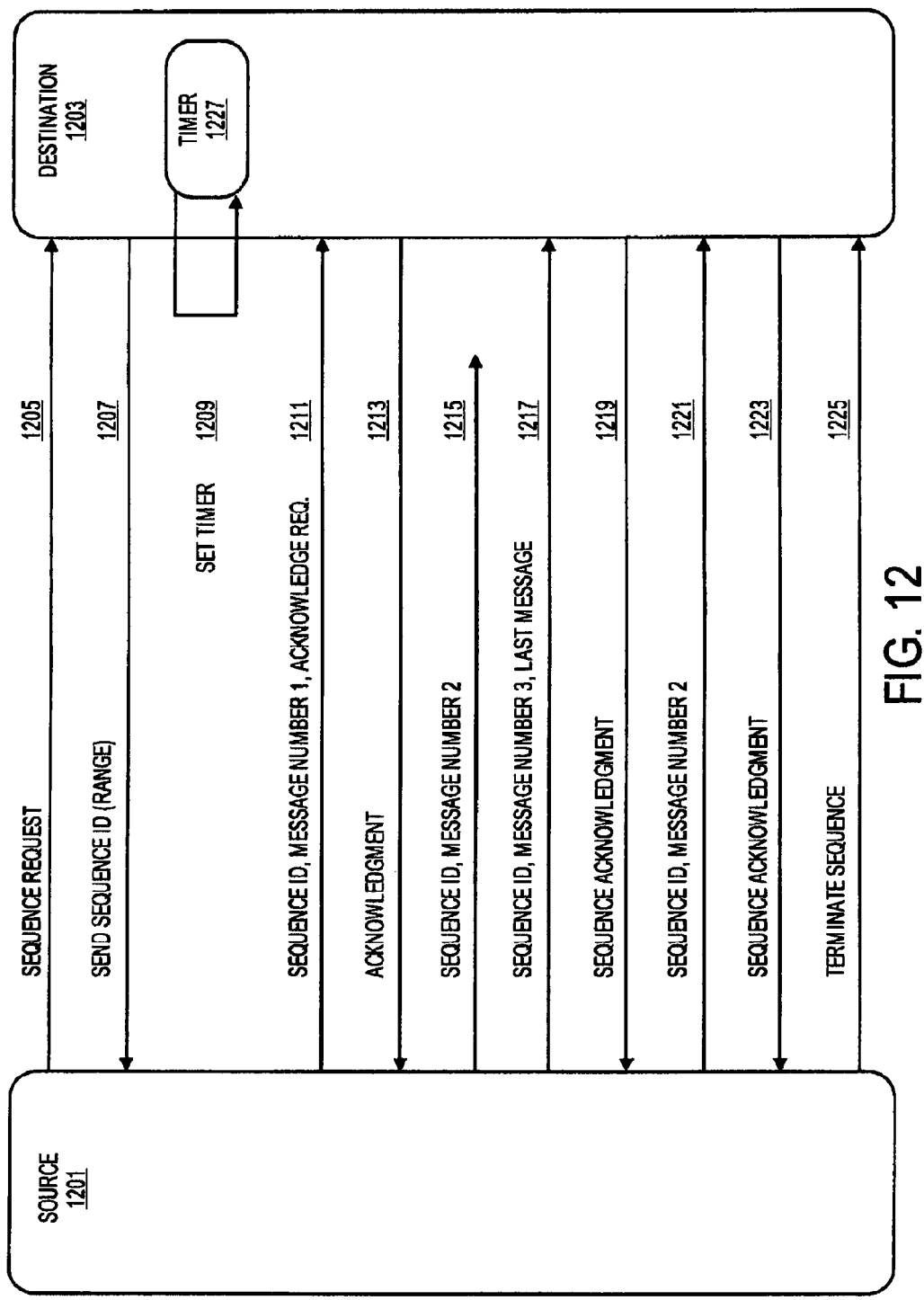
FIG. 12 shows a message exchange between endpoints whose messages are processed with a Web Services Reliable Messaging protocol.

FIG. 12 depicts an exemplary execution reliable message exchange between endpoints using a state-less WS-ReliableMessaging protocol (SL WS-RM). Each of the endpoints (source/consumer 1201 and destination/provider 1203) has invoked its version of the SL WS-RM. At 1205, the source endpoint 1201 makes a sequence request. A sequence request involves asking for a sequence ID from the destination endpoint 1203. The destination endpoint 1203 creates a sequence response, including the sequence ID, and transmits this response to the source 1001 at 1207. For example, the sequence ID "http://www.sap.com/webserviceappl" may be created by the destination 1203 and transmitted to the source 1201 and will be used by all of the messages transmitted from either endpoint relating to a common group of messages.

In one embodiment, the destination 1203 includes a timer 1227 to monitor the duration between messages received. If the duration is too long, the duration will terminate the messaging sequence (for example, if the timer 1227 expires the messaging sequence will end and the source 1201 will have to request another sequence ID). At 1209, this timer 1227 is invoked and begins monitoring the duration between messages from the source 1201 to the destination 1203.

With a proper sequence ID the source 1201 may transmit messages to the destination 1203. As required by the common specification, the first message from the source 1201 is labeled as "message number 1" with each subsequent message increasing by one in value (for example, the next message will be "message number 2", etc.). At 1211, the source transmits its first message to the destination. In this illustration the source 1201 has also requested an acknowledgement from the destination 1203 that it received "message number 1." At 1213, the destination 1203 transmits an acknowledgement to the source 1201. In one embodiment, the source 1201 waits until an acknowledgement is received before transmitting the next message.

At 1215, the source 1201 transmits "message number 2." However, in this example "message number 2" does not reach the destination 1203. As the source 1201 did not request an acknowledgement be sent by the destination 1203, the source 1201 does not know that the message did not reach its intended target. The third and final message is sent from the source 1201 at 1217. The destination returns an acknowledgement at 1219 to the source 1201. This acknowledgement includes the message numbers of those messages received. In this scenario it does not include "message number 2." The source 1201 knows that "message number 2" did not reach the destination 1203 and retransmits "message number 2" at 1221. The destination returns an acknowledgement at 1223 to the source 1201 that all of the messages ("message number 1", "message number 2", and "message number 3") have been received. With all of the messages received by the destination 1203, a terminate sequence command is transmitted at 1225 by the source 1201.

Figure 15:
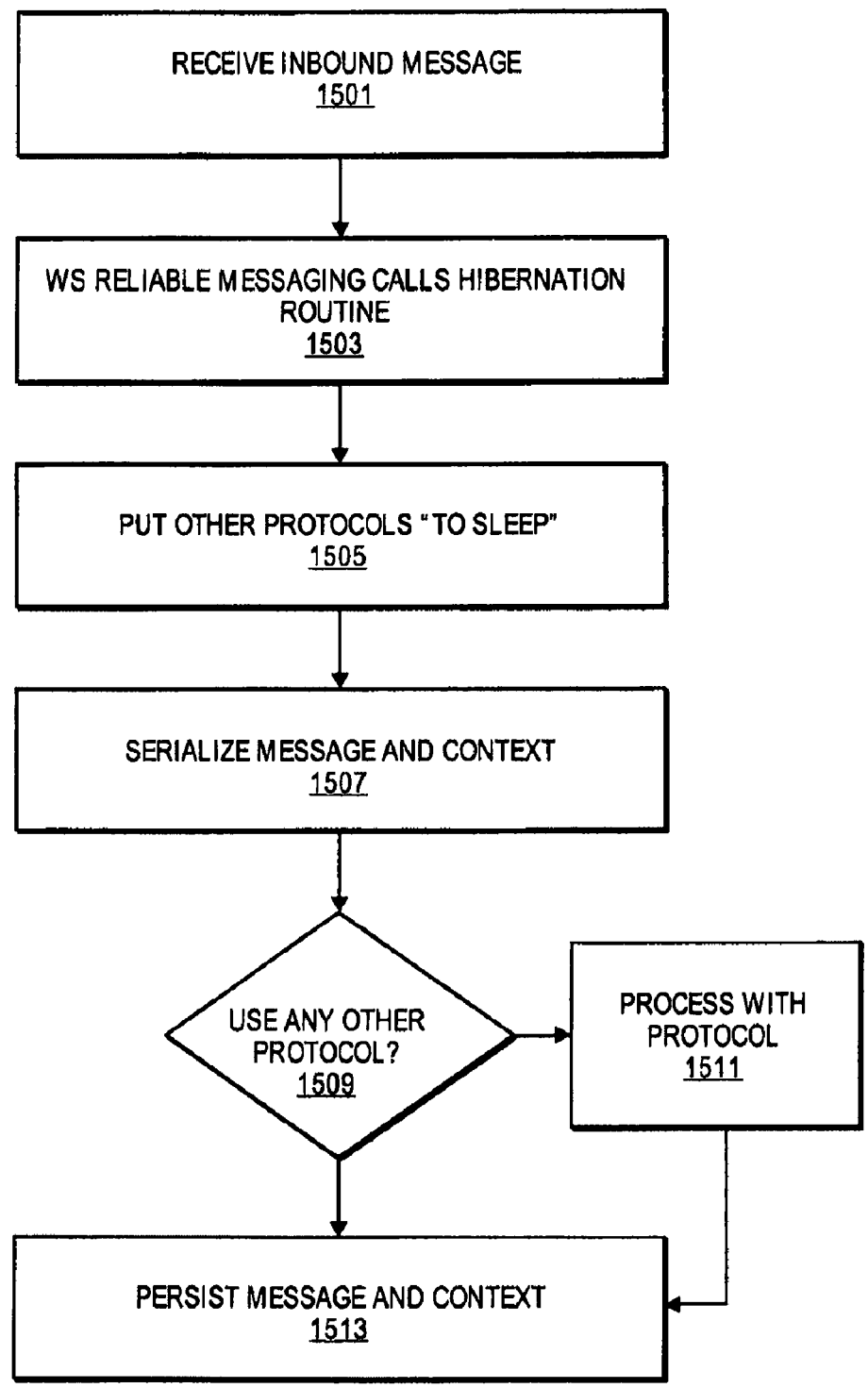
FIG. 15 depicts an exemplary flow of going into hibernation on the inbound side of a received message.

Because of the state-less nature of the protocols, each message that is managed by SL WS-RM in an out-of-order fashion is hibernated as necessary. FIG. 15 depicts an exemplary flow of the use of state-less WS RM during runtime execution. The state-less runtime execution invokes a messaging system 1519 that includes a processing array 1521 (which can be viewed as a kind of queue or table). In one embodiment, the messaging system 1519 is a J2EE engine service, which implements abstract message processing and includes features needed for the SL WS-RM such as persistence, quality of service processing, event handling, message life cycle management, web UI monitoring and etc.

As requests are made (messages are either being received or sent), the processing array 1521 is used to properly order the execution of these requests and/or record which requests have been already handled. By recording which requests have been handled, the messaging system 1519 knows what messages have been sent (or received) and therefore is able to generate the proper acknowledgements required by the common specification for ReliableMessaging. In one embodiment, each request is placed in the array 1521, the request hibernated, and no further processing is done until all of the requests of a group of requests have been made.

For example, if the request is for processing outbound messages it may be beneficial to wait until all of the requests are in the array 1521. If a problem occurs which causes the group to not be prepared correctly it would be a waste of resources (processing time, network bandwidth, etc.) to send out messages when the group would not be complete. In another embodiment, requests that are in the proper order are processed immediately and the array is updated to show that the status of the request is that it has been fully processed. Those that are out-of-order are hibernated (again still noting in the array the status of the request) until it is proper to fully process them.

Figure 13:
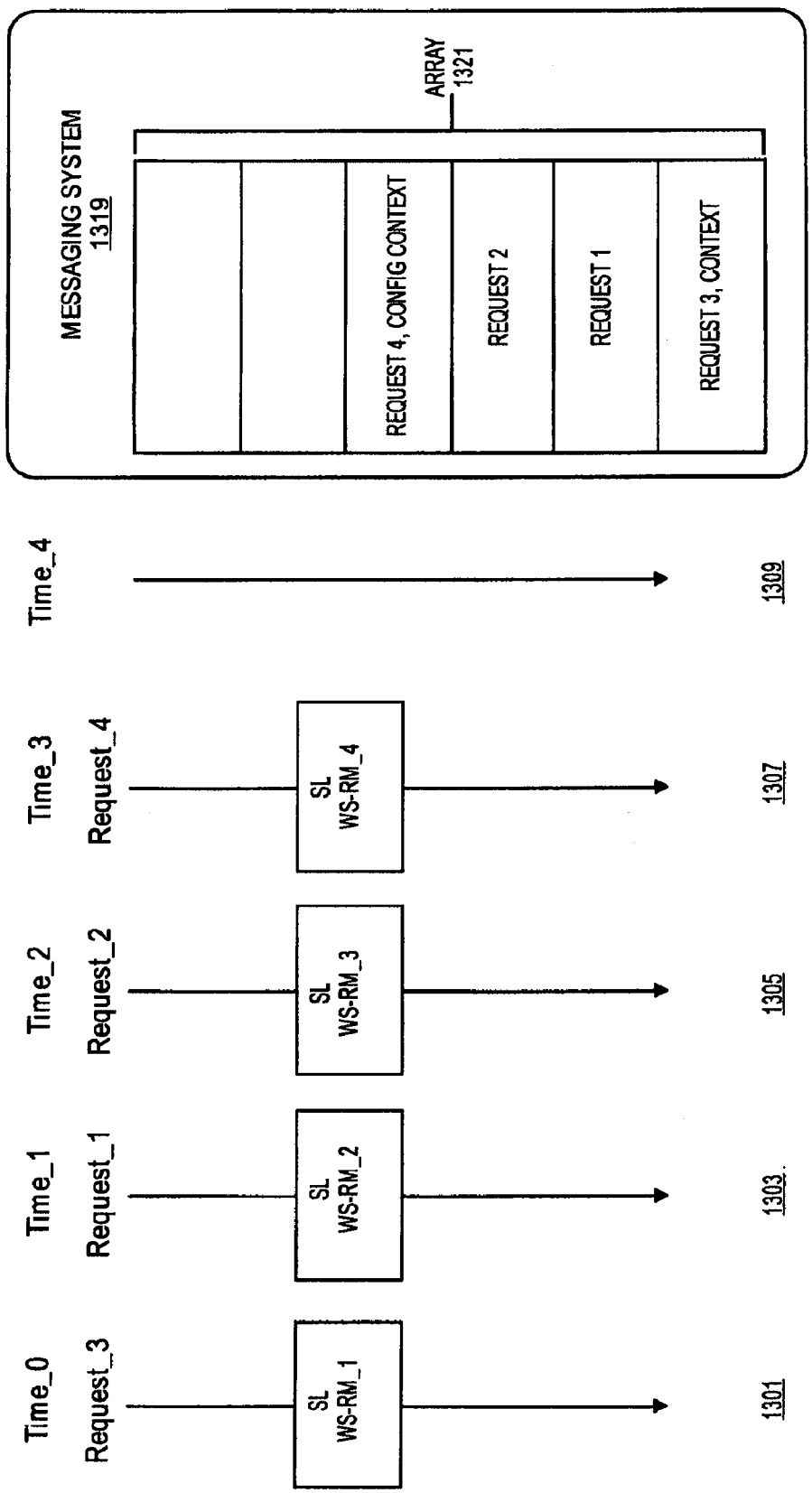
FIG. 13 shows a hibernation sequence supported by a messaging system.

According to the example of FIG. 13 only those messages that are out-of-order are hibernated. At Time_0 1301 Request_3 is managed by SL WS-RM_1, the first protocol context instance of the SL WS-RM protocol. Request_3 is the third request from the group of requests. Since Request_1 and Request_2 have not been processed, Request_3 is hibernated and the array 1321 is updated to reflect this. Accordingly, its "state" is now saved in the context to be processed later. At Time_1 1303 (a point later in time), Request_1 is managed by SL WS-RM_2. Request_1 is processed immediately and the array 1321 updated to reflect that status. At Time_2 1305, Request_2 is managed and should be processed like Requesc1 was processed at Time_1 1303. At Time_3 1307, Request_4 is managed by SL WS-RM_3. However, Request_4 should not be immediately processed unless Requesc3 has been awakened from hibernation and fully processed. Therefore, if Requesc3 has not been fully processed at Time_3 1307 Request_4 is hibernated and the array 1321 is updated to reflect this status. At Time_4 1309, Request_3 is awakened and fully processed. After Request_3 has been fully processed Request_4 is awakened to complete its processing. It should be understood that one request may be hibernated while another is being processed.

Hibernation

In this section the hibernation of the runtime will be discussed. This is a procedure that state-less WS-RM may call to place a protocol operation into a suspended state. During hibernation, the current state of a Web services (inbound or outbound side) is persisted and at a later point of time the processing can be resumed from the previously saved state.

Figure 14:
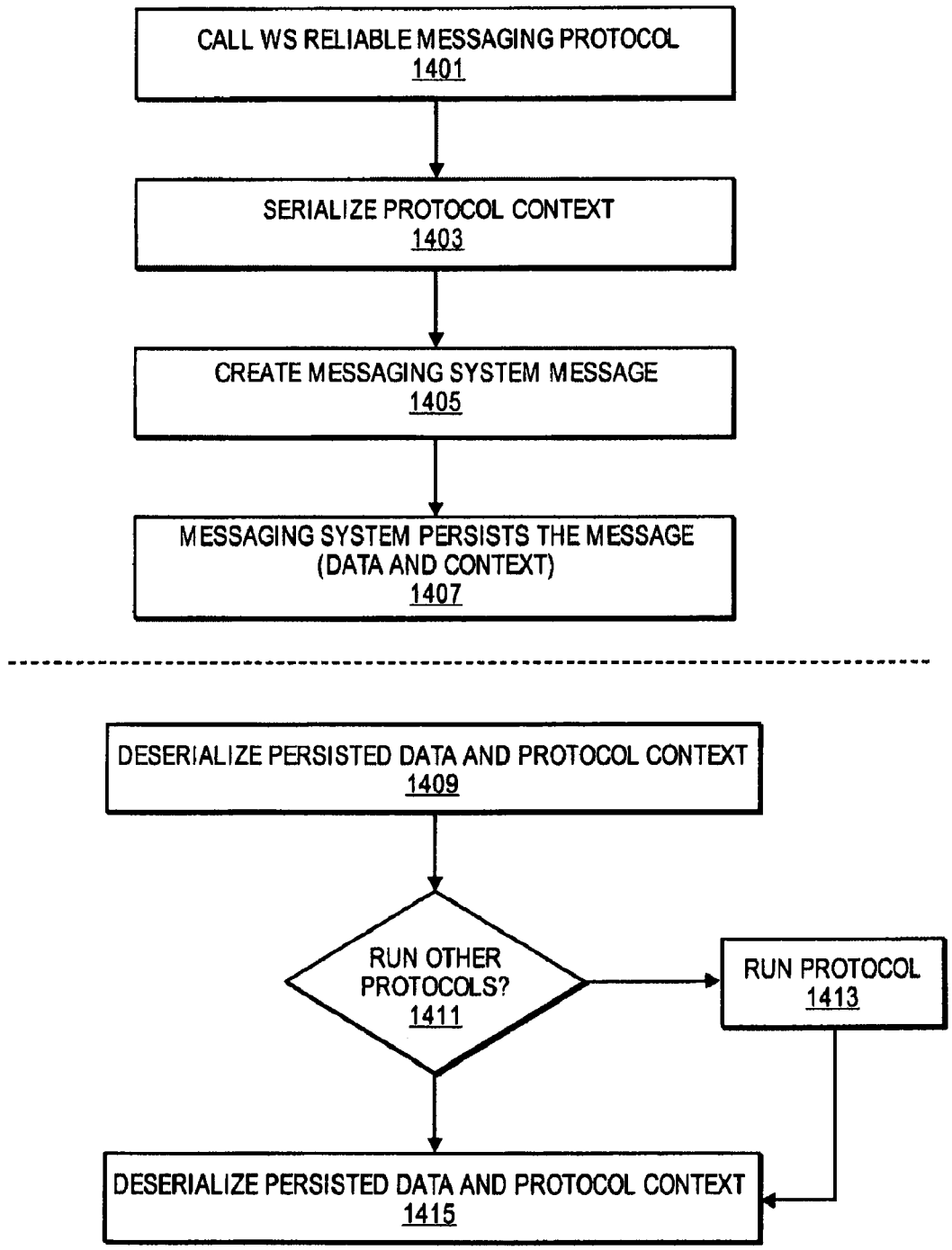
FIG. 14 depicts an exemplary hibernation flow on the outbound side for a Web service employing state-less protocols.

FIG. 14 depicts an exemplary hibernation flow (including putting the message to "sleep" and "waking up" the message to resume processing) on the outbound side for a Web service employing state-less protocols. The SL WS-RM is called by the runtime at 1401 (if it has not already been invoked), which creates a "protocol context instance" of the SL WS-RM protocol. At 1403, the SL WS-RM protocol context instance and message data (payload) are serialized. The protocol context instance includes the state information of the protocol (and any other protocols) needed to resume processing of the particular message at a later point in time. In an embodiment, other protocol context instances may be hibernated with or without SL WS-RM information. The message data may include the body of a message (for example, a SOAP message body), header information, and/or attachments to the message (for example, a DIME attachment). In this case "serialization" is the well-known process of saving an object to a sequence of bytes referred to as a "byte array".

A complete Messaging System (MS) message that contains the serialized protocol instance context, serialized message data, and information used by the MS is created at 1405. For example, in one embodiment, a SL WS-RM MS message contains the following WS-RM specific data found in the SOAP headers: the sequence ID, message number, and last message flag. Some additional information may be applied to the MS message regarding WS-RM configuration (WS-RM policy) such as: expiration timeout, retransmission/retry interval (relevant for the consumer side), acknowledgement interval (relevant for the provider side), delivery assurance mode, and exponential backoff algorithm flag (for the retransmission in the consumer side). This MS message is persisted at 1407 and the message is considered hibernated. In a further implementation, a portion of the context 914 is utilized for storing serialized MS messages. In one embodiment, the MS message does not include serialized message data. The message data is instead left in its XML form. This message data is either ignored or saved in another manner. Persisting messages on the outbound side allows for quick regeneration of messages that may have already been sent but need to be retrieved again. For example, if a message does not reach its intended target it is much quicker to regenerate the message from its hibernated state than to recreate a completely new message with the same information. In some cases it may be impossible to even recreate a message at all unless it has been hibernated first. The MS records hibernations. For example, the MS records that a message has been persisted. This recordation may include placing a record of this hibernation in the array 1521. Recordation serves at least two purposes: 1) allowing for proper acknowledgements to be generated, and 2) providing a reference to the storage location of the persisted message. For example, the record may contain information including the identification of the object context being operated on.

Messages that are hibernated at some point later in time may be awakened to continue processing and be sent to an endpoint. The MS sends an event to the SL WSRM layer to begin this wake up process. The persisted MS message is retrieved and the persisted data and context is deserialized at 1409. The context allows the protocol context instance of SL WS-RM to resume where the processing was left off before hibernation. The data of the message is serialized at 1411. At 1413 it is determined if other protocols should be run on the message (for example, a Headers protocol to insert message header information, a WS-Security protocol to add message security, etc.). These protocols are run at 1415 prior to the message being sent out. If no protocols need to be run or after the protocols have been run at 1415 the message is transmitted to the endpoint at 1417.

Hibernation may also be used on the inbound side in a state-less implementation. FIG. 15 depicts an exemplary flow of going into hibernation on the inbound side of a received message. An inbound message is received at 1501 by the WS runtime and some preliminary processing is done (for example, calling the Headers protocol to read the message's headers). A protocol context instance of SL WS-RM calls the SL WS-RM hibernation routine at 1503. All other protocol instances are put to sleep at 1505 by the WS runtime. Their configuration contexts are persisted including anything that may be necessary to help wake them up at a later time. In one embodiment, these configuration contexts are serialized prior to the protocols being put to sleep. The message that was received by the WS runtime is serialized at 1507. This serialization includes converting into a sequence of bytes both the context of the protocol and data (payload) of the message. In one embodiment, the MS message does not include serialized message data. The message data is instead left in its XML form. This message data is either ignored or saved in another manner. At 1509 it is determined if any other protocols should be run (for example, a WS-Security protocol). These protocols are run at 1511. The serialized data and context are persisted (a MS message) at 1513 by the MS and the MS records that the message has been persisted (for example in the array 1521). In a further implementation, a portion of the context 914 is utilized for storing serialized MS messages and the configuration contexts of the other protocols put to sleep at 1505. With the MS message persisted the WS runtime no longer processes the message.

Figure 16:
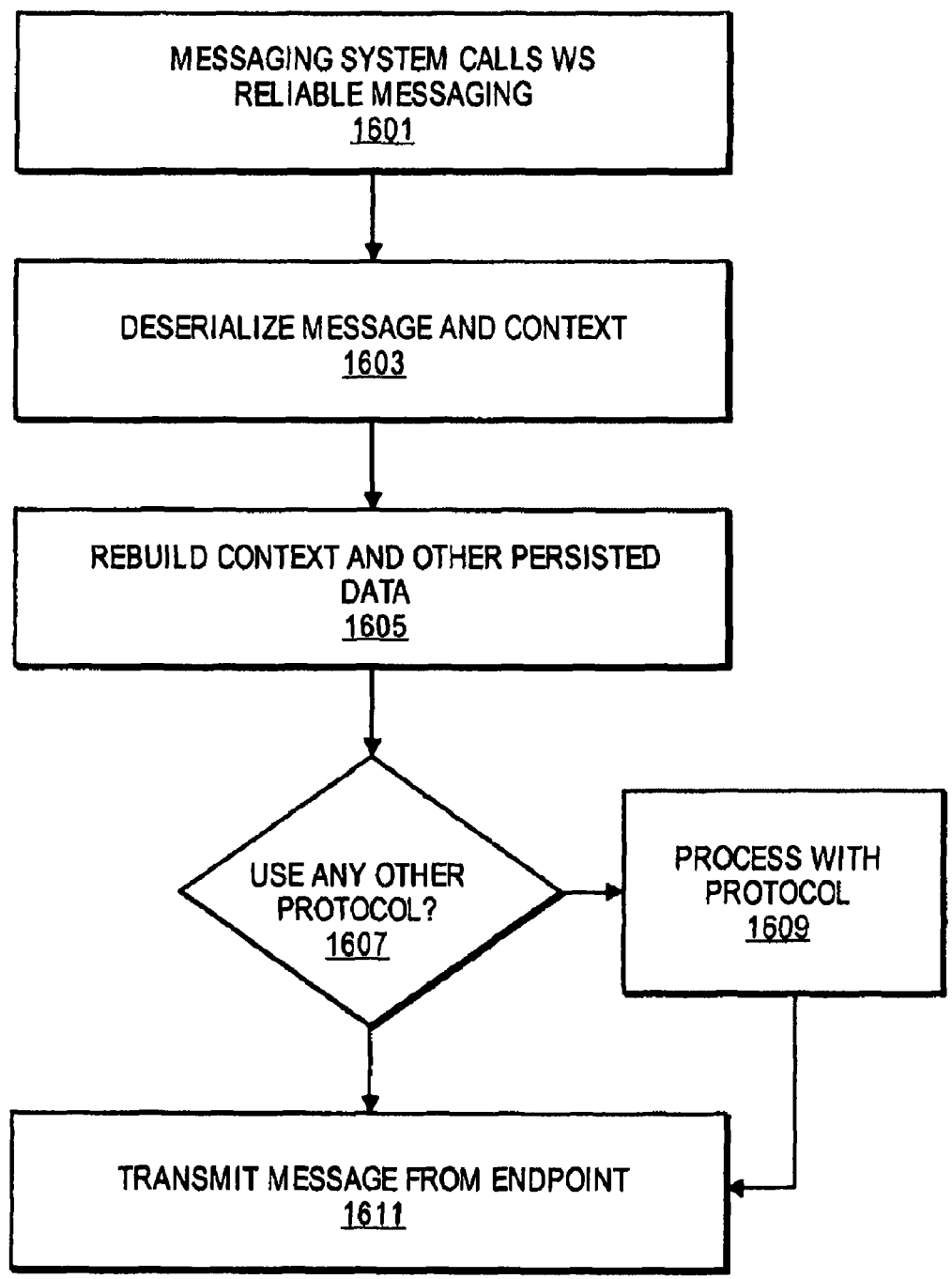
FIG. 16 depicts an exemplary flow of restoring from hibernation on the inbound side.

At some point later in time the message will be restored from hibernation. FIG. 16 depicts an exemplary flow of restoring from hibernation on the inbound side. The MS calls SL WS-RM at 1601 and a protocol context instance of SL WS-RM is created and begins the restoration of a message that has been hibernated. The MS sends an event to the WS RM layer to begin this wake up process. The persisted MS message is retrieved by the WS runtime and the persisted data and context are deserialized at 1603. The configuration context and other persisted data are rebuilt at 1605. A new thread is created for this configuration context to be processed at 1607. In this thread other protocols may be invoked at 1611 for further processing of this message if deemed necessary at 1609. For example, the Headers protocol may be invoked so that header information from the message can be provided to the message's endpoint. The complete message (all protocols have been invoked that needed to be) is then processed by the message's endpoint and a response message is transmitted 1613 to an endpoint.

Headers Protocol

Figure 17:
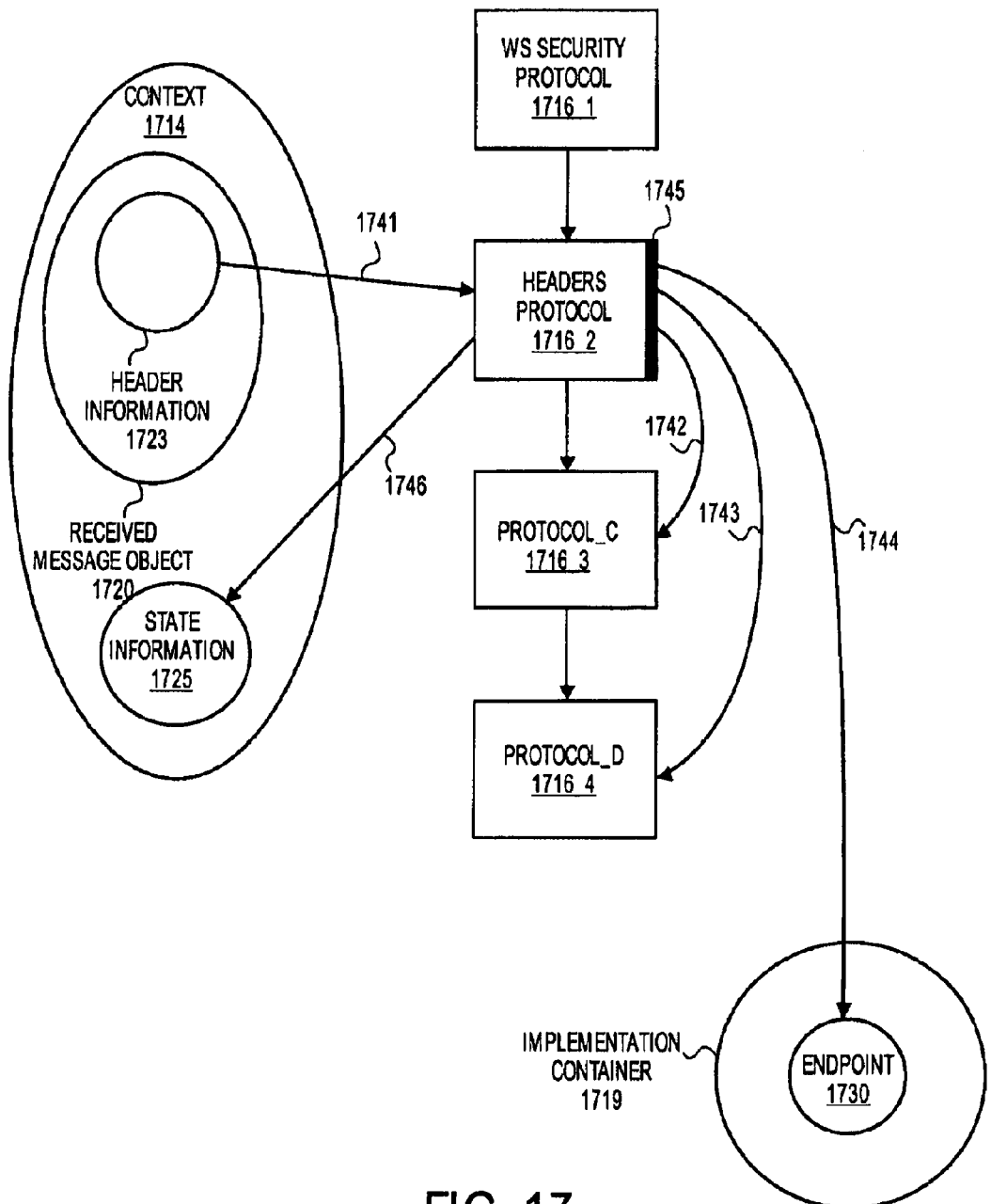
FIG. 17 depicts inbound processing with a Headers protocol.
Figure 18:
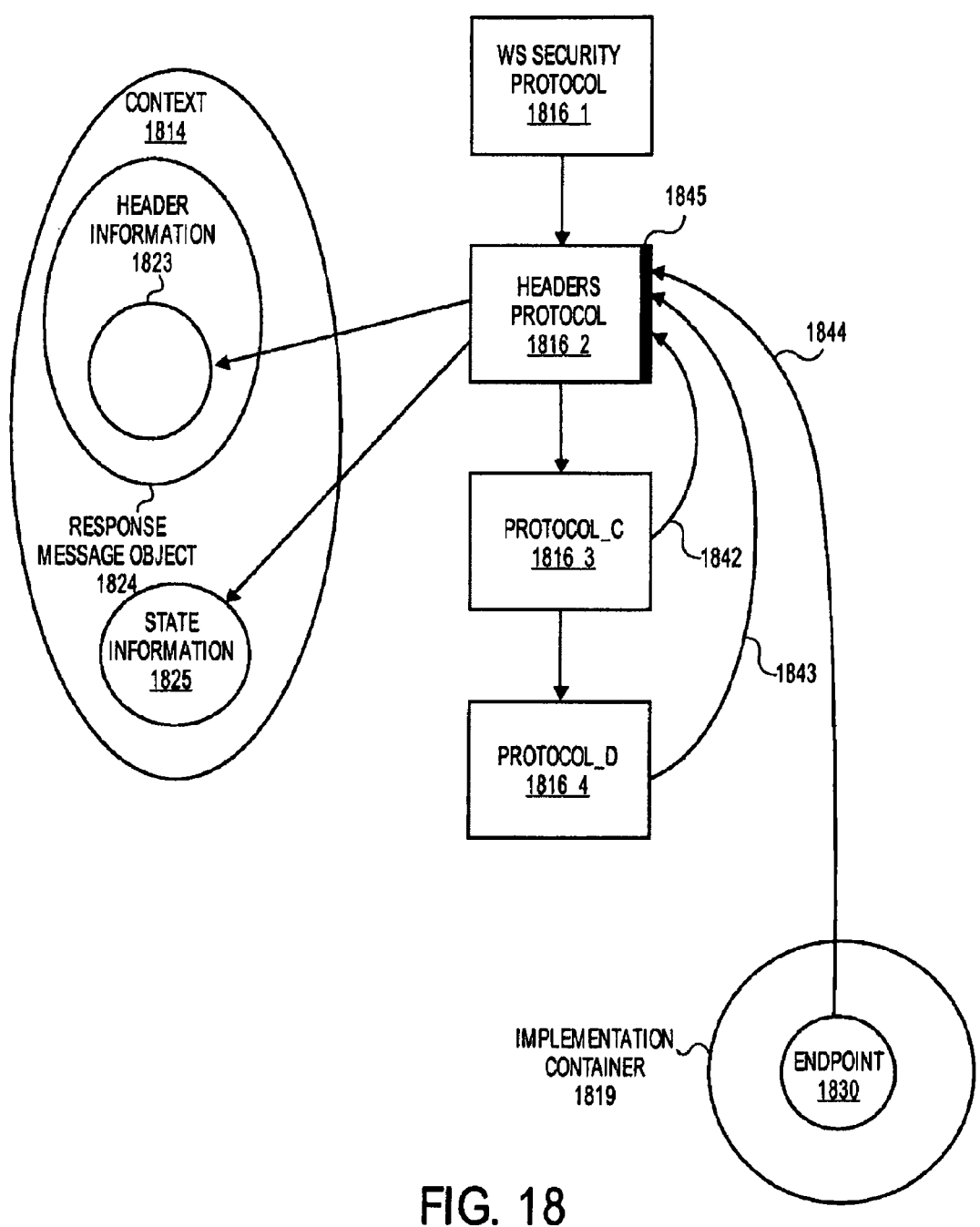
FIG. 18 depicts outbound processing with a Headers protocol.

As discussed in the background, the Headers protocol is designed to permit an endpoint and/or another protocol on the consumer side to: a) comprehend at least a portion of a received message's header information; and/or, b) write at least a portion of a response message's header information. FIGS. 17 and 18 describe in detail the operation of the Headers protocol as adapted to work within the architecture of the improved runtime framework. It is pertinent to point out that although in an actual implementation the Headers protocol is only instantiated on the consumer side, there is nothing (architecturally speaking) that prevents its instantiation on the provider side. In an implementation, on the service provider side, the interfacing between a received message's header information and an endpoint and/or other protocol is performed by an API to the context (i.e., the endpoint and/or other protocol read/write header information from the context through an API rather than the Headers Protocol). Conceivably, such an API could be instantiated on the consumer side too.

A pertinent difference between the Headers protocol as implemented in the prior art runtime framework and the Headers protocol as implemented in the newer improved runtime framework is that the newer Headers protocol is stateless so to be compatible with the hibernation process. FIG. 17 depicts an exemplary inbound flow for a received message. FIG. 18 depicts an exemplary outbound flow.

According to the exemplary inbound flow of FIG. 17, a protocol stack that includes four protocols 1716_1 through 1716_4 execute in sequence in order to process a received message. The four protocols include in order: 1) a WS Security protocol 1716_1 that executes encryption/decryption and/or signature checking tasks; 2) the Headers protocol 1716_2; 3) a third protocol 1716_3 that is designed to use information found in the header of the received message; and, 4) a fourth protocol that is also designed to use information found in the header of the received message.

In practice, if proper processing requires use of the WS Security protocol, the WS Security protocol 1716_1 precedes the Headers protocol 1716_2 in the protocol stack because no further processing should be performed if the received message does not pass its "security clearance". The third and fourth protocols 1716_3, 1216_4 can essentially be any other protocol. For further demonstrative value, in order to demonstrate the stateless nature of the Headers protocol, one of protocols 1716_3 and 1716_4 is assumed to be the Reliable Messaging protocol.

According to the execution of the protocol stack in the inbound direction, first, the WS Security protocol 1716_1 will perform whatever decryption and signature checking is warranted. The Headers protocol 1716_2 then executes. The Headers protocol is essentially used as a mechanism to abstract the specific structure/formatting of the header information 1723 within the message object 1720 to other protocols and/or_endpoints that are written to comprehend message header information.

Essentially, over the years with repeated releases of "next generation" software, the structure/formatting of the header information 1723 may change. For example, the order and/or content of the DOM Elements within the header information 1723 may change because of a SOAP message header specification change. In light of such changes, any protocols or endpoints that are designed to comprehend and/or use message header information would have to be changed too if they were designed to access the message object's header information 1723 directly.

By instead designing these various protocols and endpoints to access a "standard interface" 1745 offered by the Headers protocol 1716_2, they can be made immune to any changes that are made to the structuring of the header information within the message object That is, they do not have to be re-designed in light of a message object header information 1723 change if they are designed to invoke methods offered by the Header's protocol interface 1745, and, the Header's protocol interface 1745 maintains support for these method invocations despite the change. Essentially, the Header's protocol 1716_2 is re-designed to deal with the change but nevertheless maintains "downward compatibility" of interface 1745.

In an implementation, the execution of the Headers protocol 1716_2 entails its reading 1741 of header elements (e.g., which are implemented as DOM Elements) from the header portion of the received message object 12 and storing the read header elements in itself 1716_2. In a further implementation, the Headers protocol 1716_2 is configured to only store within itself 1716_2 those header elements that have a setting of "must_understand=true".

Protocols written to access interface 1745 access the header information they need through the Header's protocol standard interface 1745. Essentially, the Headers protocol 1716_2 gives header information to a subsequent protocol that asks for the information, where, both the request for the information and the information itself is passed through interface 1745.

In an implementation, a protocol can ask for only a specific item of header information (e.g., information from a specific header element or set of header elements), and, the Headers protocol only returns the information that was specifically asked for. For instance, if protocol 1716_3 is a WS Reliable Messaging protocol as described above, the information asked for and delivered 1742 to protocol 1716_3 would be largely limited only to the header information that was indicative of "which" message the received message corresponds to amongst the correct serial ordering of a plurality of incoming messages and "which" group of messages the received message belongs to.

Continuing with an example where protocol 1716_3 is a WS Reliable Messaging protocol, a pertinent distinction between the Headers protocol implementation in the prior art runtime framework as compared to the implementation in the improved runtime framework is that the Header's protocol in the improved runtime framework is capable of supporting the hibernation process. If the Header's protocol is designed to keep state information, then, this information is externally saved prior to hibernation.

That is, the Headers protocol 1716_2 is capable of supporting the hibernation of the runtime process being executed in response to the WS Reliable Messaging protocol determining that such hibernation is warranted. The specific protocol context instance of the Headers protocol that instance 1716_2 corresponds to may have its state saved 1746 into the context 1714 and hibernated. While this particular protocol context instance 1716_2 of the Headers protocol will not be available until it is awakened from hibernation, the Headers protocol instance registered with the framework may be "reused" to support another runtime process (another protocol context instance is invoked) for another received message. Likewise, as part of the hibernation process, the WS Security protocol context instance would have its state information saved into context 1714 as well.

As part of the sequence of re-starting the runtime process from its hibernated state in response to a determination being made that it is presently appropriate to process the received message that message object 1720 corresponds to, the WS Security protocol and 1716_1 and Headers protocol 1716_2 (and WS Reliable Messaging protocol 1716_3) will have their state information read back from context 1214. Then, protocol 1716_4 will execute. Note that, according to the diagram of FIG. 17, protocol 1716_4 also asks for and receives message header information 1743 from the Headers protocol 1716_2.

FIG. 17 also illustrates that the appropriate endpoint 1730 for the received message that the message object 1720 corresponds to can use message header information as well by being designed to access 1744 the standard interface 1745 of the Headers protocol 1716_2.

Before continuing on to FIG. 18, it is pertinent to note that, rather than reading 1741 and storing into itself the message header information 1723, the Headers protocol 1716_2 could be designed to read header information 1723 only in response to a request from another protocol or endpoint. That is, for example, rather than read the entirety of the header information 1723 immediately after execution of protocol 1716_1, the Headers protocol 1716_2 could be designed to access the message header information 1723 for each request by a later executed protocol or endpoint. In a further extension of such an implementation, the header elements may be kept in the message object 12 (i.e., the Headers protocol does not store inside itself the header information). A Headers protocol designed according to these principles may be regarded as purely stateless in this sense that it does not have any information to store externally and therefore inherently supports hibernation by design. An instance of such a Headers protocol can be easily re-applied to other messages during the hibernation of a message it was directed to access the header information of.

FIG. 18 shows the outbound processing flow for the protocol stack discussed above with respect to the inbound processing flow of FIG. 17. Whereas in the inbound direction protocols and endpoints may desire to know certain content within the received message's header, by contrast, in the outbound direction, protocols and endpoints may be desire to establish certain content within the response message's header. As such, the direction of the header information flows of FIG. 18 are in the opposite direction (into the Headers protocol interface 1845) than the header information flows of FIG. 17 (out of the Headers protocol interface 1745). According to an implementation, when the Headers protocol 1816_2 executes in the outbound direction, it writes 1841 the combined header information 1844, 1843, 1842 (respectively, from the endpoint 1830 and the protocols 1816_3, 1816_4 that have already executed in the outbound direction) into the header information portion 1823 of the response message object 1824. Alternatively, the Headers protocol 1816_2 could write header information each time a protocol or endpoint access interface 1845 (i.e., the Headers protocol writes to the outbound message object on an "as-needed" basis by another protocol and/or endpoint).

The Headers protocol 1816_2 may also be capable of saving its state information 1825 externally into the context 1814 for the message group in case hibernation is appropriate (and if the Headers protocol is not purely stateless as discussed briefly above) when a response message is being generated. Note that, because the overall runtime process being described supports service consumer-side processes as well, the Headers protocol can also be used to write message header information for an initial "request" message to be sent to a service provider that is not properly deemed as any kind of "response" message.

WS Addressing Protocol

As mentioned in the Web-Services subsection of the background of the present application, a "WS-Addressing" extension has been defined for the Web services effort that specifies information to be contained within a SOAP header 106 that describes the destination of the SOAP message in a transport independent fashion. Prior to the introduction of the WS-Addressing specification, the transportation of a Web services message through a network was largely viewed as the responsibility of lower level transportation technologies (e.g., HTTP, HTTPS, SMTP, etc.) that treated the Web services message purely as payload information.

The WS-Addressing specification essentially permits certain transportation related specifics about the message to be abstracted above any specific transportation technology so that the message's transportation details are essentially defined in a format that is independent of a specific transportation technology.

The most notable technology independent transportation information that the WS Addressing defines is the message's destination endpoint and sender endpoint (referred to generically as "EndPoint References" or EPRs). For instance, in the case of a message being sent from a Web service consumer to a Web service provider, the sender endpoint reference identifies the Web service consumer and the destination endpoint reference identifies the Web services provider. In the case of a SOAP message, the endpoint references may be written in XML in the header of the SOAP message.

Some important capabilities may be realized by abstractly defining the source and destination of a message in this fashion. As one example, the underlying transportation technology for a message can be changed as it traverses the network from the sender endpoint to the destination endpoint. Consider a situation where a first leg of a message's journey through the network is to be transported by HTTP and a second leg of the message's journey is to be transported by SMTP.

At the node in the message's path through the network where the switchover from HTTP to SMTP is to take place (e.g., an "intermediate" node), the destination endpoint reference found in the message's header (which from the perspective of the HTTP packet is located within the HTTP packet's own payload information) could be used as a basis for building SMTP header information that specifies the destination endpoint in an SMTP compatible fashion (e.g., by performing a look up in a table that correlates destination endpoint references to SMTP destination ID values).

The WS Addressing specification also permits additional technology independent definition of information, often referred to as Message Indicators (MIs), that help define properties about the message. Some of these include: 1) a "Reply" indicator that indicates to the destination endpoint where the response message is to be sent (e.g., if different than the sender endpoint); 2) a "Fault" indicator that indicates to the destination endpoint where a response message is to be sent if there is a "fault" detected (i.e., some error in execution); 3) a "Message ID" indicator that tags an identification to the message for purpose of uniquely identifying the message; 4) an "Action" indicator that identifies the semantics implied by the message; and, 5) a "Relationship" indicator that indicates how the message relates to another message.

Figure 19:
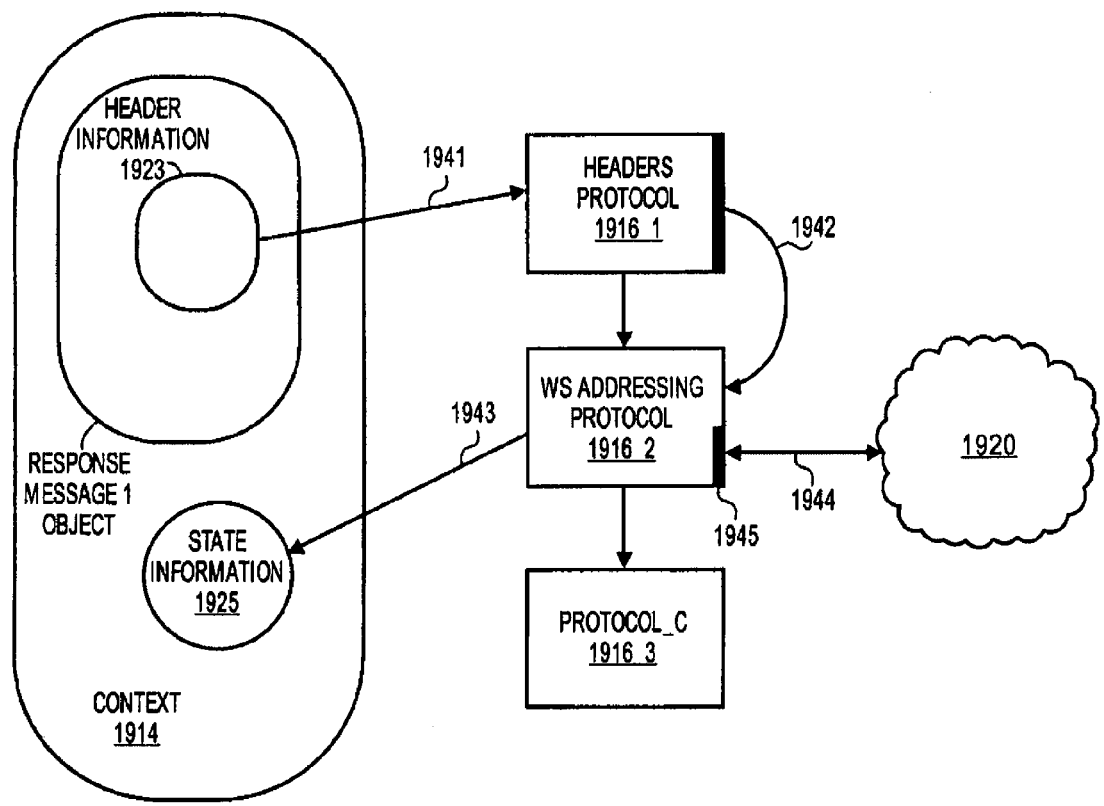
FIG. 19 depicts inbound processing with a WS Addressing protocol.

FIG. 19 shows another inbound protocol stack flow that includes a WS Addressing protocol 1916_2 written for the improved runtime framework. According to one embodiment of the inbound protocol stack flow of FIG. 19, as described in detail above, the Headers protocol 1916_1 reads 1941 and stores inside itself 1916_1 the-header information 1923 from the received message object 1924 found within context 1914. The WS Addressing protocol 1916_2 then executes.

According to an implementation, consistent with the discussion provided above for the Headers protocol, the WS Addressing protocol 1916_2 invokes the Headers protocol 1916_1 in order to receive 1942 header information from the received message that pertains to the WS Addressing specification (e.g., the sender and destination EPRs along with Reply, Fault, MessageID, Action and Relationship MIs). In an alternative implementation, rather than fetch "all" WS Addressing information from the Headers protocol 1916_1 as a single process, the WS Addressing protocol 1916_2 could be designed to ask for specific EPRs and/or MIs on an as needed basis.

The WS Addressing protocol 1916_2 is able to store 1943 its state information 1925 into the context 1914 as its protocol context instance information (which, in an implementation, includes the WS Addressing EPRs and MIs received from the Headers protocol). By being designed to store state information before hibernation sufficient to correctly complete its operations at a later time, the WS Addressing protocol 1916_2 is capable of being in a protocol stack that includes the WS Reliable Messaging protocol (which, for instance, may be protocol 1916_3).

In an embodiment, the WS Addressing protocol 1916_2 is able to: 1) provide 1944 EPRs and/or MIs to external software applications 1920 (e.g., other protocols, endpoints and/or background processes designed to support a Web services infrastructure); and, 2) perform basic roles and behaviors that are called out by the applicable WS Addressing specification(s). In the case of the former, the WS Addressing protocol 1916_2, like the Headers protocol 1916_1, maintains a "standard interface" 1945 that is used to pass EPRs and/or MIs to any external software applications 1920 that may desire them.

For instance, in a case where the underlying transportation technology is being changed (e.g., from HTTP to SMTP as discussed above), software application 1920 may be a background process that determines the proper (e.g., SMTP) address for the destination endpoint based on the destination EPR. In this situation, during the inbound execution of the protocol stack, the destination endpoint EPR is passed to the background process through interface 1945. The background process is then responsible for forwarding the correct destination address to the transport binding of the new underlying transportation technology. MessageID, Action and Relationship MIs may also be passed to other protocols, endpoint and/or background processes to support whatever functions they perform.

Like the standard interface 1745,1845 of the Headers protocol, the standard interface 1945 of the WS Addressing protocol 1916_2 essentially "hides"from other applications 1920 changes to the message object header information 1923 and/or content of the WS Addressing header information that may evolve over time. That is, the WS Addressing protocol 1916_2 can be re-designed if necessary to adapt to changes made to the or applicable specifications that define the content of the WS Addressing header information and/or message object 19, while, maintaining at interface 1945 methods that may be invoked by legacy software applications 1920.

In an implementation, the WS Addressing protocol 1916_2 also performs specific behaviors called out by an WS Addressing specification. Some of these may include: 1) during the outbound protocol stack flow when no fault has been detected, providing the Headers protocol 1916_1 with destination EPR information to be written into the response message object header information, where, the destination EPR corresponds to the address of the endpoint identified in the Reply MI of the received message header information; and, 2) during the outbound protocol stack flow when a fault has been detected, providing the Headers protocol 1916_1 with destination EPR information to be written into the response message object header information, where, the destination EPR corresponds to the address of the endpoint identified in the Fault MI of the received message header information.

Improved Implementation Container

Referring to FIGS. 6 and 7, the runtime object 611 retrieves an instance of the implementation container 706 and then fetches the endpoint's classloader 307. Referring to FIG. 8, in an implementation, the identity of the Web service's implementation container is listed 822 in the Web service data 813. The runtime object 611 refers to this listing 822 and provides an implementation container manager 617 with the identity 822 of the implementation container.

The implementation container manager 617 is essentially a registry, and, in response to its reception of the implementation container's identity, provides the runtime object 611 with a pointer or other reference to an interface to the implementation container 619. With the interface, the runtime object 611 can, in a sense, be deemed to possess an instance of the implementation container 619 itself.

An interface is essentially an object oriented structure for invoking methods. A basic use of a container's interface involves: 1) identifying a specific component within the container (e.g., a specific EJB or servlet); 2) identifying the specific method to be performed by that component; and, 3) supplying the input argument(s) for the method in its proper format (e.g., the specific input parameters needed by the method listed in the specific order that the method requires).

With respect to the runtime framework, not only may multiple containers exist, but also, "different" containers may exist (e.g., an EJB container, a Web Interface container, etc.). Furthermore, "different" containers may have "different" interfaces in terms of the manner and format in which the three parameters listed above (component identification, method identification and input argument) are provided.

In the prior art runtime framework, the implementation container manager 217 merely provided the runtime object 211 with an instance of the implementation container's interface (as defined by that container). Thus, in a system with endpoints located across different types of containers, the runtime object was expected to comprehend each of the different types of container interfaces. A scalability issue arises with this design, however, because the introduction of any "new" type of container and its correspondingly "new"interfaces requires an upgrade of the functionality of the runtime object 211 to comprehend the specific requirements of the new interface.

As such, the improved runtime framework has introduced a more scalable approach in which the interface provided by the implementation container manager 617 does not merely provide the runtime object with an instance of the container interface as defined by the container, but rather, provides a modified version of the container interface. This modified version of the container interface has the same "back-end" as the container's defined interface (in terms of its ability to construct the correct method invocation arguments for the container), but, has a common "front-end" (in terms of the methods that the runtime object 611 calls).

Figure 20:
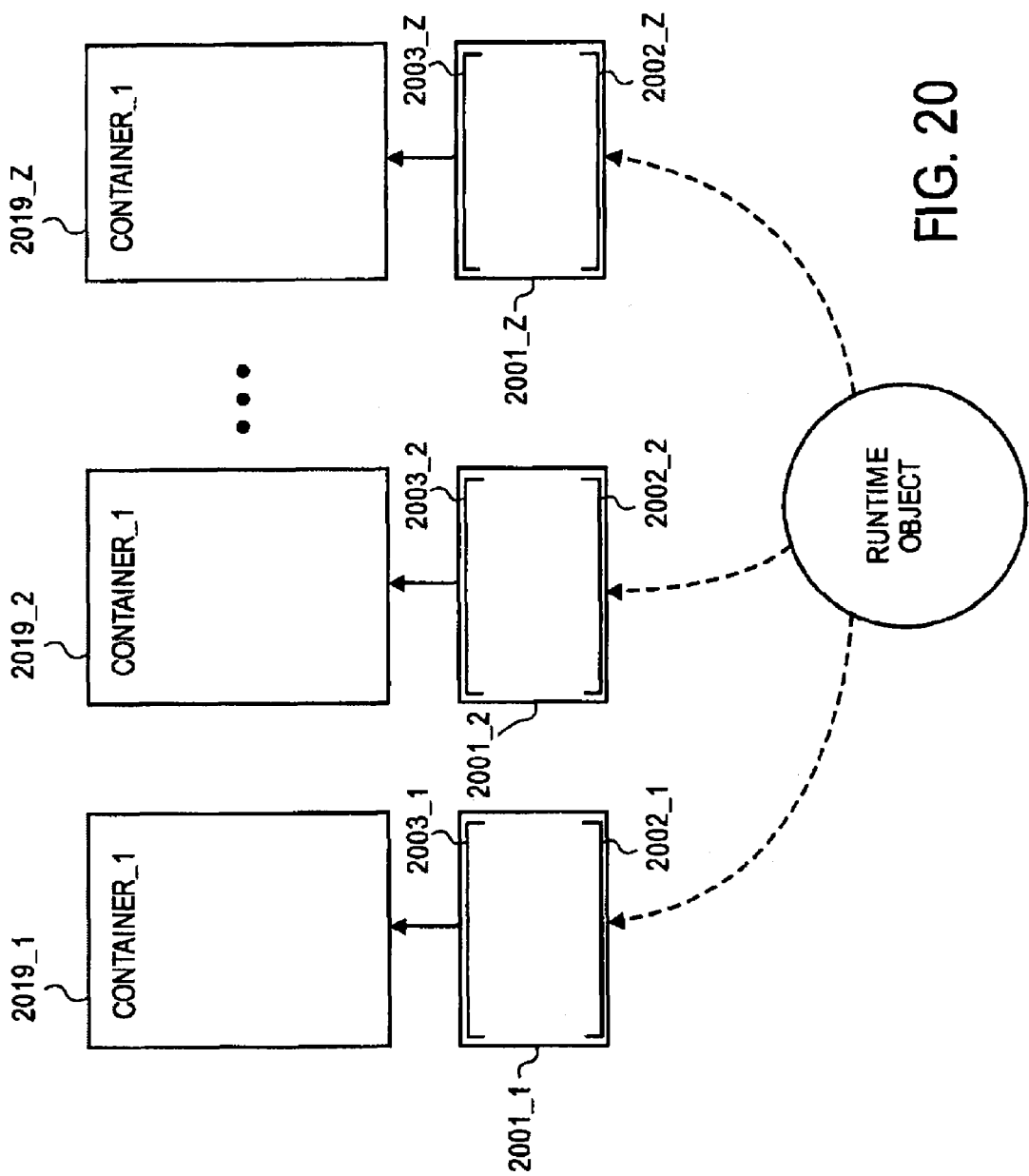
FIG. 20 shows a depiction of a standardized implementation container interface.

In this case, the common front-end permits the runtime object 611 to only comprehend a single type of format for method invocation at a container, and, the modified container interface is responsible for converting the structure of the method invocation provided by the runtime object into the specific format required by the container at the interface's back-end. FIG. 20 shows the scheme in more detail.

According to the depiction provided in FIG. 20, multiple containers 2019_1 through 2019_Z are observed. Each of containers 2019_1 through 2019_Z contain endpoints that could be called upon by runtime object 2011. The respective interface used by the runtime object 611 for each one of these containers 2019_1 through 2019_Z is depicted as interfaces 2001_1 through 2001_Z. In an implementation, the respective front-ends 2002_1 through 2002_Z of these interfaces are the same; which, in turn, corresponds to the runtime object 2011 invoking the endpoint methods in an identical format irrespective of which of the Z implementation containers is being implicated. By contrast, the back-ends 2003_1 through 2003_Z of these interfaces 2009_1 through 2009_Z may be all different in order to accommodate any method invocation format that is specific to their particular container.

Thus, according to this approach, introduction of a new type of container with a corresponding new type of interface definition does not require an upgrade of the runtime object 2011, but merely, development of an interface that convert a method invocation formatted according to the standardized front-end into a method invocation that is formatted according to the needs of the interface defined by the new container. In an implementation, the standard front-end 2002 supports two methods: 1) get_classloader (in which the input argument supplied by the runtime object 2011 is the identity of the endpoint); and, 2) invoke_method (in which the input argument supplied by the runtime object 2011 includes the identity of the endpoint, the endpoint method being invoked and input parameters required by the endpoint method; notably, as discussed at length above, the input parameters need not be organized in the format required by the implementation container's defined interface).

Streaming

Figure 21:
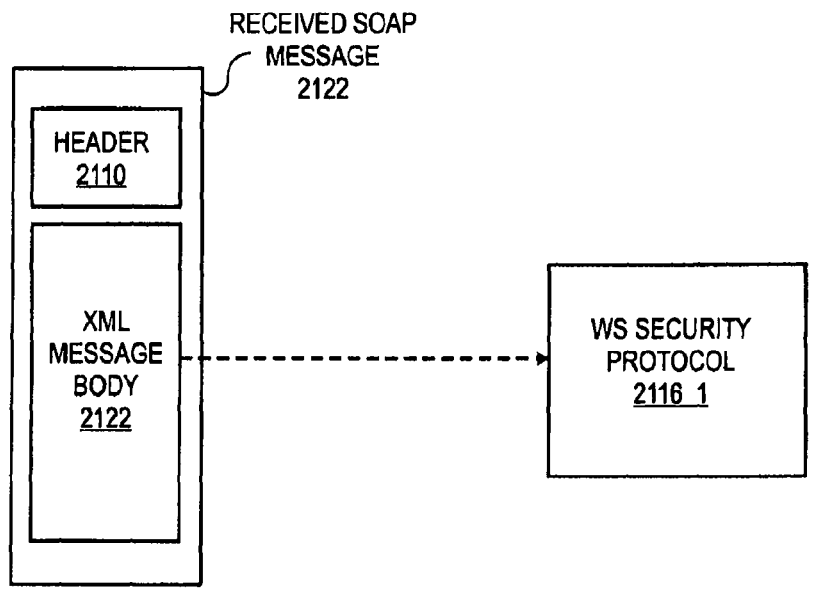
FIG. 21 (prior art) shows that a protocol may desire information from a received message body.

The discussions above concerning the Headers and WS Addressing protocols pertained to the ability of one or more protocols to gain access to message header information. FIG. 21 demonstrates that the content of message body information 2122 (as opposed to message header information 2110) may also fall under the responsibilities of a protocol as well. For instance, recall the WS-Security mentioned in the background that is responsible for encryption/decryption functions. In a prior art implementation, a WS Security protocol 2116_1 performs decryption on a received message 2122 in the inbound direction, and, encryption on a response message in the outbound direction. In the case of encryption (outbound direction), the outbound message body is "scrambled" by the WS-Security protocol 2116_1; and, in the case of decryption (inbound direction), the contents of the received message body 2122 are "unscrambled" by the WS-Security protocol 2116_1. In both cases (encryption and decryption) the protocol 2116_1 is responsible for overseeing functions that involve the content of the body portion of a message.

According to the prior art approach, in the inbound direction, a DOM parser was used to construct a DOM tree representation of the encrypted message body, and then, the WS Security protocol performed decryption on the DOM tree representation to produce a second DOM tree that represented the decrypted message body. In the outbound direction, a DOM tree writer was used to produce a DOM tree representation of a non encrypted message body, and then, the WS Security protocol performed encryption on the DOM tree representation to produce a second DOM tree that represented an encrypted message body. Because of the heavy use of DOM trees and the tendency of DOM trees to be memory inefficient (particularly for a large amount of information such as a message body) the prior art approach needed to be improved from a memory consumption perspective. The following describes alternative approaches that should be more memory efficient than the processes described just above.

Figure 22:
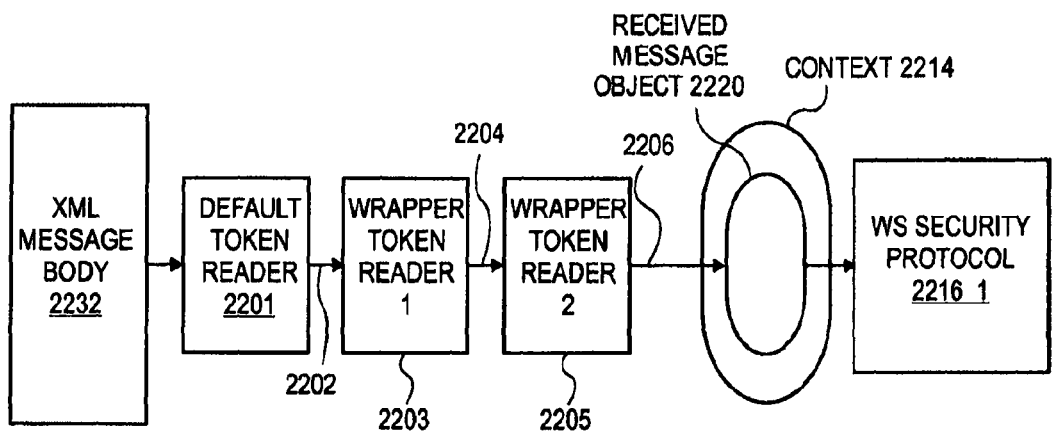
FIG. 22 shows an approach for providing a protocol with information from a received message body.

In the inbound direction, according to one improved implementation, in order to comprehend details within the message body 2122 of the received message 2122, the WS Security protocol 2216_1 is provided message body information 2222 from a token streaming ("event based") de-serialization process depicted schematically in FIG. 22. That is, a default token reader 2201 provides an object oriented stream of tokens 2202 (each token being implemented as a separate object), where, each token appearing in the stream 2202 corresponds to some specific item found within the received message body 2222. Here, it is pertinent to recognize that an XML SOAP message body 2222 can be viewed as being organized into one or more "elements", where, each element can have one or more associated "attribute" items and/or contain one or more "character data" items. An element can also contain one or more "children" elements.

Figure 23:
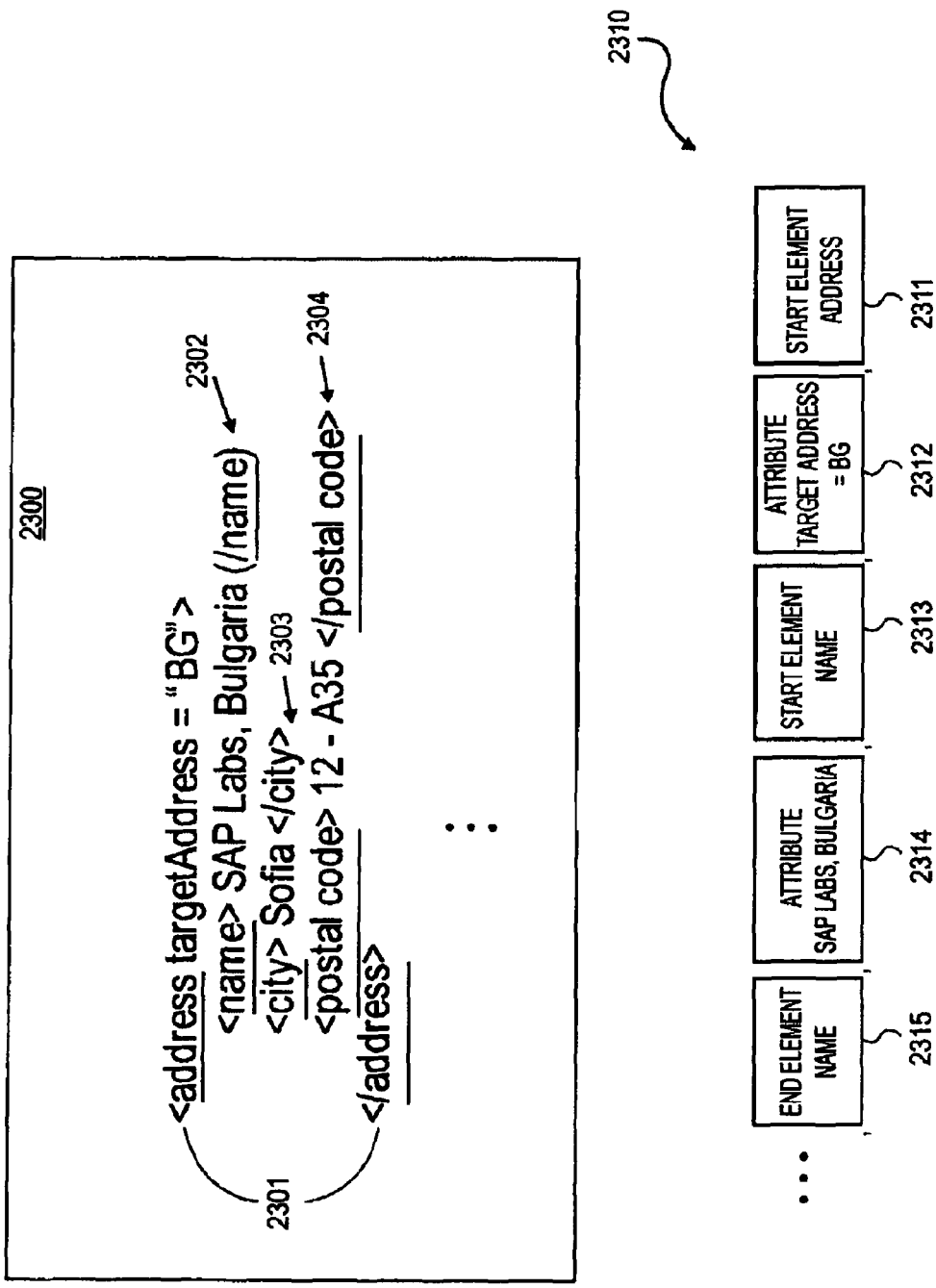
FIG. 23 shows an exemplary XML document containing a parent element and a corresponding token stream.

FIG. 23 demonstrates an example. FIG. 23 shows a portion 2300 of an XML document having an address parent element 2301 containing address name 2302, address city 2303 and address postal code 2304 children elements. Note that the address element 2301 includes a "targetAddress='BG'"attribute item; the name element 2302 includes an "SAP Labs, Bulgaria" attribute item; the city element 2303 includes a "Sofia" attribute item; and, the postal code element 2304 includes a "12-A35" character data item. Referring to FIGS. 22 and 23, in processing the portion of the XML document 2300, the default token reader 2201 scans the XML content 2200 and provides an output "token" each time it recognizes the start of an element, the end of an element, an attribute item or a character data item.

The default token reader 2201 will therefore provide, in order, the token stream 2310 depicted in FIG. 23 which includes: 1) an address element start token 2311; 2) an attribute="_targetAddress='BG'_" token 2312; 2) an address name element start token 2313; 3) an attribute="SAP Labs, Bulgaria" token 2314; 4) an address name element end token 2315; 5) an address city element start token (not shown); 6) an attribute="Sofia" token (not shown); 7) an address city element end token (not shown); 8) an address postal code element start token (not shown); 9) a character data="12-A35" token (not shown); 10) an address postal code element end token (not shown); and, 11) an address element end token (not shown). In an implementation there exist two different default token readers for two different types of XML formatting: 1) BinaryXML; and, 2) XML 1.0.

The default token reader 2201 is followed by one or more "wrapper"token readers 2203, 2205 such that a "serial processing chain" is formed. Here, each wrapper token reader 2203, 2205 in the serial chain is configured to consolidate multiple input tokens and convert them into a single "higher level" output token. As a consequence, the serial chain of wrapper token readers 2203, 2205 essentially converts the highly granularized stream of tokens 2202 provided by the default token reader 2201 into a higher level token abstraction so that the protocol 2216_1 can ultimately receive one or more message body elements as a single instance of information (e.g., as a single object that represents one or more elements within the message body).

Figure 24:
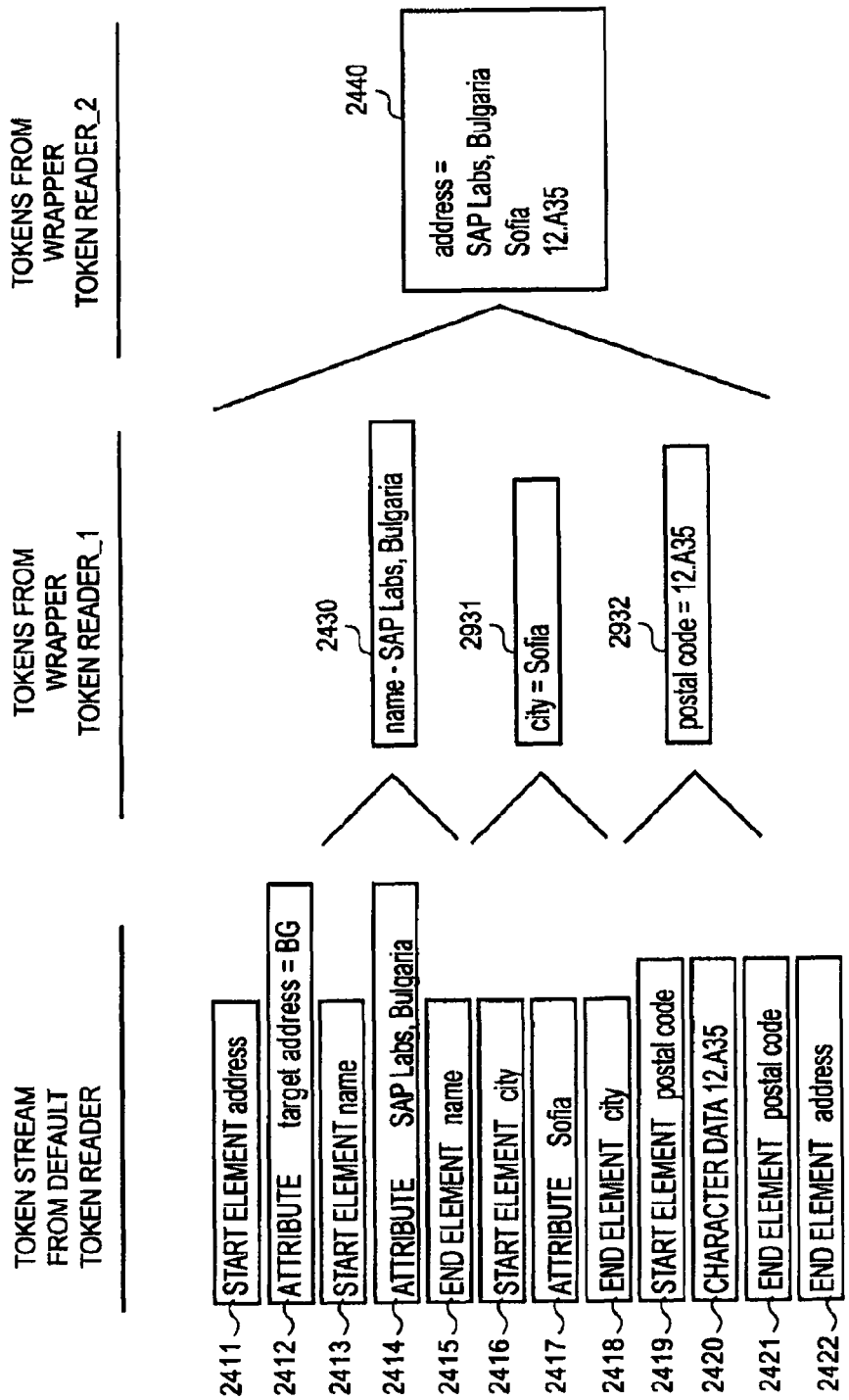
FIG. 24 shows an exemplary token consolidation process.

FIG. 24 shows an example in which the first wrapper token reader_1 2203 in the serial chain is designed to convert: 1) the address name element start. end and attribute tokens 2413, 2414, 2415 from the default token reader's output stream 2202 into a single token 2430; 2) the address city element start, end and attribute tokens 2416, 2417, 2418 into a single token 2431; and, 3) the address postal code element start, end and character data tokens 2419, 2420, 2421 into a single token 2432. FIG. 24 also shows the effect if the second wrapper token reader_2 2205 consolidates the tokens 2430 thru 2432 from wrapper object 2203 and the address start 2411, attribute 2412 and end 2422 tokens into a single token 2440 that contains all of the address information. By passing this token 2440 to the protocol 2216_1 (e.g., through the context 2214), the protocol 2216_1 can be designed to reference only the single, address element within the message body (rather than comprehending its constituent parts as separate elements). Referring back to FIG. 22, in an implementation, a protocol (such as WS-Security protocol 2216) invokes the wrapper chain through the received message object 2220 in the context 2214; which, in turn, invokes the use of the token reader chain. That is, the protocol calls to the received message object 2220 to load itself with the message body information. In response, the message object 2220 invokes the token reader chain. The token reader chain then provides encrypted content from the received message body into the message object 2220. In a further implementation, the message body content as written in the message object 2220 is formatted as a byte array or string and therefore is placed into a serialized portion of the context 914.

A reverse serialization process may also occur in the outbound direction (e.g., for encryption). That is, a higher level wrapper token writer "expands" multiple output tokens from a single input token. Each expansion through a chain of wrapper token writers therefore increases the granularity at which the message body information was described until a default token writer is reached that transforms a highly granularized stream in object oriented form into a sequence of XML element start items, element end items, attribute items and character data items.

Figure 25A:
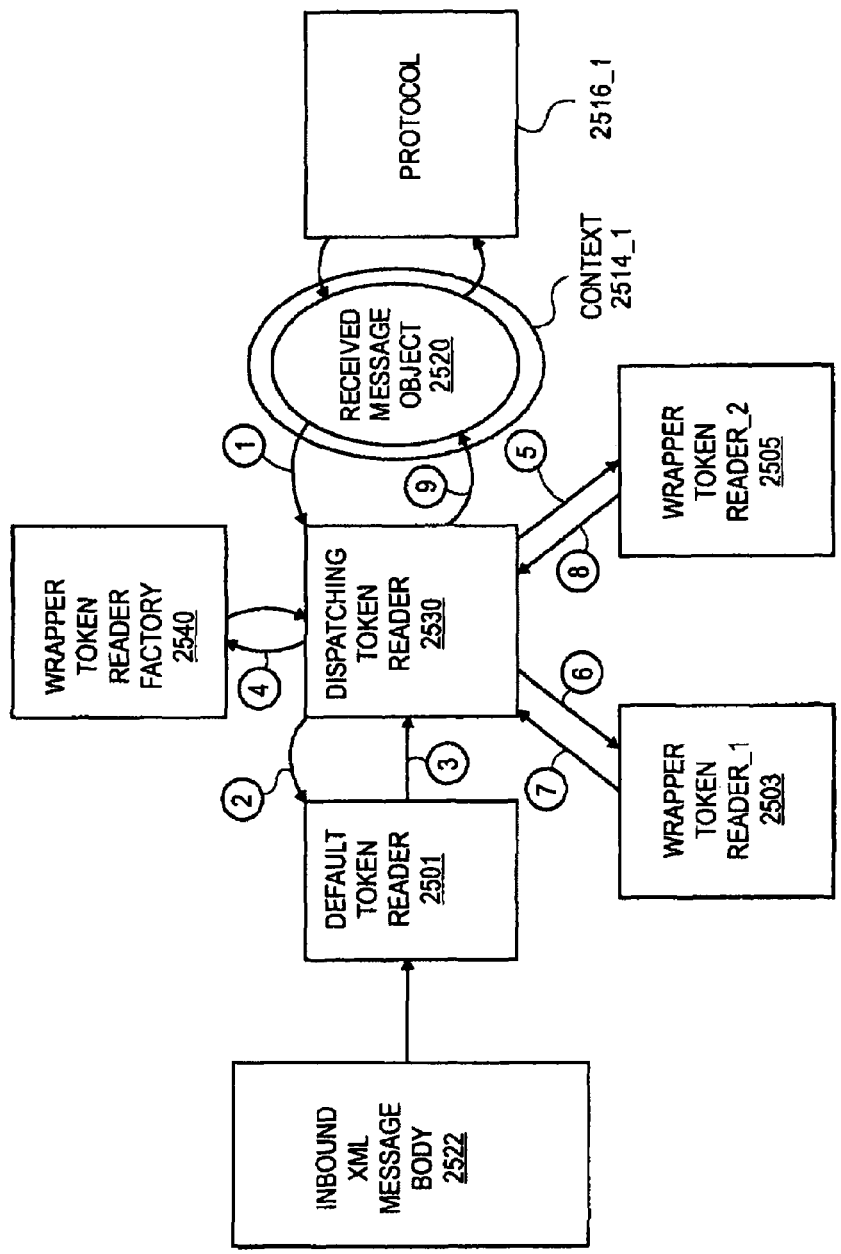
FIG. 25a shows an improved token reading and consolidation architecture.
Figure 25B:
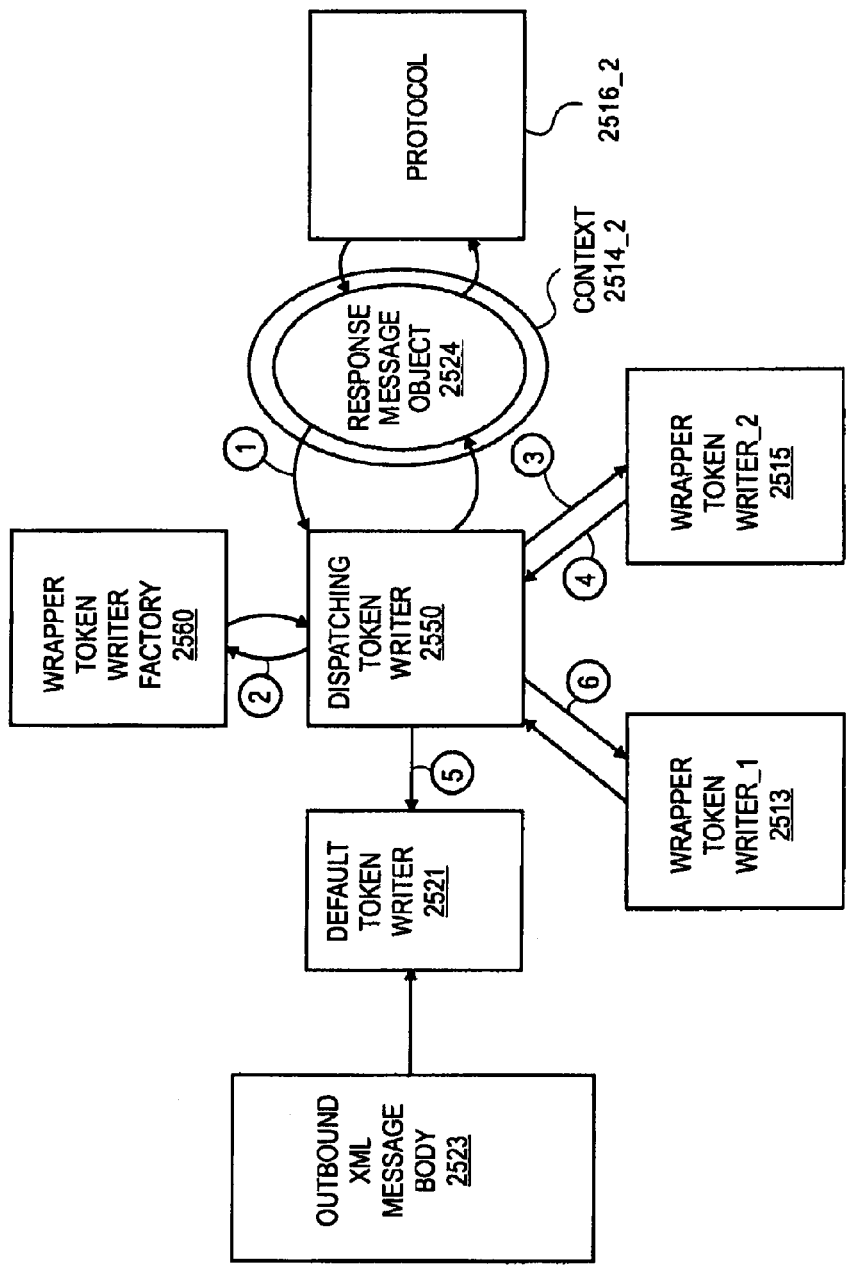
FIG. 25b shows an improved token expansion and writing architecture.

FIGS. 25a and 25b show another improved approach that is more "dynamic" than the approach described just above in the sense that wrapper token readers are called out on an "as-needed" basis. FIG. 25a relates to a de-serializing process and FIG. 25b relates to a serializing process. Specifically, for de-serialization, a dispatching token reader (2530 in FIG. 25a) maintains a registry for each type of token that can be abstracted to a higher level by a wrapper token reader. The registry essentially maintains a correlation between: 1) a particular token that can be abstracted to a higher level token by a wrapper token reader; and, 2) the identity of the specific wrapper token reader that consolidates the particular token. For serialization, a dispatching token writer (2550 in FIG. 25b) maintains a registry for each type of token that can be expanded to a lower level by a wrapper token writer. This registry essentially maintains a correlation between: 1) a particular token that can be expanded to a lower level collection of tokens by a wrapper token writer; and, 2) the identity of the specific wrapper token writer that expands the particular token.

With respect to de-serialization, referring to FIG. 25a, a protocol (such as a WS Security protocol 2516_1) calls to the message object 2520 to retrieve whatever information is needed from the message body 2522. In response, the message object 1120 calls 1 to the dispatching token reader 2530. According to an implementation, information is returned to the message object 1120 in a kind of "real-time" fashion in the sense that, a token is passed to the message object 1120 directly after its corresponding one or more elements are read from the XML message body 2522 and abstracted up to the token level that the protocol 2516_1 expects.

In a further implementation, the default token reader 2501 reads the message body 2522 elements in the same order in which they are listed within the message body. As a consequence, tokens can be passed to the message object 2520 in the same order in which they are listed within the message body 2522. Therefore, according to one implementation, the call 1 from the message object 2520 is simply a "next" call that is properly responded to 9 by the dispatching token reader 2530 with the next element in the message body tokenized at the level of abstraction that the protocol 2516_1 expects to see in the message object 2520. The transport binding object 2518_1 then writes the next element into the context 2514_1.

Assuming that the call 1 from the message object 2520 is for the first token to be extracted from the message body 2522, the dispatching token reader 2530 will invoke 2 the default token reader 2501 and the default token reader 2501 will then begin to read the message body's text and provide 3 an object-oriented stream containing element start tokens, element end tokens, element attribute tokens and element character data tokens. According to an implementation, the dispatching token reader 2530 analyzes the token stream provided by the default token reader 2501.

As a general description of the process executed by the dispatching token reader 2530, for each token received by the dispatching token reader 2530, the dispatching token reader 2530 will identify whether or not the token is registered within the dispatching token reader's registry. If so, the dispatching token reader will dispatch (e.g., "redirect") the token to the wrapper token reader that the registry identifies as being designed to handle the token. If no instance of the wrapper token reader has been created the dispatching token reader will first request a wrapper token reader factory object 1140 to create an instance of the wrapper token reader and then dispatch the token to the newly created wrapper token reader instance.

In the case of the example being presently discussed, no wrapper token reader instances are assumed to exist at the time of the call 1 from the message object 2520 because the call is the initial call made for the message body 2522. Moreover, assuming the initial element in the message body corresponds to the XML address element 2300 depicted in FIG. 23, the stream of tokens 2411 thru 2422 depicted in FIG. 24 will be the initial token stream provided 3 by the default token reader 2501. Moreover, as discussed with respect to FIGS. 22 through 24, assume that a first wrapper token reader is used to consolidate the address name tokens 2413 thru 2415, the address city tokens 2416 thru 2418 and the address postal code tokens 2419 thru 2421 into tokens 2430, 2431 and 2432, respectively; and, that a second wrapper token reader is used to consolidate tokens 2411, 2412, 2422, 2430, 2431 and 2432 into token 2440.

According to this example, the dispatching token reader 2530 will first receive tokens 2411 and 2412 from the default token reader 2501. These tokens 2411, 2412 will be registered with the dispatching token reader 2530 as being properly processed by the second token reader wrapper described above (i.e., the "address element" token reader_2 that ultimately will provide token 2440 to the message object 2520). Because tokens 2411, 2412 represent the first tokens to appear from the message body 2522, no wrapper token reader instances have been manufactured for the particular message body being tokenized.

As such, the dispatching token reader 2530 will invoke 4 the wrapper factory 2440 in order to create an instance 2505 of the second token reader_2. After the second token reader_2 instance 2505 is created, the dispatching token reader 2530 will forward 5 tokens 2411, 2412 to the second token reader_2 2505. At this point, the second token reader_2 2505 still needs tokens 2430, 2431; 2432 and 2422 before it can generate token 2440 for the message object 2520. Note that, in an implementation, the factory object 2540 is used to support the simultaneous message processing activity of multiple runtime framework instances that run "in parallel", while, the dispatching token reader 2530 is dedicated to the particular runtime framework instance that message object 2520 corresponds to.

After the second wrapper token reader_2 instance 2505 has been created and tokens 2411 and 2412 have been passed to this reader 2505, the dispatching token reader 2530 will begin to process the token stream provided by the default token reader 2501 starting from token 2413 (address name start element item) and thereafter. Upon the dispatching token reader's receipt of token 2413, the dispatching token reader 2530 will recognize that: 1) the first wrapper token reader_1 is registered as being the proper wrapper token reader for processing token 2413; and, 2) an instance of the first wrapper token reader_1 needs to be created (for essentially the same reasons expressed above). As such, the dispatching token reader 2530 will again invoke 4 the factory object 2540 in order to create an instance 2503 of the first wrapper token reader_1. After the first wrapper token reader_1 instance 2503 is created, the dispatching token reader 2530 will forward 6 to it token 2413.

The dispatching token reader 2530 will then receive tokens 2414, 2415 which will subsequently be dispatched 6 to the first wrapper token reader_1 2503. After token 2415 is dispatched 6 to the first wrapper token reader_1 2503, the first wrapper token reader_1 2503 will generate token 2430 and forward 7 it to the dispatching token reader 2530. The dispatching token reader 2530 will check its registry, identify wrapper token reader_2 2505 as the appropriate wrapper token reader for that token, and forward 5 token 2430 to wrapper token reader_2 as a consequence. The same kind of process then repeats for tokens 2416 thru 2418 (being dispatched from the default token reader 2501 to the first wrapper token reader_1 2503), and, token 2431 (being dispatched from the first wrapper token reader 2501 to the second wrapper token reader_2 2505). The same kind of process again repeats for tokens 2419 thru 2421 (being dispatched from the default token reader 2501 to the first wrapper token reader_1 2503), and, token 2432 (being dispatched from the first wrapper token reader 2501 to the second wrapper token reader_2 2505).

Token 2422 is then forwarded 3 from the default token reader 2501 to the dispatching token reader 2530 which in turn dispatches 5 token 2422 to the second wrapper token reader_2 2505 (based on its registry information). The second wrapper token reader_2, at this point, has collected all tokens needed to generate token 2440. Token 2440 is sent 8 to the dispatching token reader 2530. Here, no entry is listed in the registry for token 2440, and, the dispatching token reader 2530 forwards 9 token 2440 to the received message object 2520 as a consequence.

Upon the received message object 2520 receiving token 2440, the received message object 2520 will send a second "next" call to the dispatching token reader 2530 and writes token 2440 into the context 2515_1. A process that follows the structure of the process described just above will be performed (resulting in the second token being given to the message object 2520). Eventually the entire message body will be processed and its contents, tokenized at the level expected by the protocol 2516_1 and as abstracted by the wrapper token readers will be present in the message object 2520. According to one implementation, the tokens presented to the message object 2520 are in byte array or string form and therefore are placed into a serialized portion of the context 914.

FIG. 25b depicts a reverse architecture for serializing response message body content in the outbound direction. Here, a high level token representing a high level "parent" element is passed 1 from the message object 2422 to a dispatching token writer 9210. The dispatching token writer 9210 checks a registry and, if a registry entry exists for the token received from the response message object 2524, identifies the wrapper token writer that expands the token into a collection of tokens (e.g., wrapper token writer_2 2515). The dispatching token writer 9210 causes 2 an instance of the wrapper token writer to be created by a factory 9220 if the token passed 1 by the message object 2524 is the first token for the outbound message body to involve the wrapper token writer.

The token received at 1 by the dispatching token writer 9210 is then passed 3 to the newly created wrapper token writer 2515, which, in turn, generates an expanded collection of tokens from the initial token. The expanded tokens are sent 4 to the dispatching token writer 9210. Those that have no entry in the registry (if any) are directed 5 to the default token writer 2521. Those that have a registry entry are directed to 6 the next, lower level wrapper token writer. The process repeats until the token originally passed 1 by the response message object 2524 is completely broken down and written into the textual (e.g., XML) message body by the default token writer 2521.

Note that for both de-serialization (inbound) and serialization (outbound) processes, additional wrapper token readers may be implemented at the "top" of a processing chain of wrapper token readers/writers to perform more substantive functions beyond mere token consolidation/expansion. For instance, in the case of the WS Security protocol, a wrapper token reader could be implemented to actually perform decryption (unscrambling of message body content)/encryption (scrambling of message body content) and/or signature checking/writing.

Transport Binding

As discussed at various points above, the transport binding object 618 is largely responsible for orchestrating the conversion of a message's content between its transported form and the object oriented representation of such content. Specifically, at process 704 of FIG. 7, the transport binding object 618 detects the message key for the message (by analyzing the output stream of a token reader 639) and looks up the endpoint method information from the Web services data 613; at process 708 of FIG. 7, the transport binding object 618 generates the input parameters for the endpoint method (again, by analyzing the output stream of a token reader 639). At process 710 of FIG. 7, the transport binding object 618 orchestrates the use of a token writer between the message body portion 926 of the response object 924 and the actual text based response message 623. For the processing of message header information, the transport binding: 1) orchestrates the use of a DOM reader between the header of the text based received message 622 and the header portion of the received message object 923; and, 2) orchestrates the use of a DOM writer between the header portion of the response message object 924 and the header of the text based response message 623.

Figure 26:
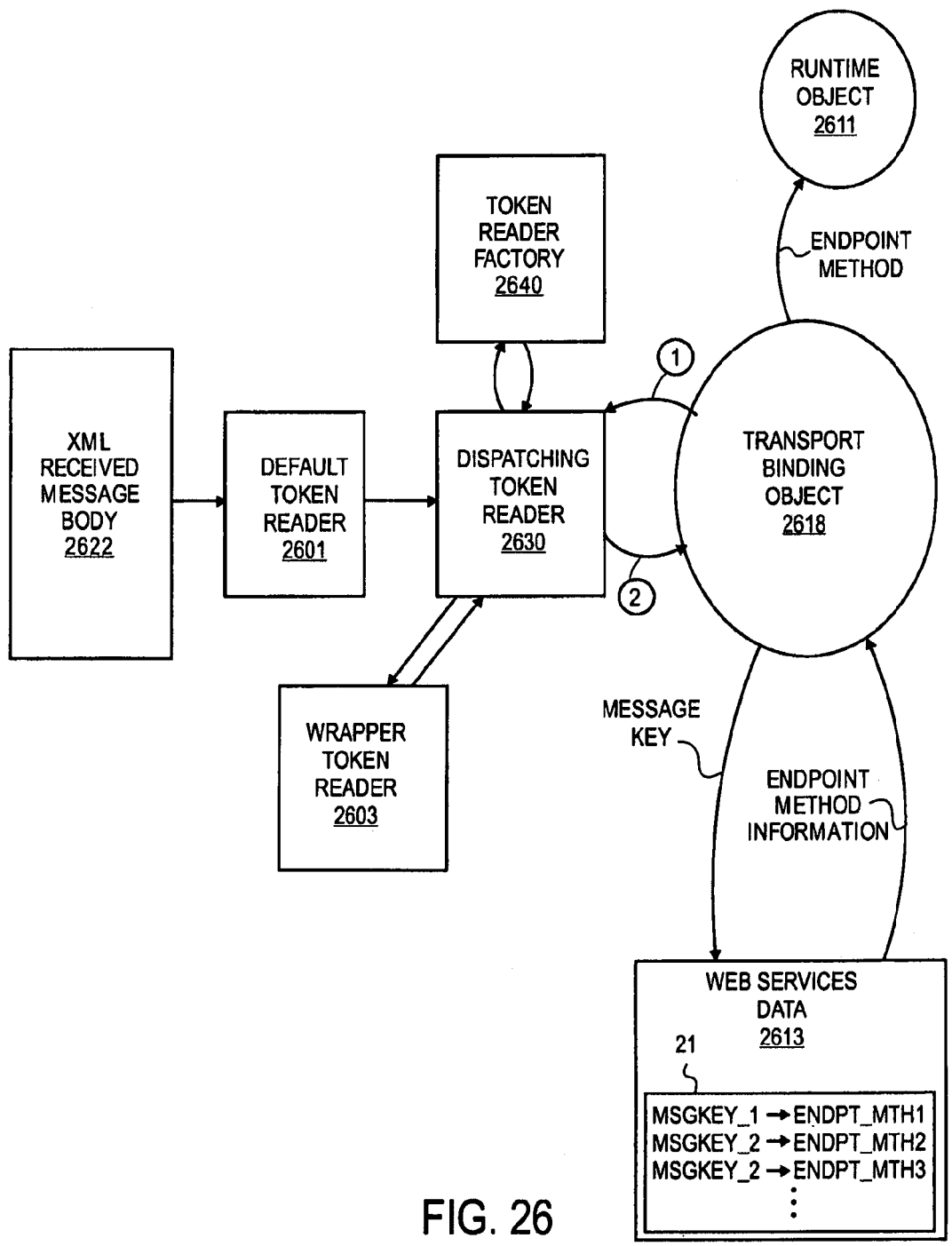
FIG. 26 shows a message key extraction architecture.

FIG. 26 shows an architecture for performing a basic message key identification process with a dispatching token reader. According to the basic architecture of FIG. 26, the message key information is contained within an element within the received message body 2622. A wrapper token reader 2603 is designed to process tokens from the default token reader 2601 that corresponds to the message key element. As such, using a dispatching token reader based embodiment as an example, the only tokens that are registered with the dispatching token reader 2630 are those that are generated from the message key element within the message key body 2622. When tokens from the message key element are forwarded from the default token reader 2601 to the dispatching token reader 2630, the dispatching token reader 2630 will forward them to the wrapper token reader 2603 which will then produce a higher level token containing the message key information.

In an embodiment, the Web service is structured such that the message key element is the first element in the message body. As a consequence, the initial tokens to be produced by the default token reader 2601 will pertain to the message key element. The dispatching token reader 2630 will cause an instance of the token reader 2603 to be created by factory 2640 and then dispatch the tokens to the created wrapper token reader 2603. Because the message key element is the first element in the received message body, the message key information will be contained by the first token that is presented 2 to the transport binding 2618 in response to the transport binding's first "next" call 1 made to the dispatching token reader 2630.

If the message key is not the first element in the message body, the transport binding 2618 may have to run through a series of "next" calls to the dispatching token reader 2630 before it receives the token having the message key information (because the dispatching token reader 2630 will forward to the transport binding 2618 any tokens that are not identified in its registry). The initial returned tokens that do not pertain to the message key element are simply dropped and/or ignored by the transport binding 2618. Eventually, a "next" call will be responded to with the token having the message key information.

In an alternate implementation, all tokens that could be produced by the default token reader 2601 are registered with the dispatching token reader 2630 so that all tokens from the default token reader 2601 are dispatched to the wrapper token reader 2603. In this case, the wrapper token reader 2603 is designed to ignore/drop all tokens that do not pertain to the message key element and create a higher level token from those tokens that were generated from the message key element. According to this design approach, the transport binding 2618 only has to make a single "next" call to the dispatching token reader 2630 regardless of where the message key is located within the message body.

In another approach, a dispatching token reader is not used and instead a wrapper chain is used as discussed above with respect to FIG. 22. In one basic wrapper chain implementation, a single message key wrapper is used to determine the message key from the token stream provided by the default token reader. In the most basic implementation, no wrapper token reader exists. As a consequence the transport binding 2618 is responsible for comprehending the highly granularized token stream provided by the default token reader and extracting the message key information from it.

Regardless of the manner in which the message key information is obtained, after it is obtained by the transport binding object 2618, the transport binding object 2618 uses the message key to look up from the Web services data 613, 2613 information specific to the endpoint method that is appropriate for responding to the content of the received message body (e.g., 1) the name of the method; 2) the order and type of the objects that the method accepts as input parameters; 3) the type of object that the method returns; and, 4) the exceptions that the method may throw in the case of a fault condition) and uses this information (along with the endpoint classloader as described below) to generate input parameter objects for the endpoint method. The input parameter objects are then generated and provided to the runtime object 2611. Note that, for any of the approaches discussed above, the message key element could be contained in the message header. The message key information can still be successfully obtained as long as the default token reader analyzes the message header (instead of or in addition to the message body).

Figure 27:
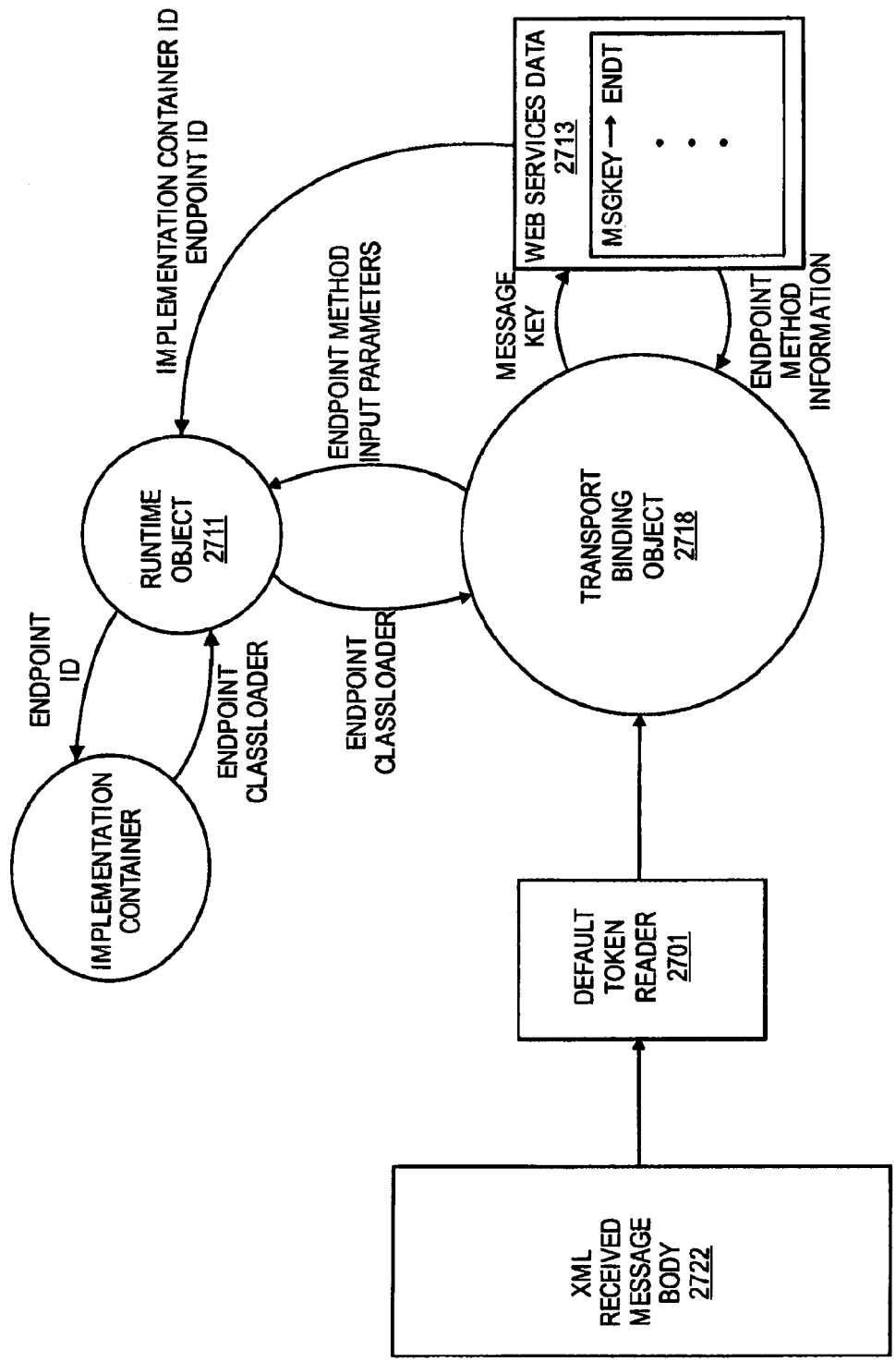
FIG. 27 shows an endpoint method input parameters extraction architecture.

FIG. 27 depicts an architecture for the endpoint method input parameter extraction process. In a service provider side implementation, along with the endpoint method information being provided to the transport binding object 2718 by the web service data, the runtime object 2711 retrieves the identity of the endpoint and its container (i.e., the "implementation container") from the Web service data 2713. The runtime object 2711 uses this information to fetch both an instance of the implementation container 706 and the endpoint's class loader 707 (referring briefly to FIG. 7) and then provides the endpoint's classloader to the transport binding object 2718. After the transport binding 2718 has been provided with the information specific to the endpoint method and the endpoint's classloader, the transport binding object 2718 creates instances of objects to be used as input parameters for the endpoint method. Essentially, the classloader is used to identify a class object for each input parameter object instance to be created. Each such class object is then used to create an "empty" input parameter object instance. Each empty input parameter instance is "filled" with appropriate input parameter information that the transport binding object 2718 identifies from the received message body 2722.

The transport binding object 2718 then provides the filled input parameter object instances to the context 914. In order to fill the input parameter object instances with their corresponding information, in one approach, the transport binding object 2718 uses a default token reader 2701 to deserialize from text to object-oriented form at least those portions of the received message body 2722 that correspond to the endpoint method's input information. According to an implementation, the Web service defines its communication semantics such that any parameter that can be received in a message body and used as an input parameter for an endpoint method must be represented in the message body as a separate element having a name defined by the Web service. The name of the element must map directly to the name of the input parameter used by the endpoint method.

Therefore, once the transport binding 2718 has identified the names of the parameters from the method specific information it received from the Web services data, the transport binding 2718 merely has to look for elements in the message body 2722 having the same names. In an implementation, as depicted in FIG. 27, the transport binding receives the highly granularized stream of tokens from the default token reader 2701. The transport binding object 2718 essentially looks for start element tokens having one of the looked for names of the endpoint method parameters. The transport binding 2718 consolidates tokens for a same input parameter (e.g., a start element token, character data token and end element token for a particular input parameter) and, once it recognizes the complete element is in its possession, fills the "blank" object instance reserved for the input parameter with the element's substantive content. When all the elements pertaining to the looked for input arguments are found and their corresponding input parameter objects are filled, the input arguments are provided to the context. In alternative implementations one or more wrapper token readers could be used (in a chain as described above with respect to FIG. 22, or, with a dispatching token reader as described above with respect to FIGS. 25a,b) to process the output stream from the default token reader 2701 and provide the transport binding 2718 with specific input parameter values (which the transport binding fills into their corresponding input parameter objects). In an implementation, the input parameter object instances are "string" objects (e.g., akin to a serialized byte array) in order to support their later use as input arguments for the endpoint method. In a further implementation, the context 914 is partitioned into a serialized sub-section whose contents are persisted during hibernation, and, the string input parameter objects are written into this partition for convenience/consistency.

The transport binding also, as depicted at process 702 of FIG. 7, generates a received message object 920 (of FIG. 9) for the context 614 that is later "filled in" with details derived from the actual content of the message to be processed (as discussed above with respect to FIGS. 22 and 25a). Here, the transport binding deals with the structure of the received message body, and, therefore, in an implementation, has access to a classfile that produces the message object 920 for the particular type of message that the received message corresponds to (e.g., SOAP, MIME, DIME, etc.). During the initial building 702 of the context 614, the received message object that is loaded into the context 614 is akin to an "empty template" whose structure is consistent with the received message type (e.g., a header portion and a body portion for a SOAP message) but whose substantive content is empty or "blank" (i.e., no specific items of data from the received message are in the message object).

Figure 28:
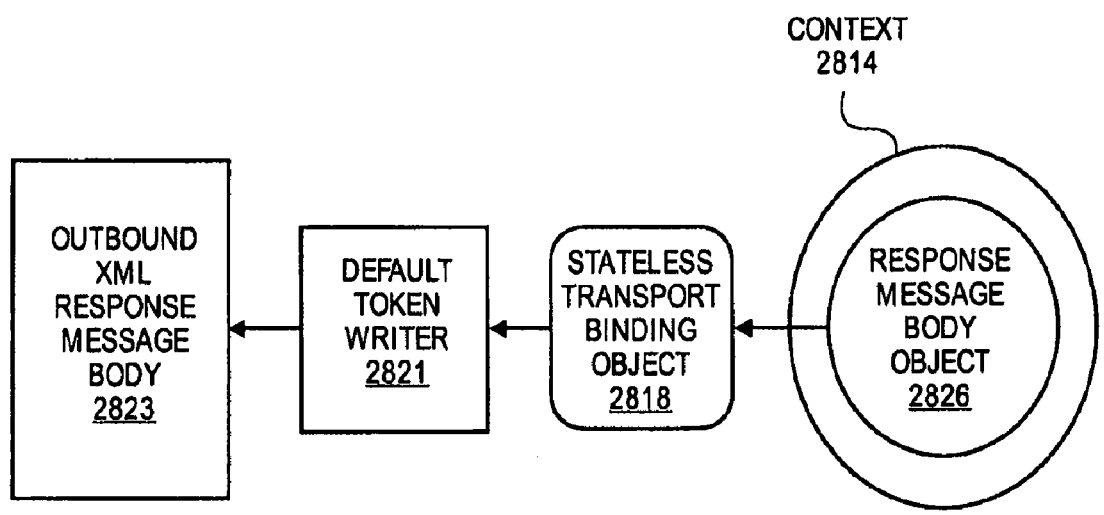
FIG. 28 shows an message body serialization architecture.

In the case of serializing the object oriented representation of the response message body (previously depicted as the body 926 portion of the response message object 924 in FIG. 9), any of the following architectures could be used: 1) the transport binding object 2818 invokes a single default token writer (depicted in FIG. 28) and conveys response message content from the response message body object 2824 to the default token writer 2821; 2) the transport binding object invokes a chain of token writers that include at least one wrapper token writer (e.g., akin to the reverse of architecture of FIG. 22) and conveys response message content from response message body object 2826 to the wrapper token writer chain; 3) the transport binding object invokes a dispatching token writer (e.g., akin to the reverse of architecture of FIG. 25b) and conveys response message content from response message body object 2826 to the dispatching token writer. In the later approach, wrapper token writers may or may not exist.

In an implementation the transport binding is also stateless so that it can easily be reapplied from process to process. Here, recall from FIGS. 6 and 7 that the transport binding is initially used to create 702 the message objects 920, 920. Some state information maintained by the transport binding is created at this time that involves the type of message that the message objects represent (e.g., whether the message objects use BinaryXML or XML 1.0 formatting so that the proper default token reader can be invoked). By making the transport binding stateless, such state information can be externally written from the transport binding object into the context prior to hibernation. Upon wake up from hibernation, the state information is re-loaded from the context back into the transport binding object.

Deployment

When deploying Web services, the needs of the Web service provider should be taken into consideration. For example, the archive file deployed for the Web service should include information regarding the possible generation of additional Web service data and the Web service data state. This Web service data state is the initialization data used by the Web service during its start up.

Furthermore, it is desirable to have a common deployment archive structure for each implementation type instead of requiring separate archives for each Web service deployed. The use of a common deployment archive requires less maintenance (such that a unique archive structure does not need to be developed each time a Web service is deployed) and provides standardized mechanism for deploying a Web service. The archive file contains different types of descriptors that define and/or configure the web services within the archive.

Figure 29:
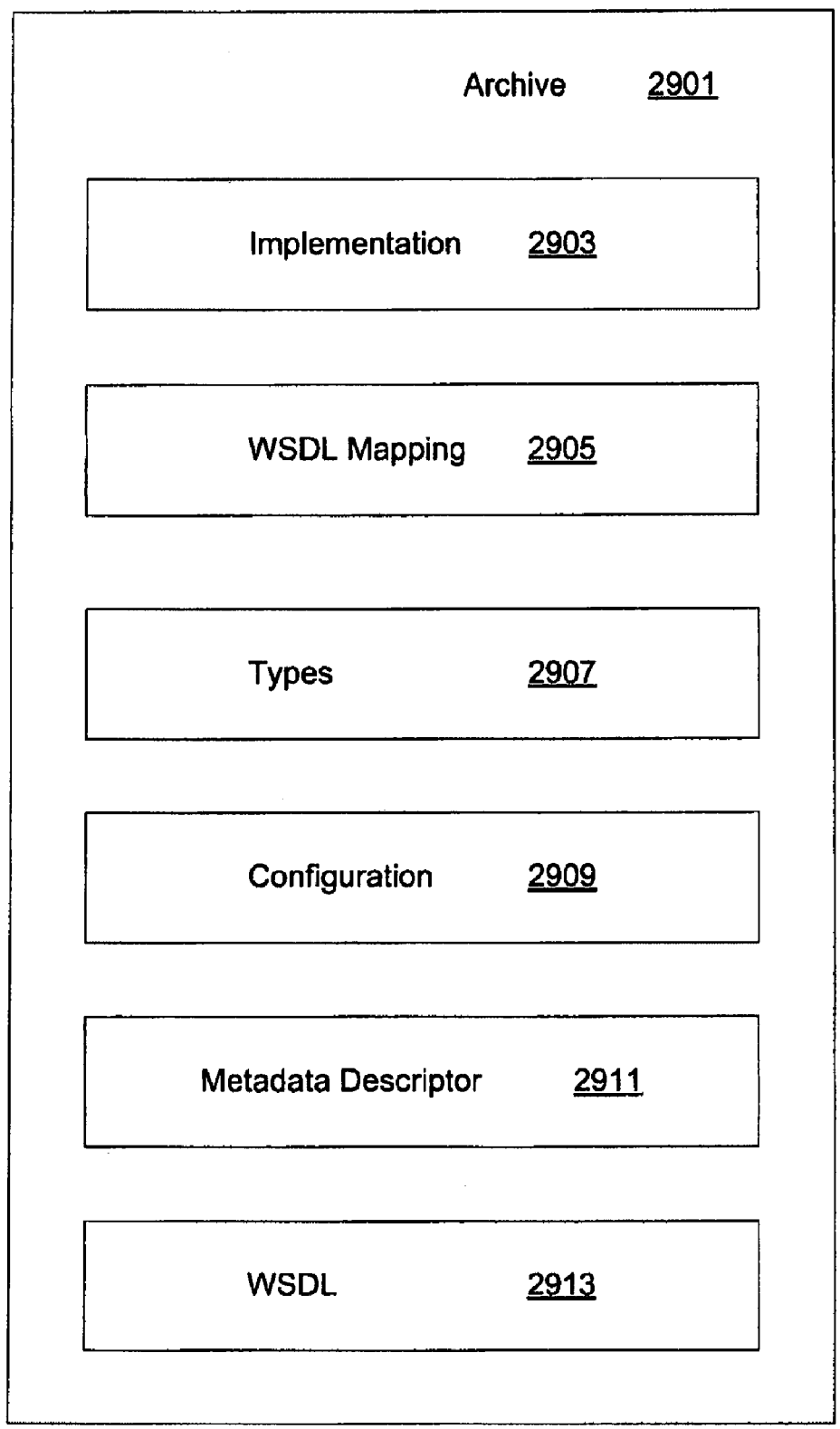
FIG. 29 shows an embodiment of a deployable archive file.

FIG. 29 illustrates an embodiment of a deployable archive file 2901. This archive file is generated prior to deployment and is used to deploy a Web service or application on a server. A different archive file may be created and/or maintained for each class of a Web service implementation including, but not limited to, Enterprise Java Bean (EJB), servlet, Java class, etc. For example, when an EJB is to be deployed the archive will include EJB specific information.

The archive file includes the necessary implementation classes 2903 and the descriptors for the implementation class. These descriptors and classes define and/or configure the Web service that is being deployed. In one embodiment, the descriptor files are XML files. The deployment descriptors describe a configuration of the Web service implementation or application for the application server that received the Web service archive. Describing a configuration of a Web service implementation for the application server refers to, for example, specifying a communication protocol implementation and/or a security protocol implementation for the Web service that is supported by the application server. For example, in an embodiment, the received deployment descriptors specify a transport binding for the Web service that is supported by the application server. The specified transport binding may be, for example, HTTP, HTTPS, FTP, SMTP, SOAP over HTTP, SOAP over HTTPS, SOAP over FTP, SOAP over SMTP, at the like. Similarly, the deployment descriptors may specify that Web service messages be authenticated by, for example, an implementation of a certificate protocol. The deployment descriptors may also include other information that is specific to the receiving application server such as an address for the configuration of on the application server (e.g., a URL) and/or a name for the configuration.

The WSDL mapping descriptor 2905 describes the mapping between the Web service and the WSDL file. For example, the mapping from Java to XML or XML to Java. The endpoint mapping 821 and/or implementation container ID 822 may use this WSDL mapping descriptor 2905 to define endpoint methods and identifications respectively.

The types descriptor 2907 contains additional information about the WSDL schema. For example, the types descriptor 2907 may specify the mapping between XML complex types and Java class files such as changing a complex type into a set of methods (which complex type should fill which field in an endpoint method). The Java serialization framework uses these mapping to serialize the Java class files to XML and/or to instantiate the Java class files from XML correctly.

The configuration file 2909 is used to keep the entire configuration of web services and/or web services client. Generally, this is extra information not included in a WSDL file such as protocol definitions. In one embodiment, the configuration model is divided into two logical parts of design-time and run-time. Design-time helps define basic requirements that are needed to access the WS endpoint (e.g., the endpoint requiring authentication in order to work properly and securely). Run-time helps define how design-time configurations are met (e.g., requiring basic authentication (e.g., username/password) and/or strong authentication (e.g., X509 authentication certificates) for allowing access to the endpoint). The protocol stack definition 820 may include information from the configuration file 2909.

The archive includes a WSDL file 2913 for the Web service. The WSDL, as discussed above, describes the Web Service(s) to be deployed.

While archives should contain the same information, they do not necessarily have to maintain the same directory structure. The archive has a metadata descriptor 2911 for the above descriptions and for each service that describes where the files in the archive are located.

In an embodiment, at least some of the different types of files and information included in a client services archive 3201 are generated using the techniques described earlier.

Figure 30:
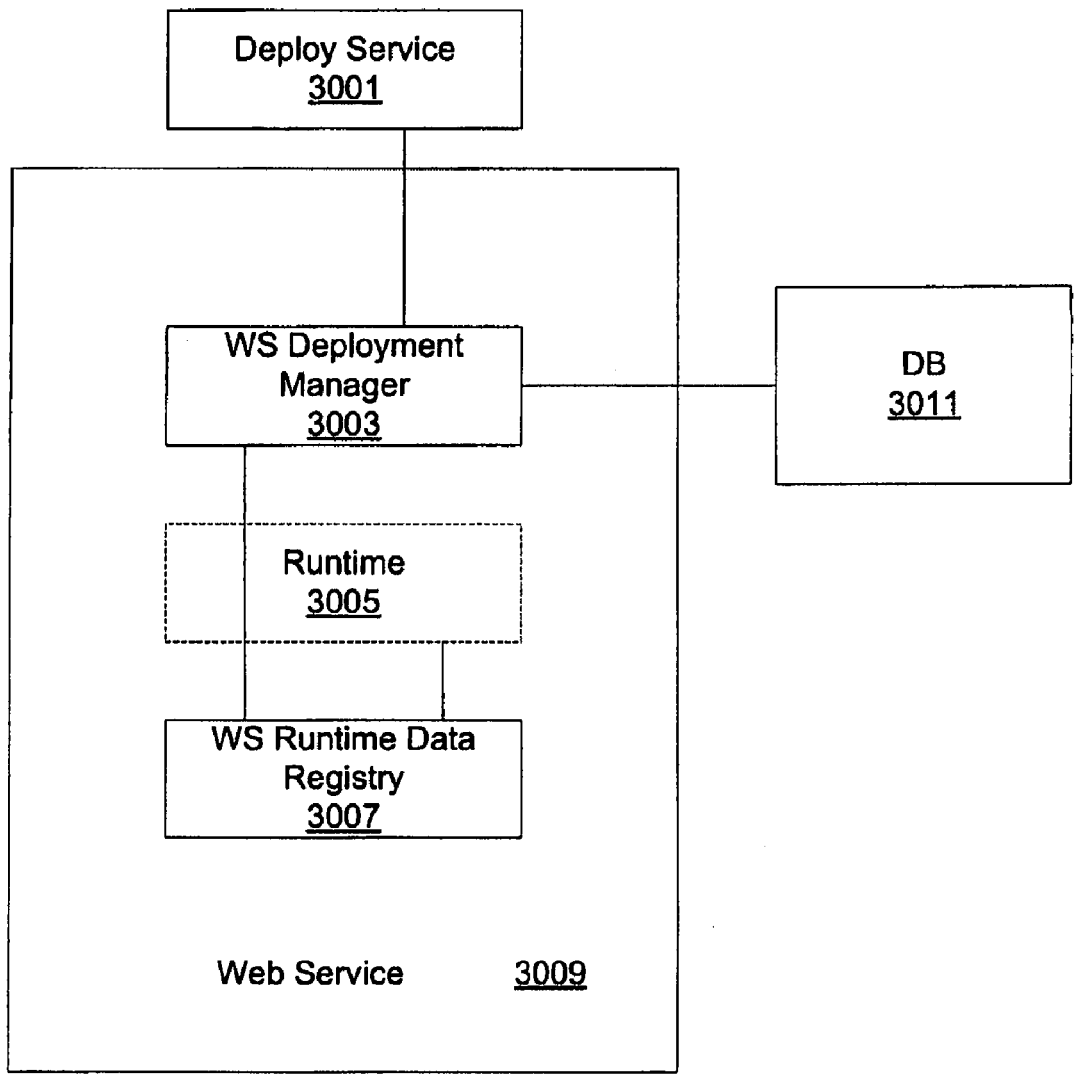
FIG. 30 shows an embodiment of a server side deployment.

FIG. 30 illustrates an embodiment of a server side deployment. A deployment service 3001 receives at least the client deployable archive file that is to be deployed as a Web service 3009.

A deployment manager 3003 on the client receives only archives with Web services components. For example, a developer specific archive (Microsoft, IBM, SAP, Oracle, etc.), a web (servlet) archive (WAR), or a Java application/configuration (EJB, etc.) archive. The deployment manager 3003 also stores the components in an external database 3011 and registers the components in the Web service runtime data registry 3007 on application start up. For example, the deployment manager 3003 may register components with the Web services data registry 612.

Figure 31:
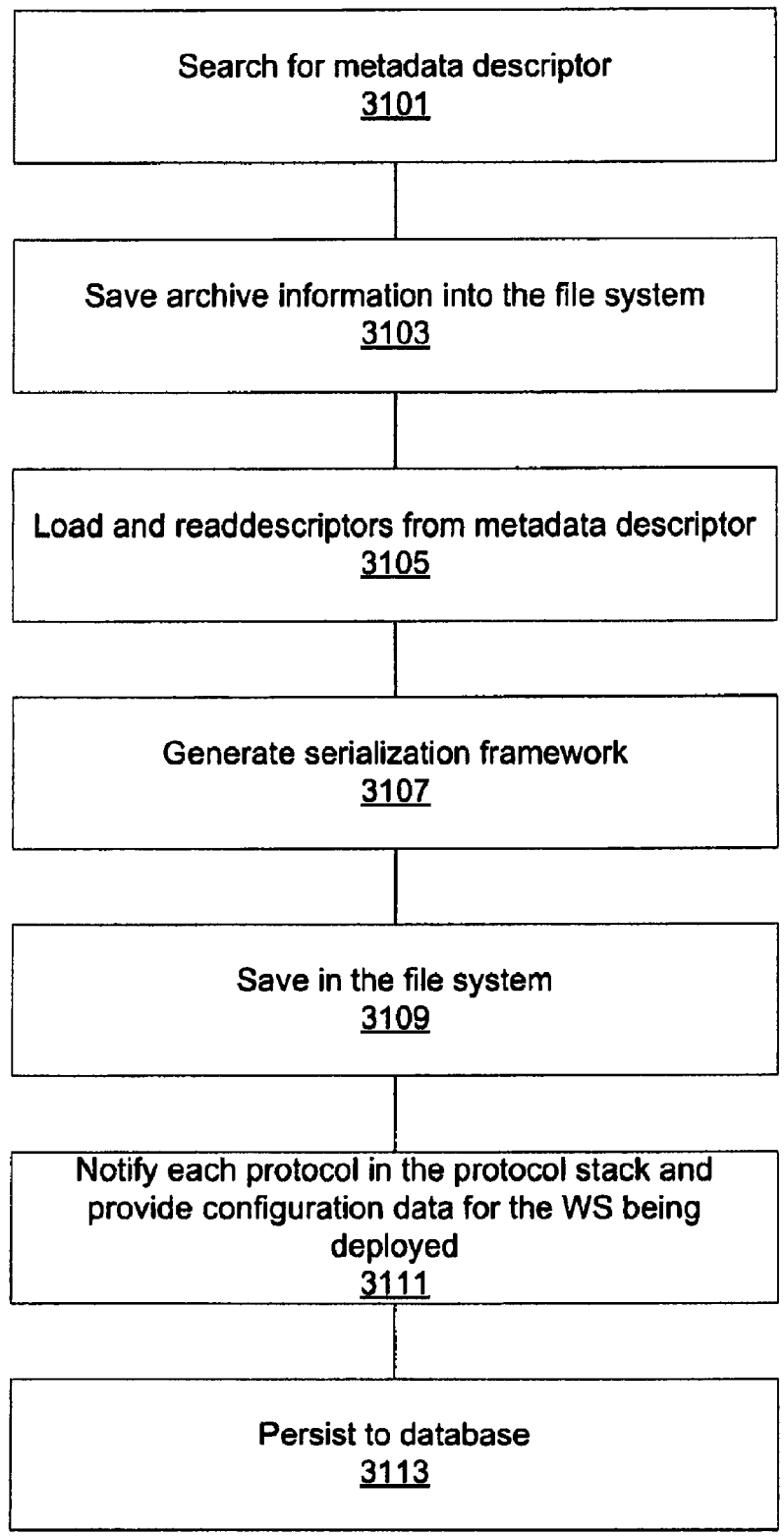
FIG. 31 illustrates an embodiment of a method for server archive deployment.

FIG. 31 illustrates an embodiment of a method for server archive deployment. At 3101, the archive is searched for a metadata descriptor file. As described earlier, the metadata descriptor file describes the mapping between the Web service and the WSDL file, such as the mapping from Java to XML or XML to Java. This information is saved into the file system of the server at 3103.

The descriptors from the metadata descriptor are read and loaded (processed) at 3105. Reading determines which Web services are described in the archive. Loading stores the metadata into the proper WS data registry. At 3107, a set of objects that are for serializing/deserializing Java input parameters into XML. These objects are also referred to as the serialization framework. The serialization framework is generated using the WSDL schema section and the types descriptor of the archive. Since the types descriptor 2907 contains additional information about the WSDL schema it may specify the mapping between XML complex types and Java class files such as changing a complex type into a set of methods (which complex type should fill which field in an endpoint method). The Java serialization framework uses these mapping to serialize the Java class files to XML and/or to instantiate the Java class files from XML correctly. During runtime, these objects (Java serialization framework) process a token stream from a token reader to fill endpoint method input parameter into object oriented (Java) form for the stateless transport binding object 618.

The Java serialization framework is saved in the file system for use by the server at 3109.

In an embodiment, protocols in the protocol stack is notified and provided with configuration data for the Web service being deployed at 3111. The configuration data alerts the protocol of any "special" input parameters for the Web service that deviate from the norm. Exemplary special input parameters include, but are not limited to, initial values to be set such as login protocols and how long the reliable messaging protocol stays in hibernation before terminating a session. Each protocol may decide if it is to be notified. In another embodiment, this notification and provisioning is skipped.

At 3113, the archive, serialization framework, and/or metadata descriptors are persisted into a remote database.

Client Side Web Service Deployment

Web services client applications may need to be deployed on the client side to communicate with the Web service provider. For example, the client will need to know how to communicate (what protocols to use) and where to communicate (which ports to use).

Figure 32:
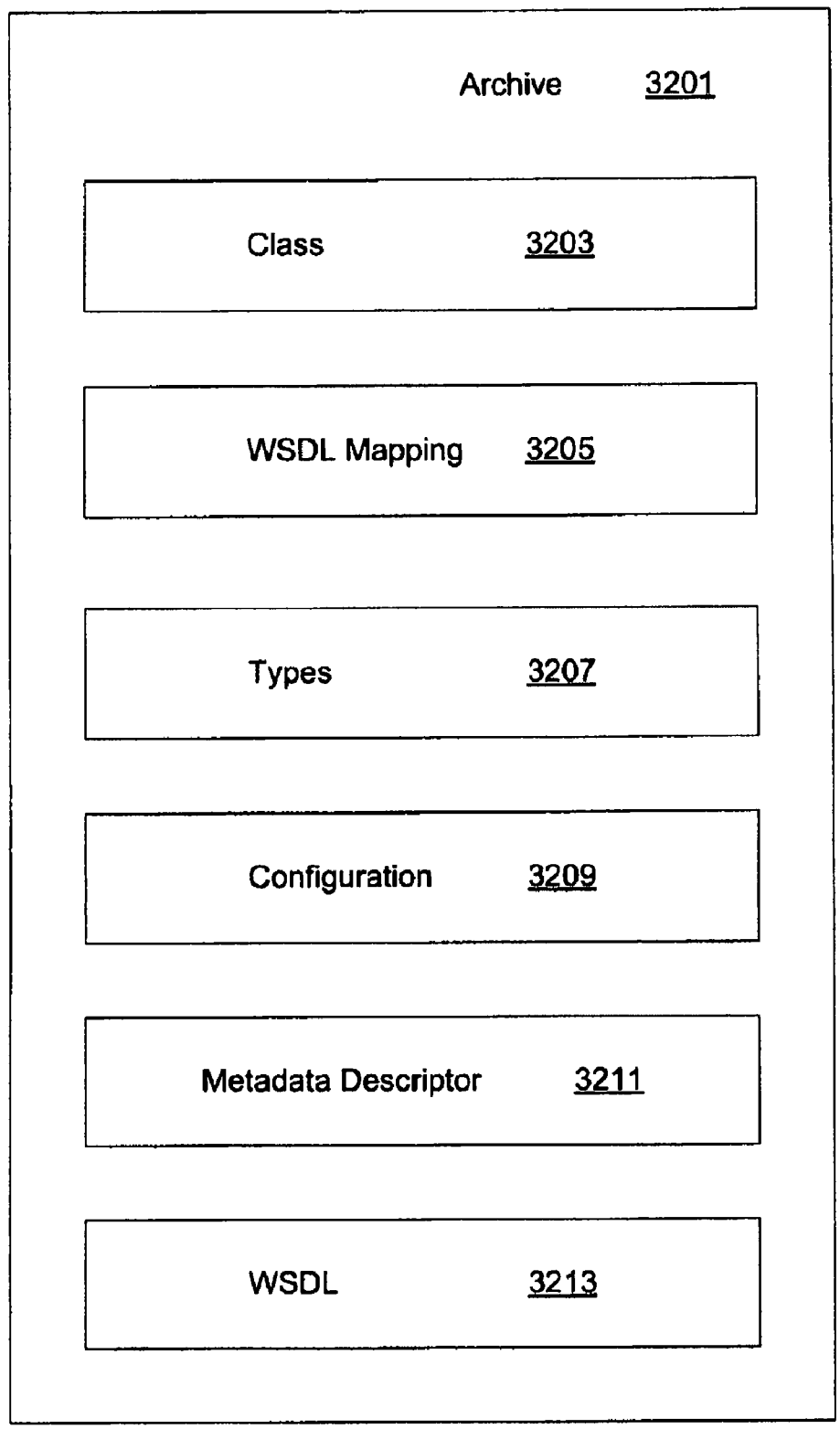
FIG. 32 illustrates an embodiment of a client deployable archive file.

FIG. 32 illustrates an embodiment of a client deployable archive file 3201. This archive file is used to deploy a Web service client application or applications on a client. A client application serves as a proxy for the Web service but running on the consumer/client side. The archive is a developer specific archive.

The archive file includes the necessary class descriptors 3203 for application including, but not limited to proxy interface classes and container classes. The proxy interface classes define the objects that represent the web service. Container classes define input/output parameters.

The WSDL mapping descriptor 3205 describes the mapping between the Web service and the WSDL file. For example, the mapping from Java to XML or XML to Java.

The types descriptor 3207 contains additional information about the WSDL schema. For example, the types descriptor 3207 may specify the mapping between XML complex types and Java class files such as changing a complex type into a set of methods (which complex type should fill which field in an endpoint method). The Java serialization framework uses these mapping to serialize the Java class files to XML and/or to instantiate the Java class files from XML correctly.

The configuration file 3209 is used to keep the entire configuration of web services and/or web services client. Generally, this is extra information not included in a WSDL file such as protocol definitions. In one embodiment, the configuration model is divided into two logical parts of design-time and run-time. Design-time helps define basic requirements that are needed to access the WS endpoint (e.g., the endpoint requiring authentication in order to work properly and securely). Run-time helps define how design-time configurations are met (e.g., requiring basic authentication (e.g., username/password) and/or strong authentication (e.g., X509 authentication certificates) for allowing access to the endpoint).

The archive includes a WSDL file 3213 for the Web service. The WSDL, as discussed above, describes the Web Service(s) to be deployed.

While archives should contain the same information, they do not necessarily have to maintain the same directory structure. The archive has a metadata descriptor 3211 for the above descriptions and for each service group that describes where the files in the archive are located.

In an embodiment, at least some of the different types of files and information included in a client services archive 3201 are generated using the techniques described earlier.

Figure 33:
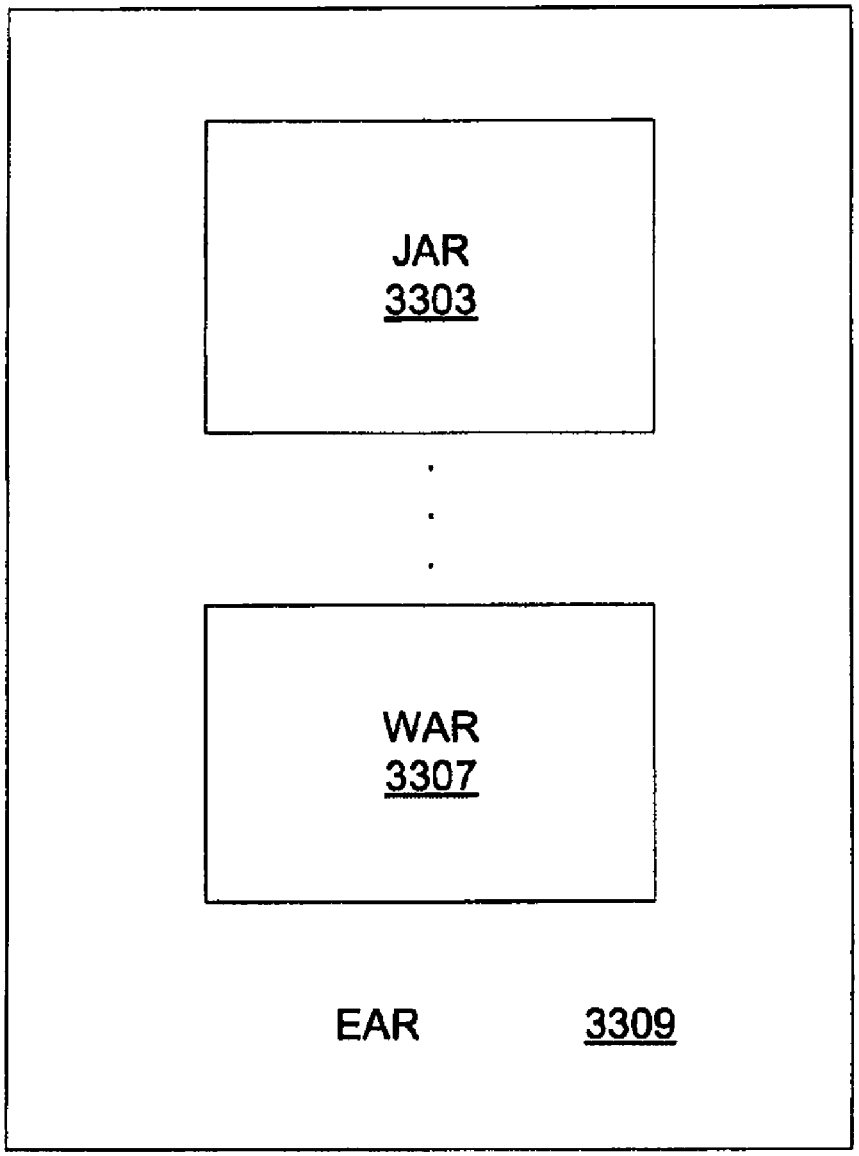
FIG. 33 shows an exemplary larger archive file with multiple deployment archives.

Multiple client or Web services deployment archives may included in a larger archive file. FIG. 33 illustrates an exemplary larger archive file with multiple deployment archives. This archive 3301 includes separate, smaller archives for a EJB implementation (JAR) 3305 and Web implementation (WAR) 3303. Of course other archives not described and multiple types of the same archive may be included in one larger archive file. In one embodiment, archive 3301 is an Enterprise Archive (EAR) file.

Figure 34:
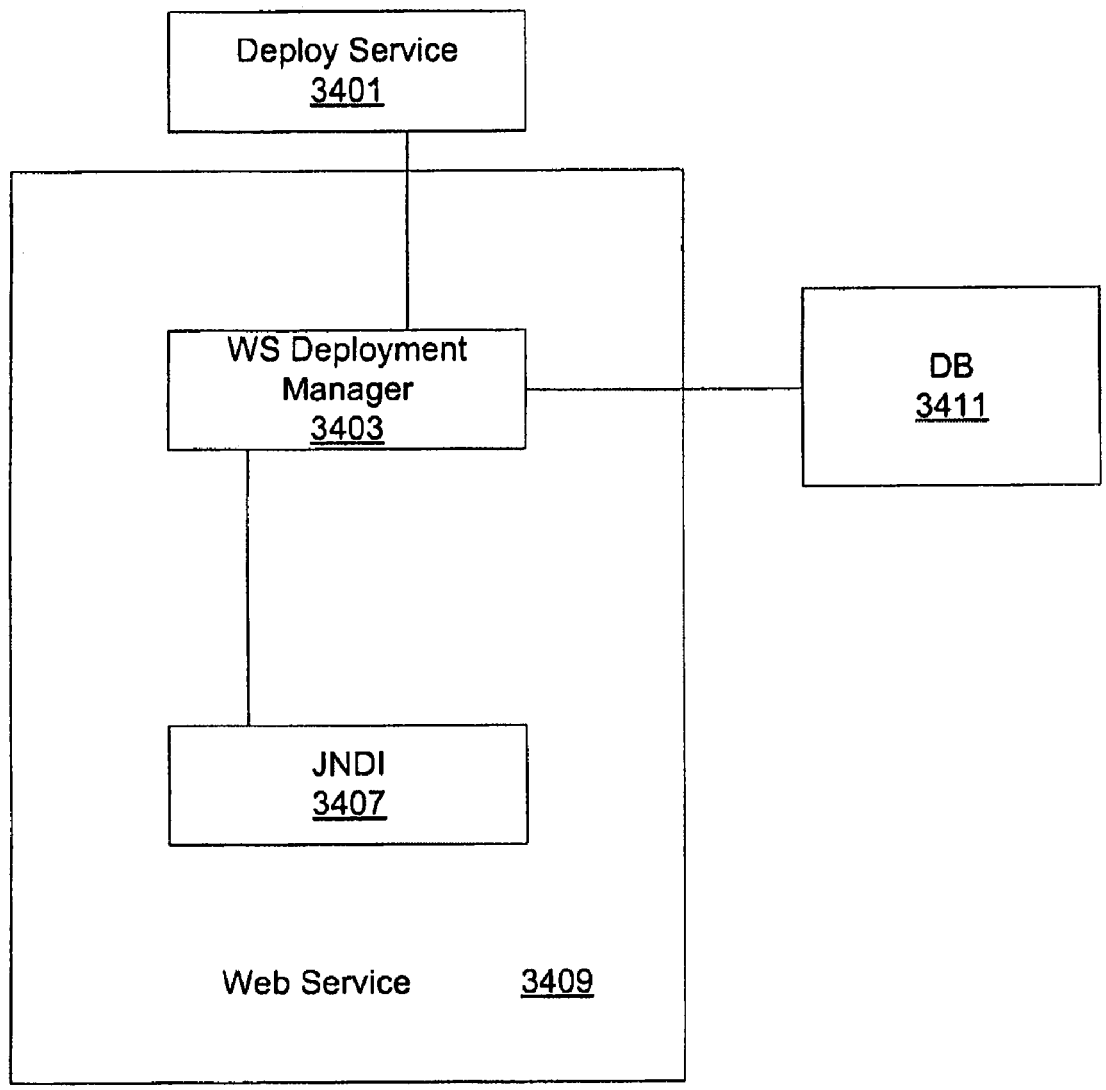
FIG. 34 illustrates an embodiment of a client side deployment.

FIG. 34 illustrates an embodiment of a client side deployment. A deployment service 3401 receives at least the client deployable archive file that is to be deployed on the Web service client 3409.

A deployment manager 3403 on the client receives only archives with Web services client components. For example, a developer specific archive. The deployment manager 3403 also stores the components in an external database 3411 and/or registers the components in the Java Naming Directory Interface (JNDI) registry on application start up.

Figure 35:
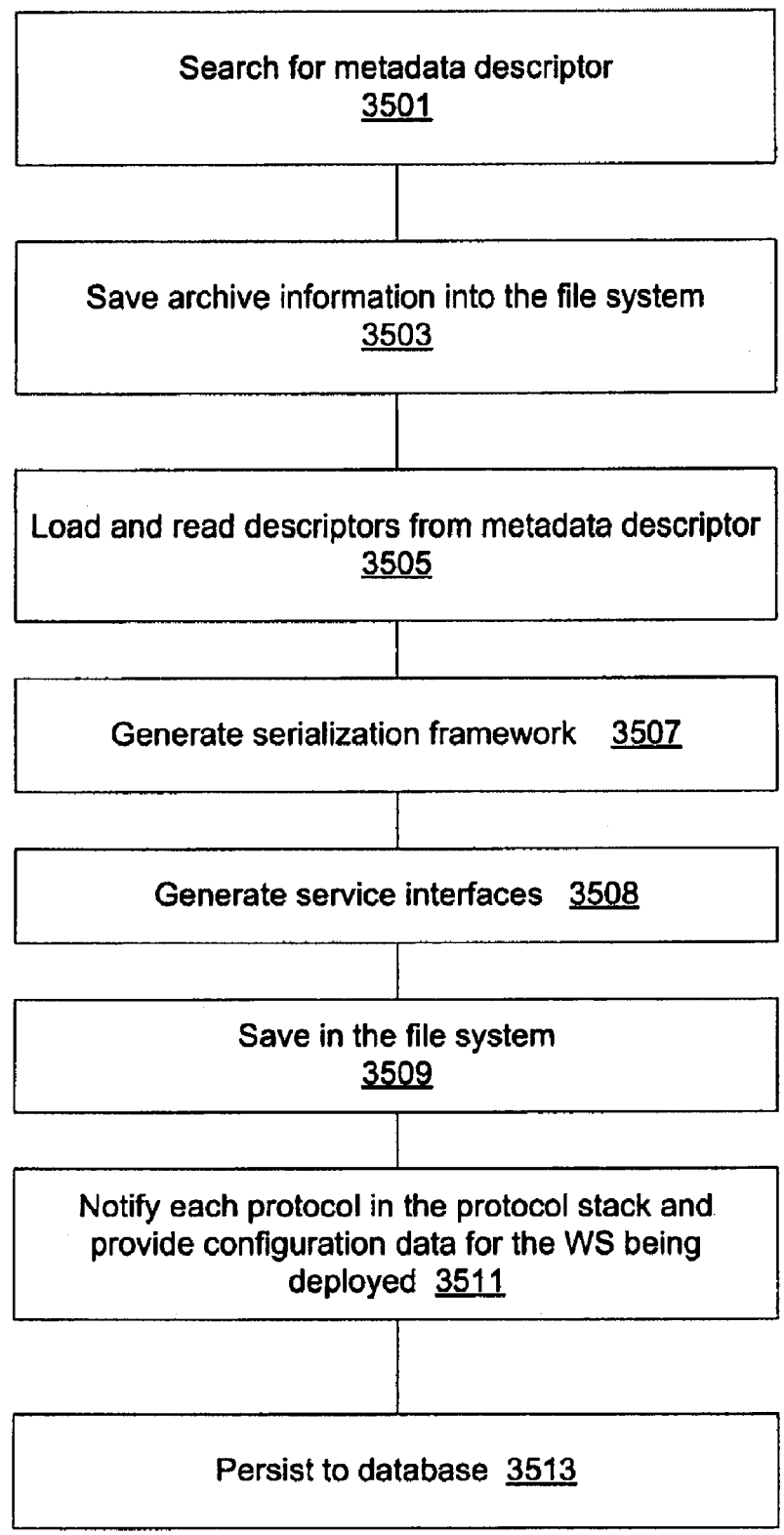
FIG. 35 illustrates an embodiment of a method for client archive deployment.

FIG. 35 illustrates an embodiment of a method for client archive deployment. At 3501, the archive is searched for a metadata descriptor file. As described earlier, the metadata descriptor file describes the mapping between the Web services group and the WSDL file, such as the mapping from Java to XML or XML to Java. This information is saved into the file system of the client at 3503.

The descriptors from the metadata descriptor are read and loaded (processed) at 3505. Reading determines which Web services are described in the archive. At 3507, a set of objects that are for serializing/deserializing Java input parameters into XML. These objects are also referred to as the serialization framework. The serialization framework is generated using the WSDL schema section and the types descriptor of the archive. Since the types descriptor 3207 contains additional information about the WSDL schema it may specify the mapping between XML complex types and Java class files such as changing a complex type into a set of methods (which complex type should fill which field in an endpoint method). The Java serialization framework uses these mapping to serialize the Java class files to XML and/or to instantiate the Java class files from XML correctly.

Implementation of service interface and service endpoint interfaces are generated at 3508. Generally, there is one service endpoint interface for each port of the client. These ports are used to access the correct endpoint on the server side. The WSDL file provides the messaging semantics to be used for the communication between the ports. The WSDL mapping file describes the necessary Java to XML or XML to Java mapping necessary for communication and processing. The configuration file contains the descriptors for port configuration.

The Java serialization framework, implementation of service interfaces, and service endpoint interfaces are saved in the file system for use by the client at 3509.

In an embodiment, protocols in the protocol stack is notified and provided with configuration data for the Web service being deployed at 3511. The configuration data alerts the protocol of any "special" input parameters for the Web service that deviate from the norm. Exemplary special input parameters include, but are not limited to, initial values to be set such as login protocols and how long the reliable messaging protocol stays in hibernation before terminating a session. Each protocol may decide if it is to be notified. In another embodiment, this notification and provisioning is skipped.

At 3513, the archive, serialization framework, and/or metadata descriptors are persisted into a remote database.

In one embodiment, the deployment manger 3403 performs at least a portion of the above method.

Common Model for Deployment

A Web services framework should be able to execute different deployment and lifecycle processes for Web services and Web services client applications even though they have different requirements. One of the ways for a framework to be able to handle the server and client side is to use a generic and common way to handle the different deployment and management scenarios that the server and client deal with.

Figure 36:
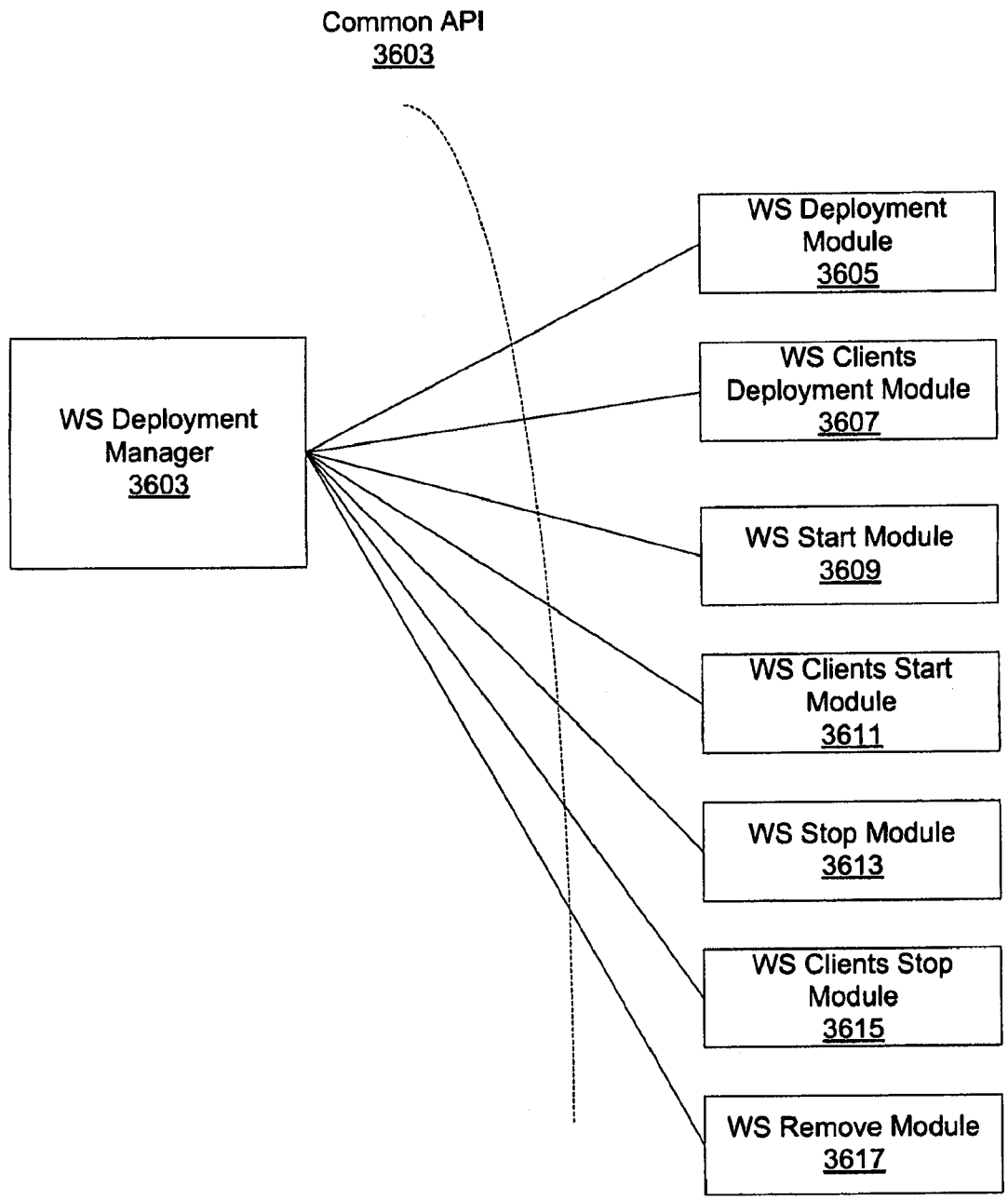
FIG. 36 illustrates an embodiment of a common deployment model.

FIG. 36 illustrates an embodiment of a common deployment model. A Web services deployment manager 3601 is on the server. This manager 3601 is responsible for at least some of the following tasks: deploying WS archive components, starting the WS or application, stopping the WS or application, and/or removing WS or application components.

The manager 3601 uses a common API (application program interface) 3603 to handle these tasks generically. The WS deployment framework executes all of the processes using this API and is therefore unaware of any specific processing that needs to be done or even what type of application (server or client) is being deployed. A generic command to deploy, start, stop, or remove is all that the deployment manager 3601 must know. The individual components accept these generic commands and perform the necessary tasks for their specific system.

The WS deployment module 3605 and WS client deployment module 3607 handle deployment tasks for a server and client respectively. Generally, one server node is deployed per cluster. Likewise, the WS start module 3609, WS stop module 3613 and WS client start module 3611 and WS client stop module 3615 handle at least some of the runtime aspects for the server and client. Of course, an even more generic deployment, start, and/or stop module may be used to handle tasks for both the server and the client. The start modules may be start an entire cluster at once or one node at a time.

The WS remove module 3617 removes WS components from either the server or client. Of course, less generic remove module could be created for both the server and the client.

Figure 37:
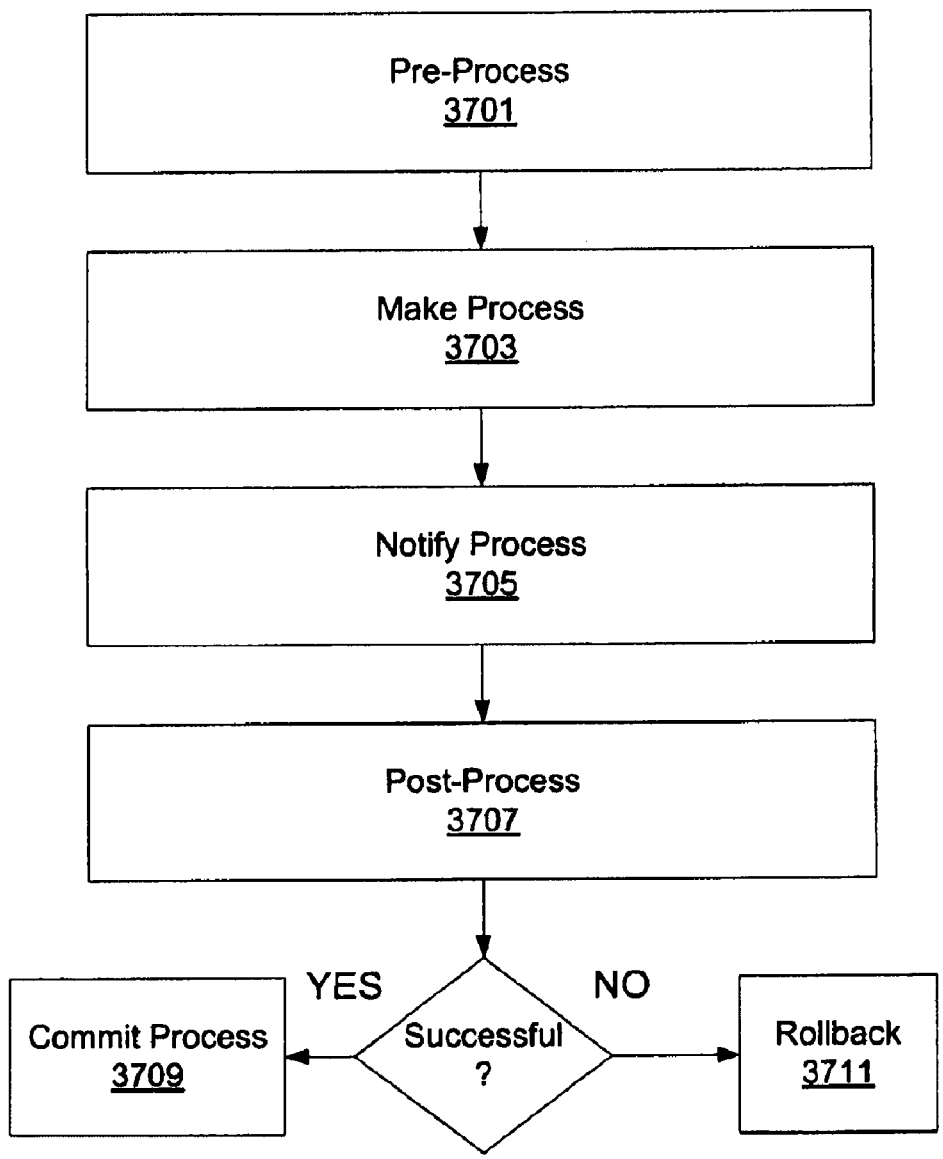
FIG. 37 illustrates an embodiment of a method used with a common API for deployment and maintenance tasks.

FIG. 37 illustrates an embodiment of a method of using the common API for common deployment and/or maintenance tasks (such as starting) of a WS. At 3701, pre-processing is done as needed. For example, files from a database are downloaded such as the WS archive to be deployed. In one embodiment, pre-processing is performed by the applicable WS deployment manager.

The make process is performed at 3703. This process may include three parts: initialization, execution, and finishing. During initialization, the make process initializes the framework. For example, the metadata descriptor in archive file is located and/or the archive information is saved into the file system). This initializing part may be performed by the appropriate WS server or client deployment module. The proper startup module performs execution tasks such as reading metadata descriptors from the file system and instantiates the necessary serialization framework and interfaces, and binding the service interfaces to the JNDI (client) and/or loading the descriptors WS runtime data registry (server). The startup module may also notify protocols if so desired as an execution task. Finally, finishing tasks such as persisting the archive, serialization framework, and/or metadata descriptors to a database are performed.

At 3705, server nodes that did not get the deployed WS are notified that the WS was deployed. In an embodiment, protocols in the protocol stack is notified and provided with configuration data for the Web service being deployed. The configuration data alerts the protocol of any "special" input parameters for the Web service that deviate from the norm. Exemplary special input parameters include, but are not limited to, initial values to be set such as login protocols and how long the reliable messaging protocol stays in hibernation before terminating a session. Each protocol may decide if it is to be notified. In another embodiment, this notification and provisioning is skipped.

Deployment post-processing may be performed at 3707. For example, resources needed by a particular application loader are retrieved from a database or archive.

Make processing, notifying, and post-processing are sometimes referred to as the general phases (tasks) of processing a portion of a WS. If the general phases of the process have are successful for the WS, that WS is committed at 3709. In other words, the WS is deemed deployed and/or maintained and is ready to be started, stopped, or removed.

If one of phases fails, the state of deployment and/or maintenance is rolled back and returned to an initial state at 3711. For example, in an embodiment the general phases of processing are performed again.

Built-in Endpoints

Several Web service specifications (such as WS-MetaDataExchange, WS-RM, WS-SecureConversation, etc.) utilize Web service communications. Practically, Web service methods are part of the protocol that a specification poses between a client and a server. Thus, the implementation of these specifications raises several requirements for the provider of a Web service runtime such as: 1) allowing Web service endpoints created with specific logic (such as endpoints related to WS-MetaDataExchange, WS-RM, and WS-SecureConversation implementations) to be plugged into the runtime; 2) providing a simple and easy to use mechanism for this plugging into the runtime; 3) once an endpoint is plugged in, that the endpoint may be utilized for most, if not all, conventional Web service endpoints; and 4) dynamic switching to the correct endpoint based on the request message content.

Figure 38:
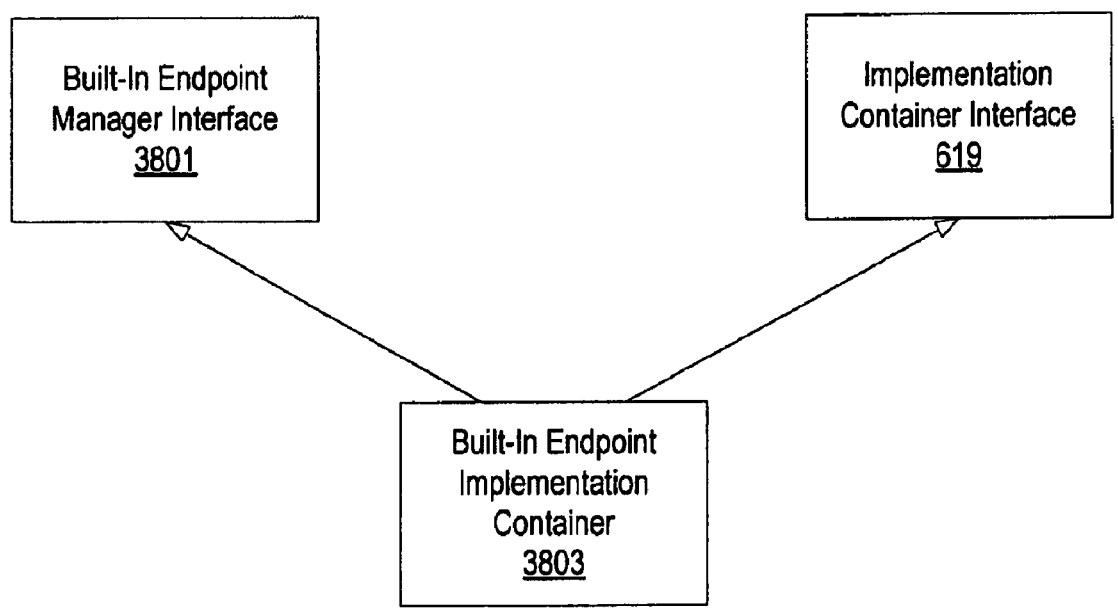
FIG. 38 illustrates a class diagram for built-in endpoint management according to an embodiment.

FIG. 38 illustrates a class diagram for built-in endpoint management according to an embodiment. Built-in endpoints are registered inside the built-in endpoint implementation container 3803. J2EE engine components know the location of this interface from the JNDI or Web services data registry 612 of the runtime. The built-in endpoint implementation container 3803 implements both interfaces the implementation container 619 and built-in endpoint manager interface 3801. Accordingly, the built-in endpoint implementation container 3803 has the same or similar properties has the implementation container 619 and additionally, it handles built-in endpoints.

The previously described runtime object 611 has been extended to interact with the built-in endpoint implementation container 3803. The runtime checks each Web service call (SOAP message) that it receives to determine if it contains a specific key, queries the built-in endpoint implementation container 3803 (through either the built-in endpoint manager 3801 or implementation container 619) to determine whether for this key there is a built-in endpoint registered, and then switches the processing to use the built-in endpoint implementation container 3803 (from this point on the processing is just like the standard Web service call as described earlier, for example, with respect to FIG. 7).

Figure 39:
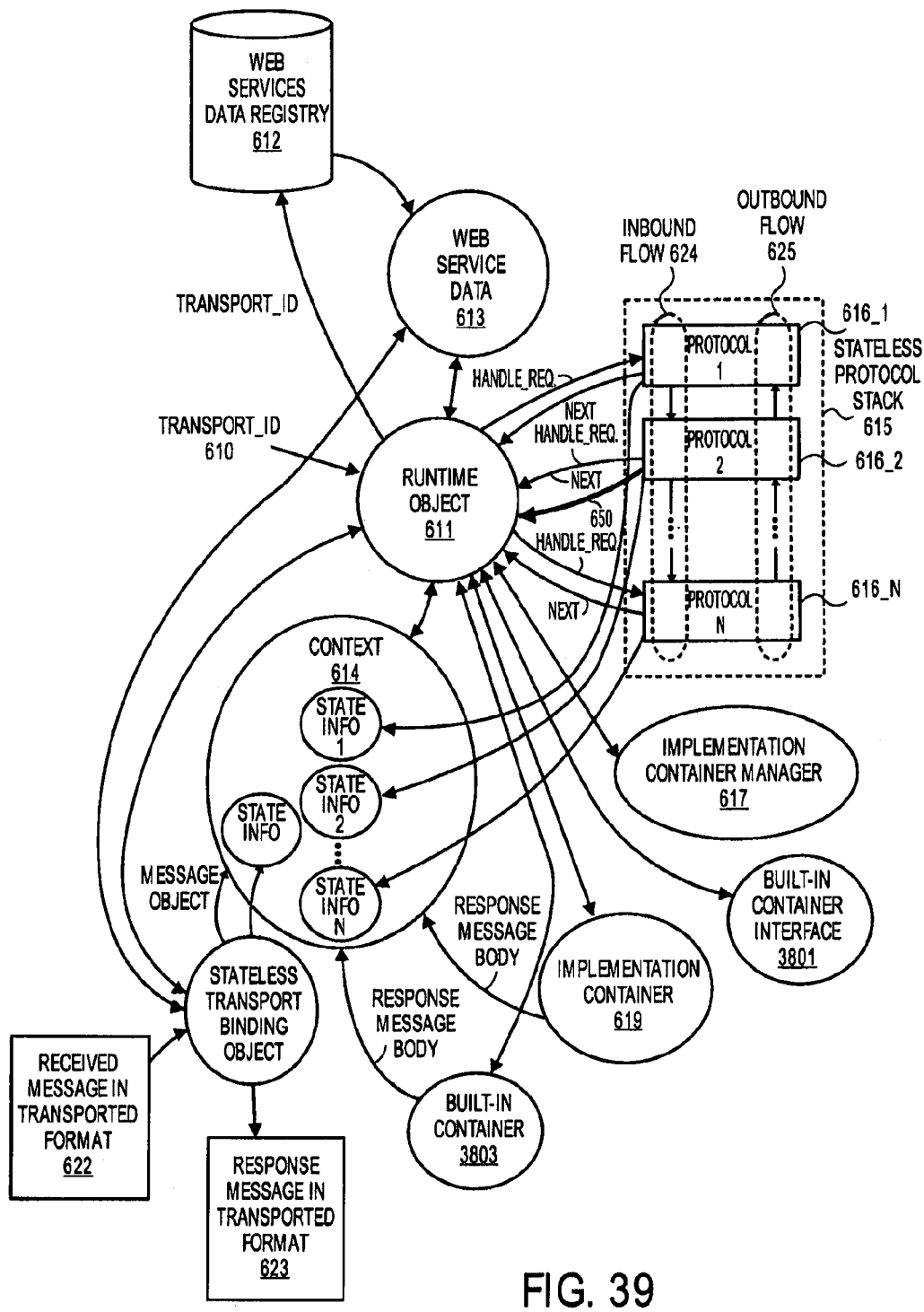
FIG. 39 shows an embodiment of an improved Web services message processing runtime framework including a built-in endpoint manager and built-in endpoint implementation container.

In an alternative embodiment, the implementation container manager 617 and implementation container 619 are modified to include the built-in endpoint manager 3801 and built-in endpoint implementation container 3803 respectively. Accordingly, the modified implementation container 619 stores registered built-in endpoints and the modified implementation container manager 617 supports dynamic switching of endpoints. In an embodiment, the implementation container manager 617 includes a built-in endpoint registrar and the implementation container 619 contains built-in endpoints which are the object-oriented program code (in the form of a Java servlet or Enterprise Java Bean (EJB)) for processing message body (or "payload") information. FIG. 39 shows an embodiment of an improved Web services message processing runtime framework including a built-in endpoint manager 3801 and built-in endpoint implementation container 3803.

Figure 40:
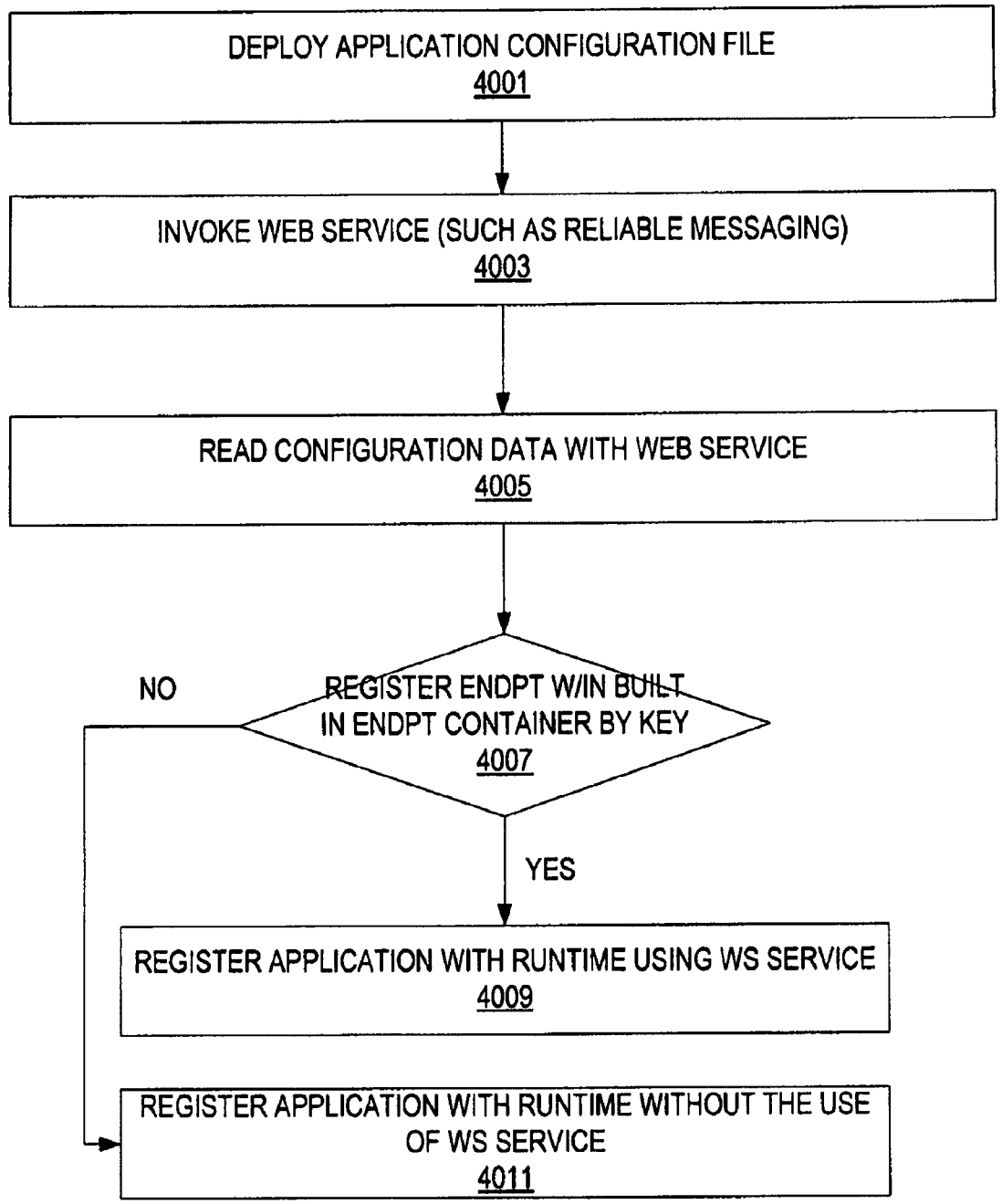
FIG. 40 illustrates an embodiment of a method for deploying and starting an application that uses a Web services specification such as WS-RM.

FIG. 40 illustrates an embodiment of a method for deploying and starting an application that uses a Web services specification such as WS-RM. The configuration file of an application is deployed at 4001. As described earlier, configuration files describe the services that a Web service runtime needs to support for the application run properly. Each configuration files stores metadata about a service/application provided by the Web service provider. In an embodiment, configurations of a configuration file are also specific to a particular policy domain such as security, reliable messaging, etc.

There are two types of data available in most implementations: abstract and concrete data. Abstract data is design time configuration data and is associated with a portType, type, and/or message. Runtime configuration data (concrete data) is associated with a binding, service, and/or port. In an embodiment, each configuration is associated with only a single port. The use of configuration files allows for the separation of abstract and concrete WSDL data. This separation allows for the dynamic creation and/or changing of a WSDL document.

The configuration data from the configuration file(s) is additional metadata which again could be separated to abstract and concrete. This configuration metadata represents additional information, which cannot be described by the standard WSDL elements (types, messages, portTypes, bindings, services, ports) such as specific kinds of securities (signature, encryption), quality of service for message delivery (exactly one, exactly one in order, etc.), etc. An example of abstract configuration data is "I want encryption" with the concrete configuration data being "the encryption will be DES."

The Web service implementation that is used by the application is invoked at 4003. For example, WS-RM may be invoked at this time. The invoked Web service implementation reads and interprets the configuration data of the deployed configuration file at 4005.

An attempt to register the endpoint to be associated with the application is with the built-in endpoint container is made at 4007. This registration is typically done by a key that is used to identify and access the endpoint and method(s) executed by that endpoint appropriate for processing the corresponding message. If the endpoint can be registered with the built-in endpoint container, then the application may utilize the Web service that registered it. For example, the application may use WS-RM if WS-RM is supported by the runtime. This registration may be affected through an interface provided by the implementation container.

If the endpoint cannot be registered with the built-in endpoint container, then the application is either not registered at all (and cannot be run) or registered with the Web services runtime without the use of the desired Web service at 4011. There are several reasons why an application may not be able be registered with the built-in endpoint container such as: the Web service implementation that the Web services runtime supports is configured differently than what the application requires, the application requires Web service implementations that are not supported by the Web services runtime, etc.

Figure 41:
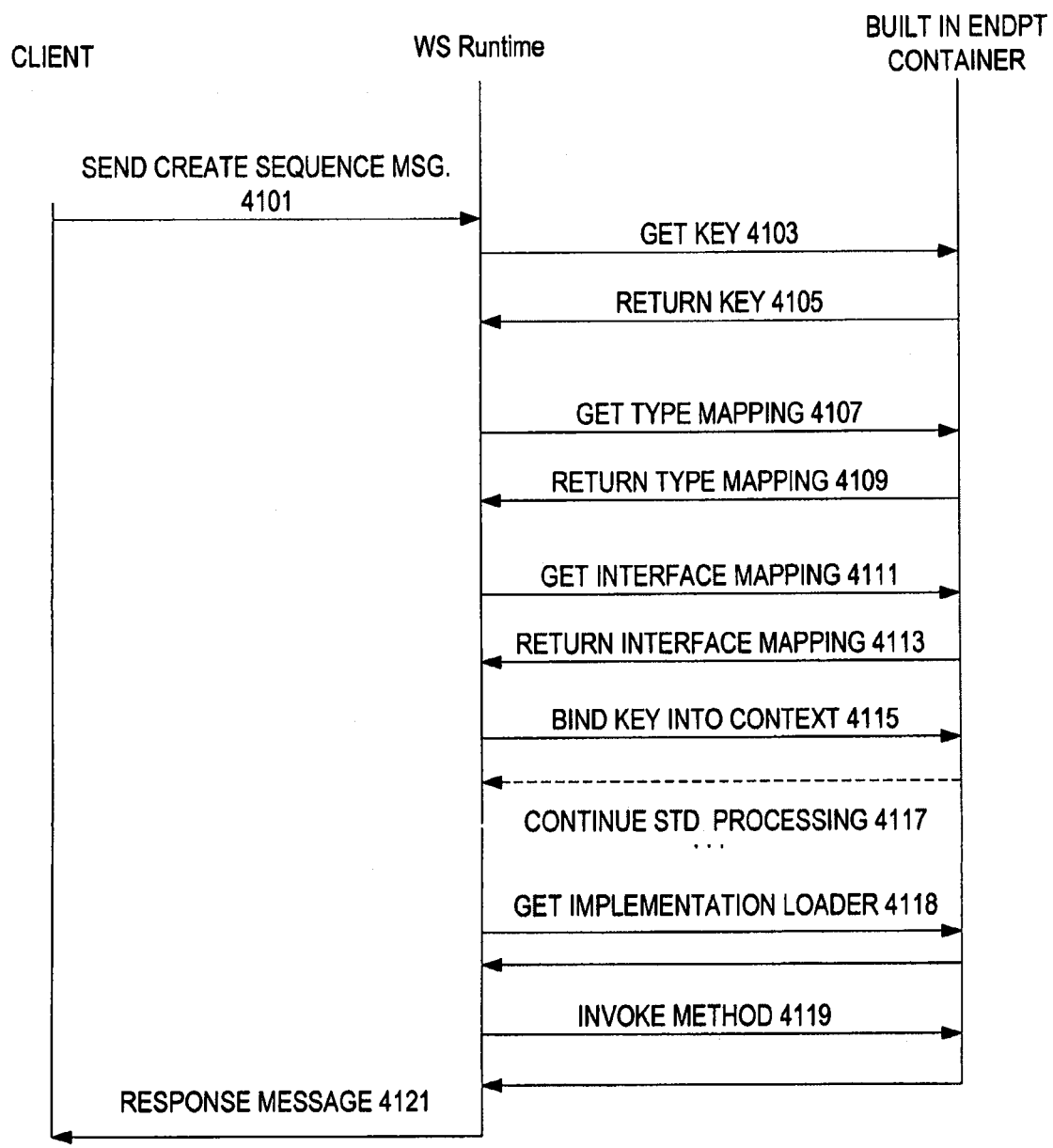
FIG. 41 illustrates an embodiment of a method of a client (application)/server (WS runtime) interaction using a built-in endpoint container.

FIG. 41 illustrates an embodiment of a method of a client (application)/server (WS runtime) interaction using a built-in endpoint container. The client transmits a "create Web services sequence" SOAP message to the Web services runtime at 4101. For example, a message received by the runtime will be passed through the token reader 639, to the stateless transport binding object 618, and finally, to the runtime object 611. This message indicates to the Web services runtime that the client wishes to initiate a transaction that uses a particular Web services implementation such as WS-RM, WS-MetaDataExchange, WS-SecureConversation, etc. The message includes a key that identifies one or more of the following: the name of the application deployed, the Web service implementation to be used, an endpoint to be used, and/or a WSA-Action.

The Web services runtime object 611 transmits a "get key" message to the built-in endpoint container 3803 at 4103. This message is used to check to see if there is an endpoint that meets the necessary requirements for the transaction. The built-in endpoint container 3803 returns an appropriate key if it has one at 4105. Typically, this key has most, if not all, of the same information as the key transmitted with the message at 4101.

The Web services runtime object 611 requests the type mapping associated with the deployed application and/or Web service implementation at 4107. As described earlier, the types descriptor contains additional information about the WSDL schema of the deployed application or Web service. For example, the types descriptor may specify the mapping between XML complex types and Java class files such as changing a complex type into a set of methods (which complex type should fill which field in an endpoint method). The Java serialization framework uses these mapping to serialize the Java class files to XML and/or to instantiate the Java class files from XML correctly. The built-in implementation container 3803 returns the requested type mapping at 4109. In an embodiment, the archive and/or WSDL is stored in Web service data 613 (if the archive containing the WSDL has been deployed).

The Web services runtime object 611 requests the interface mapping (such as a mapping descriptor) associated with the deployed application and/or Web service implementation at 4111. A WSDL mapping descriptor describes the mapping between the Web service and the WSDL file. The built-in implementation container 3803 returns the requested interface mapping at 4113. The archive and/or WSDL is stored in Web service data 613 (if the archive containing the WSDL has been deployed).

If either the type or interface mapping is not present, then there is not an endpoint configured to process with that WS implementation and another registered endpoint must be used (if any is to be used).

The key used by the built-in endpoint container 3803 is used to bind the transaction into the context 614 at 4115. Standard (normal) processing occurs at 4117. For example, the built-in endpoint's classloader is fetched at 4118 and a portion of the message body pertaining to the endpoint method input parameters, etc. is deserialized, etc. (a full exemplary flow for processing a message may be found with respect to FIG. 7). The Web service implementation's built-in endpoint method (such as WS-RM's endpoint method) is invoked at 4119. A response message generated by the runtime and/or endpoint using the method invoked at 4119 is transmitted from the Web services runtime to the client at 4121.

Policy Processing Framework

Figure 42:
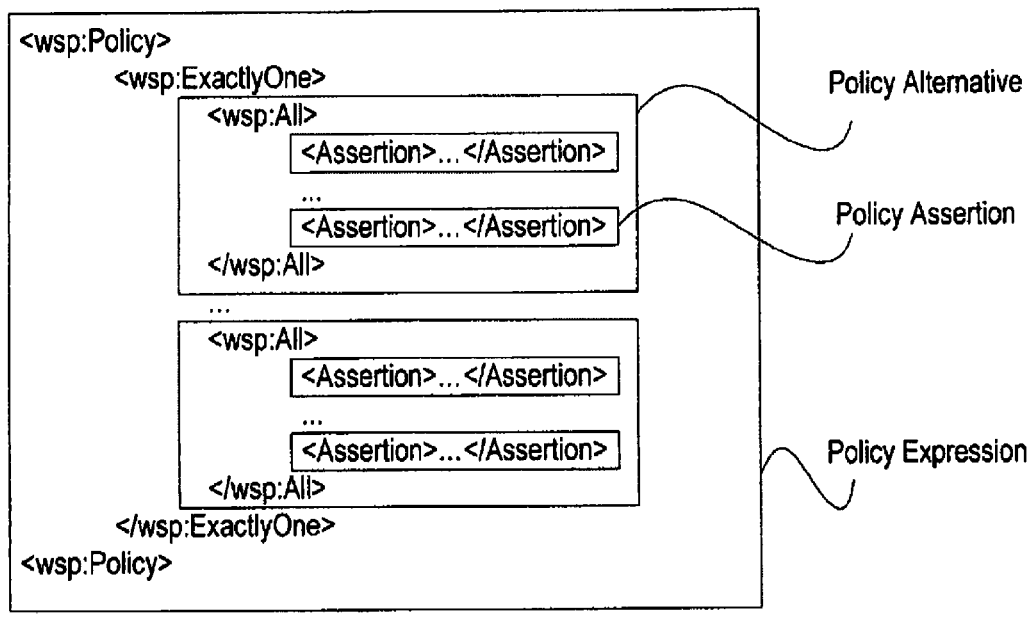
FIG. 42 illustrates an exemplary policy in "normal" or detailed form (showing a policy expression, assertion, and alternative)

WS-Policy is a Web services specification that describes a framework and model for the expression of Web services properties as policies. A copy of this specification may be found at http://www.w3.org/Submission/WS-Policy/. WS-Policy defines several terms as described herein. A policy expression is a collection of policy alternatives, where each policy alternative is a collection of policy assertions. Applications and services use policy expressions to determine the requirements for accessing a Web service. A policy assertion identifies a behavior that is a requirement (or capability) of a policy subject. Assertions indicate domain-specific (e.g., security, transactions) semantics and are expected to be defined in separate, domain-specific specifications. A policy assertion is supported by a requester if and only if the requester satisfies the requirement (or accommodates the capability) corresponding to the assertion. A policy alternative is supported by a requester if and only if the requester supports all the assertions in the alternative. And, a policy is supported by a requester if and only if the requester supports at least one of the alternatives in the policy. FIG. 42 illustrates an exemplary policy in "normal" or detailed form (showing a policy expression, assertion, and alternative).

A policy expression is an XML infoset representation of a policy, either in a normal form or equivalent compact form. A policy subject is an entity (e.g., an endpoint, message, resource, interaction) with which a policy can be associated. A policy scope is a collection of policy subjects to which a policy may apply. A policy attachment is a mechanism for associating policy with one or more policy scopes. A policy assertion type represents a class of policy assertions and implies a schema for the assertion and assertion-specific semantics. A policy assertion parameter qualifies the behavior indicated by a policy assertion. The policy vocabulary of a policy is the set of all policy assertion types used in the policy.

There are several policy operators used to define relationships between assertions of a policy expression. The "All" policy operator indicates that all assertions and child elements must be satisfied in order to use the Web service. The "ExactlyOne" policy operator indicates that only one of the requirements (if there are more than one) associated an assertion is to be followed. The "OneOrMore" operator indicates that at least one of the requirements associated with an assertion must be followed.

Figure 43:
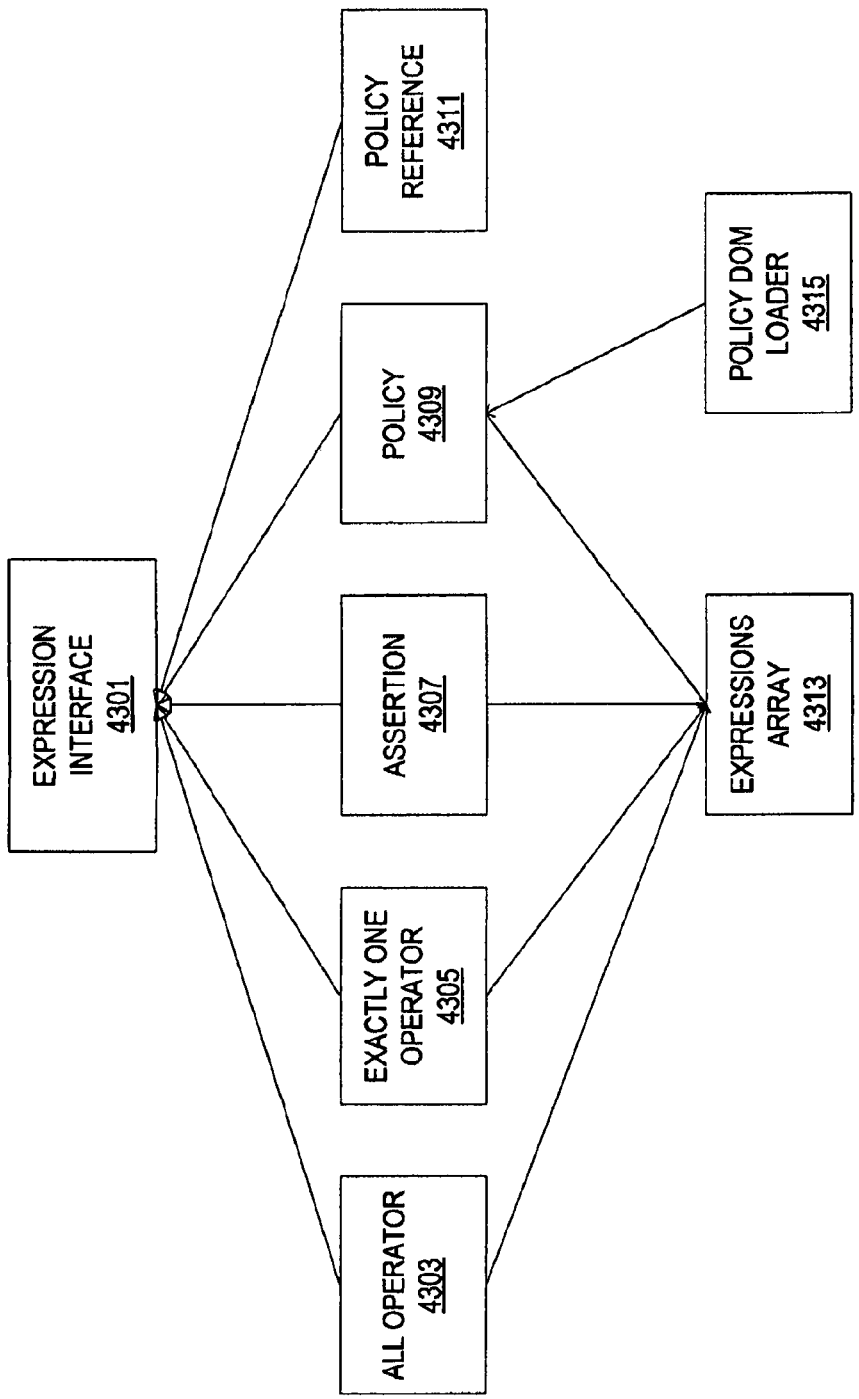
FIG. 43 illustrates a JAVA API for handling WS-Policy expressions according to an embodiment.

FIG. 43 illustrates a JAVA API for handling WS-Policy expressions according to an embodiment. This API 4301 and its associated loader 4315 and classes 4303, 4305, 4307, 4309, 4311, and 4313 provides for the creation, merging, normalizing of policies, etc. for the Web services runtime framework described above or one similar to it. Separate classes 4303, 4305, 4307, 4309, 4311, and 4313 are dedicated for each expression element and each class implements the API 4301 which provides the basic method(s) common to all of the expressions. These methods include, but are not limited to: evaluating an expression; calling one of the classes 4303, 4305, 4307, 4309, 4311, and 4313, (and its associated methods); retrieving a listing of or the elements in the expression array; and attaching a element to a parent.

The "all operator" class 4303 uses the expressions array 4313 and may be called through the API 4301. This class 4303 includes a function for the defining of policy assertions having the <wsp:all> operator.

The "exactly one operator" class 4305 also uses the expressions array 4313' and may be called through the API 4301. This class 4305 includes functions for retrieving the expression array from the expression array class 4313 and defining policy assertions having the <wsp:ExactlyOne> operator.

The "policy" class 4309 also uses the expressions array 4313 and may be called through API 4301. This class 4309 includes functions for: normalizing a policy; retrieving a policy element from a DOM; merging policies or policy arrays; and intersecting policies or policy arrays. When normalizing a policy, an existing policy is converted such that each nested policy expression contains at most one policy alternative. This is the most straightforward representation of a policy. Merging combines two or more policies. Intersecting identifies when two or more policies are mutually compatible and limits the policy alternatives that what is compatible.

The assertion class 4307 represents a version of a JAVA WS-Policy assertion notation. This class includes functions for performing the some of the basic WS-Policy tasks including: retrieving a nested policy element (by element name) from the expressions array 4313; retrieving an assertion from an element of the expression array; and creating, editing, or removing an element in the array and its properties.

The expressions array class 4313 contains the expressions supported as an indexed list (array). The expressions array class 4313 includes functions for: the retrieval of expressions (by my index number, name, etc.) from the array; the removal of one or more expressions from the array; adding expressions to the array; determining the number of expressions; and the modification of an expression in the array. Of course it should be understood that other storage techniques other than an array may be utilized.

The "policy reference" class 4311 allows for policy inclusion and does not use the expressions array 4313. A "wsp:PolicyReference" element is used to share assertions across policy expressions. Effectively, this element is used to include the content of one policy expression in another policy expression.

A policy DOM (Document Object Model) loader 4315 uses the policy class 4309 and has methods for loading policy expressions from a DOM, file, etc.

In an embodiment, WS-Policy functionality (API and associated methods (classes)) is a provided by a built-in endpoint, wherein the API 4301 and methods (classes) 4303-4315 are housed in the built-in endpoint implementation container 3803 and called via the built-in endpoint manager 3801.

In an alternative embodiment, WS-Policy functionality (API and associated methods (classes)) is a provided by a built-in endpoint, wherein the API 4301 and methods (classes) 4303-4315 are housed in the traditional implementation container 619 and called via the built-in endpoint manager 617.

Figure 44:
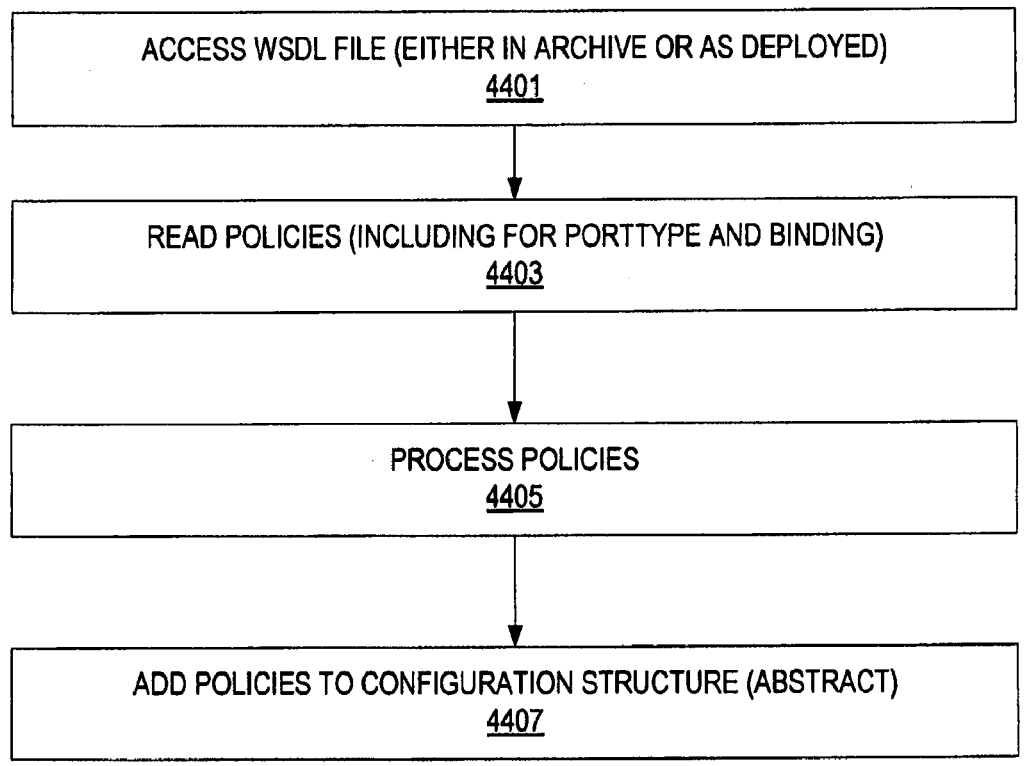
FIG. 44 illustrates an embodiment of a method for updating a Web Services' WS-Policy.

FIG. 44 illustrates an embodiment of a method for updating a Web Services' WS-Policy. One or more WSDL files are accessed at 4401. These WSDL files may either be in archive or as a separate file that has been deployed. A WSDL file includes portType and binding definitions. The archive and/or WSDL is stored in Web service data 613 (if the archive containing the WSDL has been deployed).

One or more of the policies that are defined in the portType, binding, services, etc. sections of the WSDL file(s) are read at 4403. Of course, all of the policies may be read or only policies of interest.

These policies are then processed at 4405 through the use of API 4301 and the WSDL(s) updated. Processing may include: merging, normalizing, intersecting, adding/editing/removing policies (or subsets thereof), etc. Updating of the WSDL(s) may be accomplished by updating the existing WSDL (just make changes to that WSDL) or creating a new WSDL that reflects the changes.

Once the policies have been processed, the updated WSDL is saved in a configuration file (either of the Web services runtime in Web service data 613 or in an archive separate from the Web services runtime) at 4407. Exemplary configuration files have been described earlier.

In another embodiment, the functionality of the WS-Policy API 4301 and its associated methods 4303-44315 is provided on a system other than a Web services runtime.

Closing Comments

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.).

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 45:
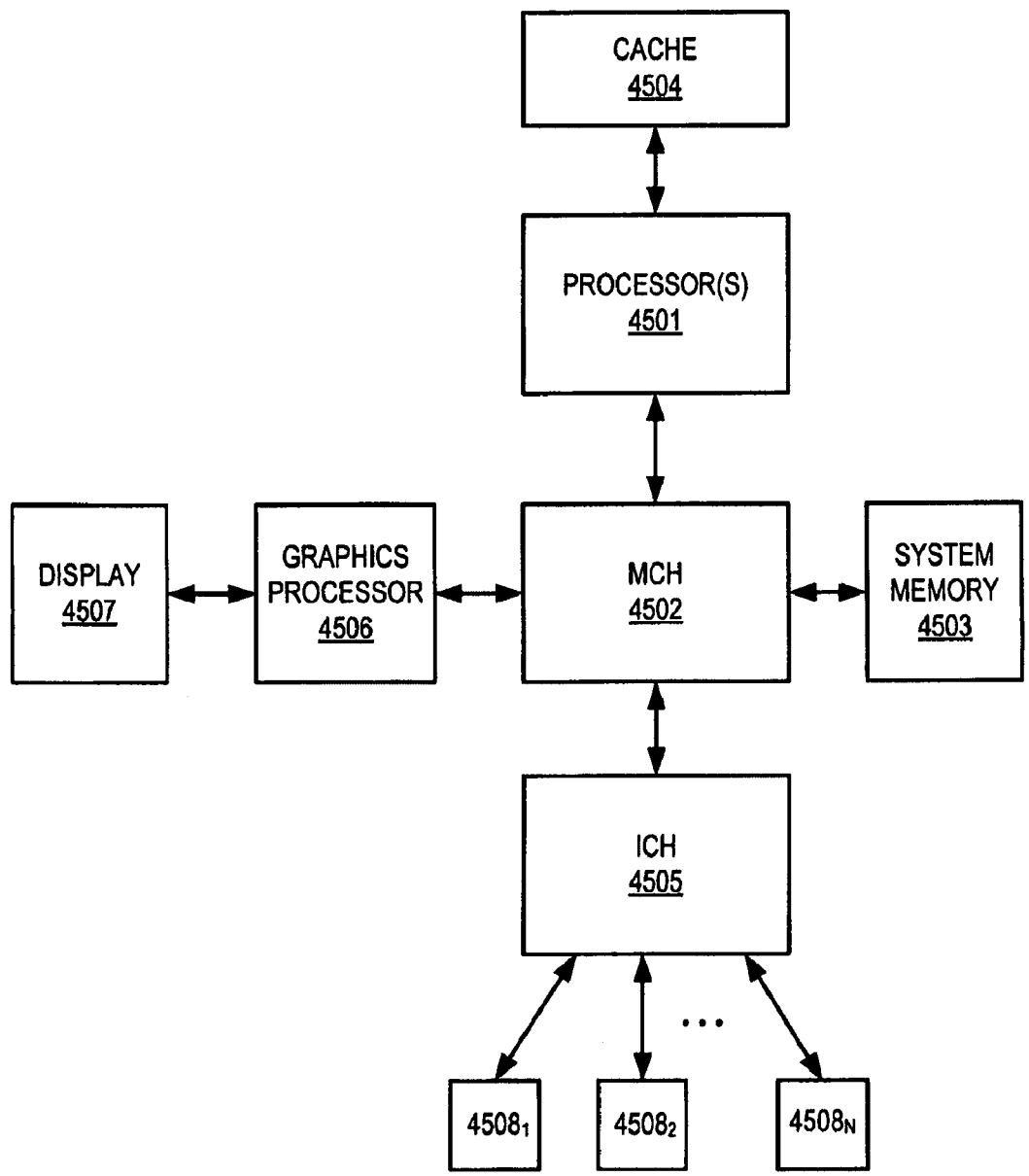
FIG. 45 shows an embodiment of a computing system.

FIG. 45 shows an embodiment of a computing system (e.g., a computer). The exemplary computing system of FIG. 45 includes: 1) one or more processors 4501; 2) a memory control hub (MCH) 4502; 3) a system memory 4503 (of which different types exist such as DDR RAM, EDO RAM, etc,); 4) a cache 4504; 5) an I/O control hub (ICH) 4505; 6) a graphics processor 4506; 7) a display/screen 4507 (of which different types exist such as Cathode Ray Tube (CRT), Thin Film Transistor (TFT), Liquid Crystal Display (LCD), DPL, etc.; 8) one or more I/O devices 4508.

The one or more processors 4501 execute instructions in order to perform whatever software routines the computing system implements. The instructions frequently involve some sort of operation performed upon data. Both data and instructions are stored in system memory 4503 and cache 4504. Cache 4504 is typically designed to have shorter latency times than system memory 4503. For example, cache 4504 might be integrated onto the same silicon chip(s) as the processor(s) and/or constructed with faster SRAM cells whilst system memory 4503 might be constructed with slower DRAM cells. By tending to store more frequently used instructions and data in the cache 4504 as opposed to the system memory 4503, the overall performance efficiency of the computing system improves.

System memory 4503 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 4503 prior to their being operated upon by the one or more processor(s) 4501 in the implementation of a software program. Similarly, data that a software program determines should be sent from the computing system to an outside entity through one of the computing system interfaces, or stored into an internal storage element, is often temporarily queued in system memory 4503 prior to its being transmitted or stored.

The ICH 4505 is responsible for ensuring that such data is properly passed between the system memory 4503 and its appropriate corresponding computing system interface (and internal storage device if the computing system is so designed). The MCH 4502 is responsible for managing the various contending requests for system memory 4503 access amongst the processor(s) 4501, interfaces and internal storage elements that may proximately arise in time with respect to one another.

One or more I/O devices 4508 are also implemented in a typical computing system. I/O devices generally are responsible for transferring data to and/or from the computing system (e.g., a networking adapter); or, for large scale non-volatile storage within the computing system (e.g., hard disk drive). ICH 4505 has bi-directional point-to-point links between itself and the observed I/O devices 4508.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method to process a plurality of Web services messages within an object oriented runtime environment, the method comprising:
    invoking a single instance of a state-less protocol to process an inbound flow of a first message pair corresponding to a first Web services message having a corresponding arrival position;
    determining that the first Web services message is out of order in a messaging sequence;
    storing a first set of state data retaining a state of the first message pair into a context of the first Web services message;
    processing an inbound flow and an outbound flow of a second message pair corresponding to a second Web services message with the single instance of the state-less protocol, the second Web services message preceding the first Web services message in the messaging sequence;
    retrieving the first set of state data and processing an outbound flow of the first message pair with the single instance of the state-less protocol, the first Web services message being provided subsequent to the second Web services message in the messaging sequence; and
    processing the messaging sequence with an appropriate endpoint.

2. The method of claim 1, wherein processing a plurality of Web services messages further comprises properly rearranging the order of any of a plurality of received Web services messages that have arrived out of order before processing the messaging sequence with the appropriate endpoint.

3. The method of claim 1, wherein processing a plurality of Web services messages further comprises determining that a complete set of Web services messages corresponding to the messaging sequence has been received prior to processing the messaging sequence with the appropriate endpoint.

4. The method of claim 1, wherein processing a plurality of Web services messages further comprises determining from sequence numbers corresponding to the first Web services message and the second Web services message, that a third Web services message has not been received in the messaging sequence.

5. The method of claim 1, wherein determining that the first Web services message is out of order in a messaging sequence comprises determining that the arrival position of the first Web services message differs from a sequence number corresponding to the first Web services message.

6. The method of claim 1, wherein determining that the first Web services message is out of order in a messaging sequence comprises utilizing a sequence identifier to identify the messaging sequence corresponding to the first Web services message.

7. The method of claim 1, wherein determining that the first Web services message is out of order comprises maintaining an order of the Web services messages within the messaging sequence with a corresponding sequence number and maintaining the messaging sequence identity within a plurality of messaging sequences with a corresponding sequence identifier.

8. The method of claim 1, wherein determining that the first Web services message is out of order in a messaging sequence comprises:
    requesting a sequence identifier corresponding to the messaging sequence from a destination endpoint; and
    receiving a sequence response from the destination endpoint, including a sequence identifier corresponding to the messaging sequence.

9. The method of claim 1, wherein processing a plurality of Web services messages further comprises monitoring, with a timer, a time interval between receiving the first Web services message and receiving the second Web services message, the messaging sequence being terminated if the monitored time interval between received Web services messages is greater than a predetermined value.

10. A non-transitory computer-readable storage medium comprising instructions, that when executed by one or more processors, perform a method to process a plurality of Web services messages within an object oriented runtime environment, the method comprising:
- invoking a single instance of a state-less protocol to process an inbound flow of a first message pair corresponding to a first Web services message having a corresponding arrival position;
- determining that the first Web services message is out of order in a messaging sequence;
- storing a first set of state data retaining a state of the first message pair into a context of the first Web services message;
- processing an inbound flow and an outbound flow of a second message pair corresponding to a second Web services message with the single instance of the state-less protocol, the second Web services message preceding the first Web services message in the messaging sequence;
- retrieving the first set of state data and processing an outbound flow of the first message pair with the single instance of the state-less protocol, the first Web services message being provided subsequent to the second Web services message in the messaging sequence; and
- processing the messaging sequence with an appropriate endpoint.

11. The method of claim 10, wherein the method further comprises properly rearranging the order of any of a plurality of received Web services messages that have arrived out of order before processing the messaging sequence with the appropriate endpoint.

12. The method of claim 10, wherein the method further comprises determining that a complete set of Web services messages corresponding to the messaging sequence has been received prior to processing the messaging sequence with the appropriate endpoint.

13. The method of claim 10, wherein the method further comprises determining from sequence numbers corresponding to the first Web services message and the second Web services message, that a third Web services message has not been received in the messaging sequence.

14. The method of claim 10, wherein determining that the first Web services message is out of order in a messaging sequence comprises determining that the arrival position of the first Web services message differs from a sequence number corresponding to the first Web services message.

15. The method of claim 10, wherein determining that the first Web services message is out of order in a messaging sequence comprises utilizing a sequence identifier to identify the messaging sequence corresponding to the first Web services message.

16. The method of claim 10, wherein determining that the first Web services message is out of order comprises maintaining an order of the Web services messages within the messaging sequence with a corresponding sequence number and maintaining the messaging sequence identity within a plurality of messaging sequences with a corresponding sequence identifier.

17. The method of claim 10, wherein determining that the first Web services message is out of order in a messaging sequence comprises:
- requesting a sequence identifier corresponding to the messaging sequence from a destination endpoint; and
- receiving a sequence response from the destination endpoint, including a sequence identifier corresponding to the messaging sequence.

18. The method of claim 10, wherein the method further comprises monitoring, with a timer, a time interval between receiving the first Web services message and receiving the second Web services message, the messaging sequence being terminated if the monitored time interval between received Web services messages is greater than a predetermined value.

19. A system comprising:
- a Web services message processing module operable in an object oriented runtime environment, the module comprising:
- a state-less protocol module invoked a single time to process an inbound flow and an outbound flow of message pairs corresponding to respective Web services messages in a messaging sequence, wherein an inbound flow and an outbound flow of a second Web services message may be processed in between an inbound flow and an outbound flow of a first Web services message;
- a message order determination module to determine an order of the respective Web services messages within the messaging sequence, the message order determination module determining the order of the respective Web services messages utilizing a corresponding sequence number; and
- a storage device to store a set of state data into a context of a corresponding Web services message, the state data retaining a state of each message pair of each respective Web services message.

* * * * *